United States Patent [19]
Kumagai et al.

[11] Patent Number: 6,009,303
[45] Date of Patent: Dec. 28, 1999

[54] DOCUMENT SCAN APPARATUS, IMAGING FORMING APPARATUS HAVING THE DOCUMENT SCAN APPARATUS, AND METHOD FOR CONTROLLING A DOCUMENT SCAN APPARATUS

[75] Inventors: Makoto Kumagai; Masao Kondo, both of Toyokawa, Japan

[73] Assignee: Minolta Co., Ltd., Osaka, Japan

[21] Appl. No.: 09/045,829

[22] Filed: Mar. 23, 1998

[30] Foreign Application Priority Data

| Mar. 24, 1997 | [JP] | Japan | 9-069675 |
| Oct. 3, 1997 | [JP] | Japan | 9-271449 |
| Mar. 18, 1998 | [JP] | Japan | 10-068952 |

[51] Int. Cl.$^6$ .............. G03G 15/00; B65H 5/00
[52] U.S. Cl. ............. 399/370; 271/3.14; 271/902; 358/496
[58] Field of Search ............ 399/367, 370; 358/496, 498; 271/3.14, 4.02, 265.02, 265.03, 902; 355/23, 24

[56] References Cited

U.S. PATENT DOCUMENTS

| 4,445,682 | 5/1984 | Uchida | 271/301 |
| 4,739,369 | 4/1988 | Yoshiura et al. | . |
| 4,791,451 | 12/1988 | Hirose et al. | 399/370 |
| 4,972,235 | 11/1990 | Iwamoto et al. | 399/370 |

*Primary Examiner*—Joan Pendegrass
*Attorney, Agent, or Firm*—McDermott, Will & Emery

[57] ABSTRACT

A document scan apparatus comprises a document scanner unit 1 which scans a document by illuminating the document with light, a feed path 10 which extends from a document stack portion 4 to a document discharge portion 8 through the document scan portion 7 of the document scan unit 1, driving units 15, 16, 17, 18, 19 and 20 which drive the document on the document path and document size detection units 23 and 24. The document size detection units 23 and 24 detect the document size during the document is carried by the driving units 15, 16, 17, 18, 19 and 20. Then, the documents 4 are fed to the document scan position 7 without passing the document discharge portion 8.

14 Claims, 49 Drawing Sheets

DOCUMENT SCAN APPARATUS, IMAGING FORMING APPARATUS HAVING THE DOCUMENT SCAN APPARATUS, AND METHOD FOR CONTROLLING A DOCUMENT SCAN APPARATUS

This application is based on the applications Nos. 9-69675, 9-271449 and 10-68952 filed in Japan, the contents of that are hereby incorporated by reference.

BACKGROUND OF THE INVENTION

The present invention relates to a document scan apparatus provided with an auto document feeder.

Various document scan apparatuses which scan documents in a document scan portion have been conventionally provided. There are generally two methods for scanning documents in the document scan portion. In one method, the documents are fixed and scanned by moving an optical system. In the other method, so called flow scanning, documents are moved and scanned by a fixed optical system.

Further, document scan apparatuses having an auto document feeder (ADF) have been conventionally provided. This ADF carries the documents stacked in a document stack portion to the document scan portion by one sheet or by some sheets and carries the documents to a document discharge portion after finishing the document scanning in the document scan portion.

In the document scan apparatuses having the ADF, there is a demand for detecting size of the document to be scanned before scanning in the document scan portion.

For example, in the case that a copying machine with flow scanning type document scan apparatuses having ADF carries out an auto magnification selection (AMS) process in which magnifications are selected on the basis of a fixed paper size and variable document sizes and copies an image on the document with enlarging or reducing according to the selected magnification, there is a need to detect the size of the document before the scanning starts.

Various technology has been conventionally provided to detect the document size before the scanning starts.

In most general technology, a document stack portion or a document tray is provided with document size detection means so as to detect the size of documents in the document stack portion.

U.S. Pat. No. 4,739,369 discloses a copying machine having a ADF (document circular feeding apparatus). The ADF carries documents stacked in the document stack portion in order from the lowest layer document and feeds back the document on the highest layer document of documents stacked in the document stack portion after scanning in the document scan portion. In this copying machine, during the first circulation of the document without scanning, the document size is detected by document size detection means provided in a document carrying path. Then, the document is circulated again. During this second circulation, scanning of the document is carried out.

The copying machine, which is provided with the document size detection means in the document stack portion as in the former copying machine, can detect correct document size in case that the size of documents stacked in the document stack portion are unified. However, in case that different size documents are stacked in the document stack portion, namely in the document mixed stack mode, there is a possibility that such copying machine can not detect document size correctly since it only detects the largest size document.

On the other hand, the latter copying machine described in U.S. Pat. No. 4,739,369 can detect size of each document correctly before scanning even in the document mixed stack mode. However, the latter copying machine has low productivity since it circulates the document for detecting the document size and then it circulates the document again for scanning. Further, such document size detection method can be applied only to the document scan apparatuses having the document circular feeding apparatus, hence it lacks generality.

SUMMARY OF THE INVENTION

An object of the present invention is to provide, with a view to eliminating the above described drawback of the conventional document scan apparatuses, a document scan apparatus which can detect size of each document correctly even in the document mixed stack modes, is inexpensive and has high productivity.

According to the present invention, there is provided a document scan apparatus comprising: a scanner which scans a document at a document scan portion; an auto document feeder comprising a document stack portion in which documents to be scanned are stacked, a document discharge portion to which the documents are discharged after completion of scanning and a carrying path which extends from the document stack portion to the document discharge portion through the document scan portion, whereby the documents in the document stack portion are carried to the document scan portion and the documents had been scanned are carried to be discharged to the document discharge portion; a detection unit which is arranged in the carrying path between the document stack portion and the document scan portion, and detects the size of the documents carried in the carrying path; and a control unit which controls the scanner, the auto document feeder and the detection unit so that the auto document feeder carries the document stacked in the document stack portion toward the document scan portion, the detection unit detects the size of the document, after completion of detecting the size thereof the auto document feeder carries the document to the document scan portion without discharging it to the document discharging portion and then the scanner scans the document.

Concretely, the control unit controls the scanner, the auto document feeder and the detection unit so that, after completion of detecting the size of the document, the auto document feeder carries the document toward the document stack portion and then carries it toward the document scan portion again.

More concretely, the control unit controls the scanner, the auto document feeder and the detection unit so that, after completion of detecting the size of the document, the auto document feeder carries the documents toward the document stack portion and, at the time that the tip end of the document reaches the document stack portion side of the document scan portion, the auto document feeder carries the document toward the document scan portion again.

Further, the auto document feeder can comprise a second carrying path branching from the carrying path, and wherein the control unit controls the scanner, the auto document feeder and the detection unit so that, after completion of detecting the size of the document, the auto document feeder carries the document to the second carrying path and then carries it toward the document scan portion again.

Preferably, the second carrying path is provided with a document reverse mechanism which reverses the document and then sends back it to the carrying path.

Preferably, the scanner is fixed near the document scan portion, and the document is carried in the document scan portion by the auto document feeder to be scanned by the scanner.

In the document scan apparatus of the present invention, the document size is detected by the detection unit during the document is carried from the document stack portion to the document scan portion. Thereafter, the document is carried to the document scan portion without discharging the document to the document discharge portion. Thus, the document scan apparatus of the present invention can scan documents with high efficiency.

Further, the document scan apparatus of the present invention is not need to be provided with a carrying path only for circulation of the document with which the conventional document circular ADF is provided. Thus, the document scan apparatus is compact and can reduce cost.

Further, according to the present invention, there is provides an image forming apparatus provided with the document scan apparatus. In the image forming apparatus of the present invention, the AMS mode can be achieved with high productivity since it is no need to send back the document after detection of the document size.

Further, according to the present invention, there is provided a method for controlling a document scan apparatus wherein; a scanner which scans a document at a document scan portion, an auto document feeder comprising a document stack portion in which documents to be scanned are stacked, a document discharge portion to which the documents are discharged after completion of scanning and a carrying path which extends from the document stack portion to the document discharge portion through the document scan portion, whereby the documents in the document stack portion are carried to the document scan portion and after completion of scanning the documents are carried to be discharged to the document discharge portion, and a detection unit which is arranged in the carrying path between the document stack portion and the document scan portion, and detects the size of the documents carried in the carrying path are provided, whereby the auto document feeder carries the document stacked in the document stack portion toward the document scan portion, the detection unit detects the size of the document, after completion of detecting the size thereof the auto document feeder carries the document to the document scan portion without discharging it to the document discharge portion and then the scanner scans the document.

Concretely, after completion of detecting the size of the document, the auto document feeder carries the document toward the document stack portion and then carries it toward the document scan portion again.

More concretely, after completion of detecting the size of the document, the auto document feeder carries the documents toward the document stack portion and, at the time that the tip end of the document reaches the document stack portion side of the document scan portion, the auto document feeder carries the document toward the document scan portion again.

Preferably, the auto document feeder further comprises a second carrying path branching from the carrying path, and after completion of detecting the size of the document, the auto document feeder carries the document to the second carrying path and then carries the document toward the document scan portion again.

BRIEF DESCRIPTION OF THE DRAWINGS

Other object and features of the present invention will become clear from the following detail description with reference to the accompanying drawings in which.

DETAILED DESCRIPTION OF THE PREFERRED EMBODIMENTS

First Embodiment

Figure 1:
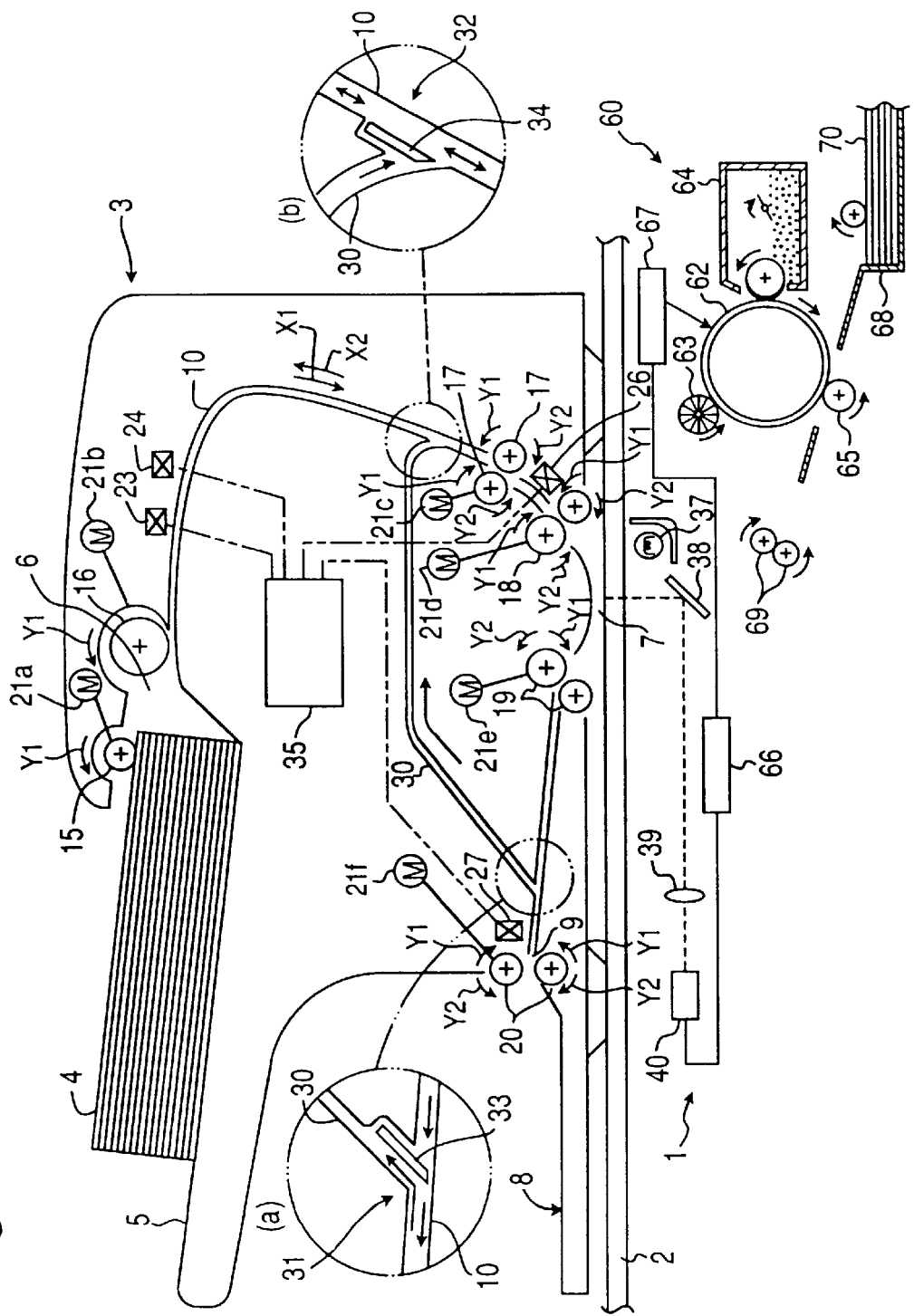
FIG. 1 is a schematic configuration view showing a document scan apparatus according to the first embodiment of the present invention.
Figure 2A:
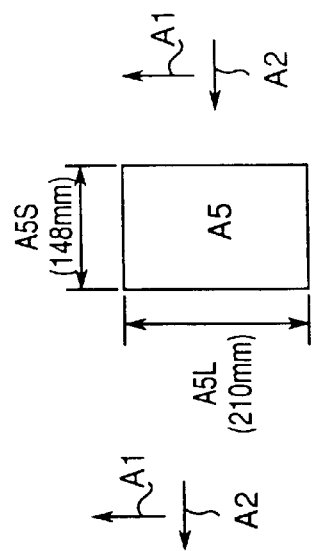
FIGS. 2A, 2B, 2C, 2D and 2E are schematic views each showing the dimension of the document.
Figure 2B:
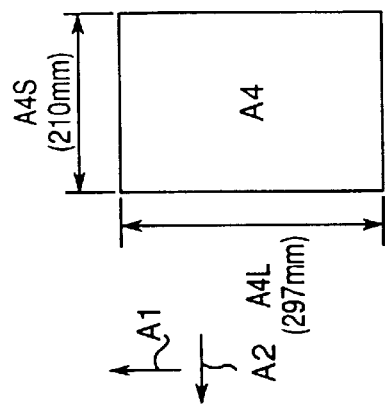
Figure 2C:
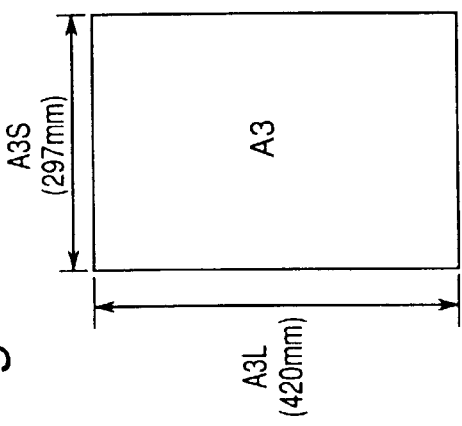
Figure 2D:
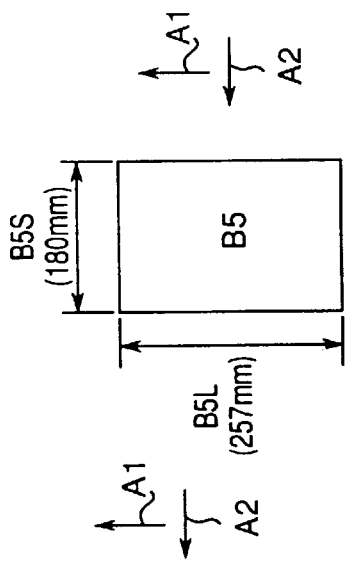
Figure 2E:
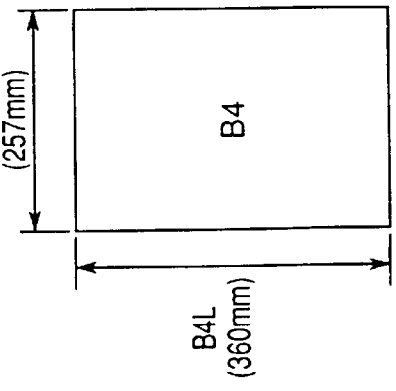

FIG. 1 shows a document scan apparatus according to a first embodiment of the invention, where an auto document feeder 3 is provided on a glass platen 2 of a copying machine for placing documents.

The auto document feeder 3 can use five types of documents such as A3 size (long side A3L of 420 mm, short side A3S of 297 mm), A4 size (long side A4L of 297 mm, long side A4S of 210 mm), A5 size (long side A5L of 210 mm, short side A5S of 148 mm), B4 size (long side B4L of 360 mm, short side B4S of 257 mm), and B5 size (long side B5L of 257 mm, short side B5S of 180 mm) each being shown in FIGS. 2A through 2E.

The term of "length" in the following description is referred to as size of the long side or the short side directed in the same direction of the carrying direction of the document. The term of "width" of the document is referred to as size of the long side or the short side directed in a direction orthogonal to the carrying direction of the document. For example, in FIGS. 2A through 2E, when the document is carried in the arrow A1 direction (in the same direction as the long side direction of the document), the size of the long side of each document becomes the length, and the size of the short side becomes the width. When the document is carried in an arrow A2 direction (in the same direction as the short side of the document), the size of the short side becomes the length and the size of the long size becomes the width.

As shown in FIG. 1, the auto document feeder 3 comprises a main carrying path 10 extending from a feeding opening 6, communicated with a document tray 5 where documents 4 before scanning are accumulated, to a discharge opening 9 communicated with a discharge stand 8 where the scanned documents are accumulated through a scanning portion 7 opposite to a scanner 1. The route length of the main carrying path 10 is set shorter than the size of the long side A3L (420 mm) of the A3 size which has a maximum size capable of feeding.

On the main carrying path 10 are provided with pick up rollers 15, separation rollers 16, an upstream carrying roller pair 17, a scanning front roller pair 18, a scanning rear roller pair 19 and a discharge roller pair 20, each being provided in sequence from the feeding opening 6 side (upstream side) toward the discharge opening 9 side (downstream side). The roller pairs 17 through 20 are provided so that the rollers of each roller pair are opposed to each other across main carrying path 10. Also, the rollers and roller pairs 15 through 20 are provided with driving mechanisms 21a through 21f composed of motors or the like.

Figure 3:
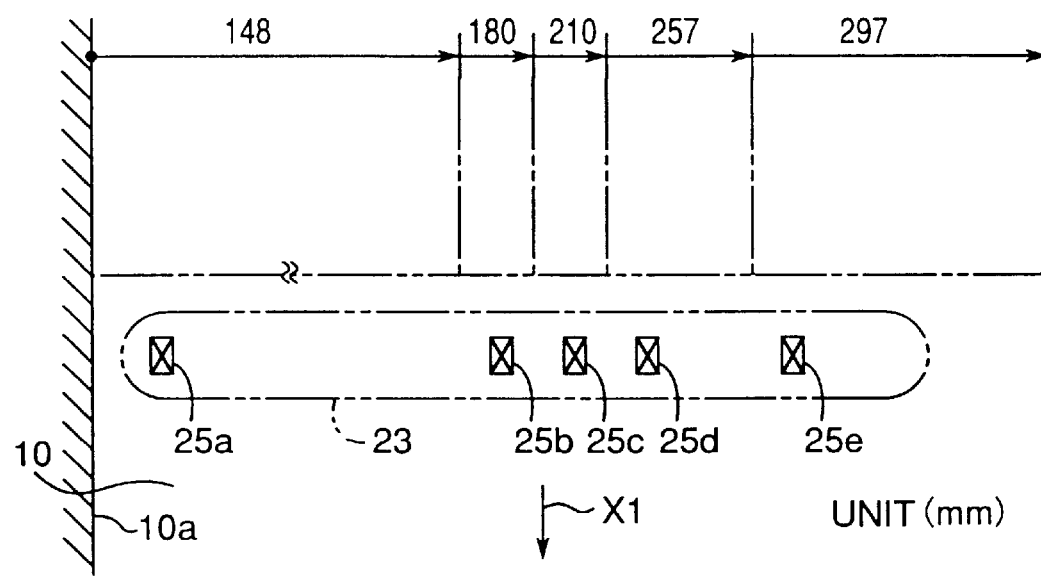
FIG. 3 is a schematic configuration view showing the sensor group for detecting the document width.

On the main carrying path 10, between the separation roller 16 and the upstream carrying roller pair 17, a sensor group (document width detection sensor group) 23 for detecting the width of the document and a sensor (document length detection sensor) 24 for detecting the length of the document 4 are provided sequentially from the upstream side. As shown in FIG. 3, the document width detection sensor group 23 is composed of five sensors 25a through 25e provided in one row in width direction with respect to the main carrying path 10. The sensors 25a through 25e are turned on when a document 4 exists on the main carrying path 10, while the sensors are turned off when a document 4 does not exist on the main carrying path 10.

As shown in FIG. 3, regardless of the size, the document 4 is carried to a direction (normal direction) shown in an arrow X1 where the document is carried from the upstream side to the downstream side of the main carrying path 10, so that the document 4 may come into contact with the right-hand side wall 10. The distance from the side wall 10a of the sensors 25a through 25e is arranged such that a first sensor 25a may become 0 through 148 mm, a second sensor 25b may become 148 mm through 180 mm, a third sensor 25c may become 180 mm through 210 mm, a fourth sensor 25d may become 210 mm through 257 mm and a fifth sensor 25e may become 257 mm through 297 mm.

On the main carry path 10, between the upstream carrying roller pair 17 and the scanning front roller pair 18, a resist sensor 26 capable of detecting the absence of the document in the same manner as the sensors 25a through 25e is provided. Furthermore, near the discharge opening 9 of the main carrying path 10, there is provided a switch back sensor capable of detecting whether the document exists.

A carrying path (recarrying path) 30 for refeeding a document is provided. The recarrying path 30 communicates the discharge opening 9 proximity of the main carrying path 10 (upstream side slightly higher than the discharge roller pair 20) with the upstream side slightly higher than the upstream carrying roller pair 17 of the main carrying path 10. As shown in portions (a) and (b) of FIG. 1, Mylar® plates 33 and 34 for regulating the carrying direction of the document 4 are each provided in a portion 31 where the recarrying path 30 is branched from the main carrying path 10 and in a portion 32 where the recarrying path 30 is merged with the main carrying path 10. Therefore, in these portions 31 and 32, the document 4 is carried only in a direction shown with arrows in the portions (a) and (b) of FIG. 1.

A controlling portion shown with numeral 35 in FIG. 1 controls the driving mechanisms 21a through 21f of the pick up rollers 15, the separation rollers 16, the upstream carrying roller pair 17, the scanning front roller pair 18, the scanning rear roller pair 19 and the discharge roller pair 20 based on the signals to be inputted from the document width detection sensor group 23, the document length detection sensor 24, the resist sensor 26, and the switch back sensor 27.

A document scan means, or a scanner 1 composes one portion of the copying machine. The scanner 1 comprises a light source 37, a mirror 38, a lens 39 and a reading sensor 40 constituted by a CCD or the like under the glass platen 2 on which the auto document feeder 3 is placed.

Numeral 60 in FIG. 1 denotes a image forming portion of the copying machine.

A charging device 63 with a charging brush, developing and cleaning device 64, and a transfer device 65 with a transfer roller are arranged around a photoreceptor 62 in order along a rotating direction of the photoreceptor 62. An exposure device 67 is arrange in the upper side of the photoreceptor 62 in figures. The exposure device 67 is connected to the reading sensor 40. A paper feed cassette 68 accommodating papers 70 is arranged below the developing and cleaning device 64.

A laser beam is emitted by the exposure device 67 on a surface of the photoreceptor 62 charged uniformly by the charging device 63 so that an electrostatic latent image is made on the surface of the photoreceptor 62. The electrostatic latent image is visualized by toner fed from the developing and cleaning device 64. The electrostatic latent image is transferred on a paper 70 fed from the paper feed cassette 68 in the region between the photoreceptor 62 and the transfer device 65. Then, the paper 70 is discharged to a discharge tray which is not illustrated by the discharge roller pair 69.

The operation of the first embodiment will be described with reference to the flow chart of FIG. 4, herebelow. At a step Si, the pick up roller 15 is normally rotated as shown in an arrow Y1 to feed the uppermost layer document of the documents 4 accumulated on the document tray 5. The document 4 is fed to the feeding opening 6 of the main carrying path 10. At a step S2, the separation roller 16 is normally rotated. When the pick up roller 15 feeds two documents or more in piled condition, the separation roller 16 separates them. The document 4 which has been inputted into the main carrying path 10 is carried in the normal direction shown by an arrow X1. A tip end of the document 4 passes the document width detection sensor group 23, and then passes the document length detection sensor 24. At a step S3, the width of the document 4 is judged on the basis of the output signal from the document width detection sensor group 23. Concretely, at a step S21 of FIG. 5, it is inspected whether or not the sensors 25a through 25e of the document width detection sensor group 23 detect the document 4. If only the first sensor 25a has turned on, then it is judged that the width of the inputted document 4 is the short side A5S (148 mm) of the A5 size at step S22. If only the first and second sensors 25a, 25b have turned on, then it is judged that the width of the document 4 is a short side B5S (180 mm) of the B5 size at a step S23. If only first through third sensors 25a through 25c have turned on, then it is judged that the width of the document is the short side A4S (210 mm) of the A4 size at a step S24. If the first through fourth sensors 25a through 25d have turned on, then it is judged that the width of the document is the long side B5L (257 mm) of the B5 size at a step S25. If the first through fifth sensors 25a through 25e are all on, then it is judged that the width of the document is the long side A4L (297 mm) of the A4 size at a step S26.

Figure 4:
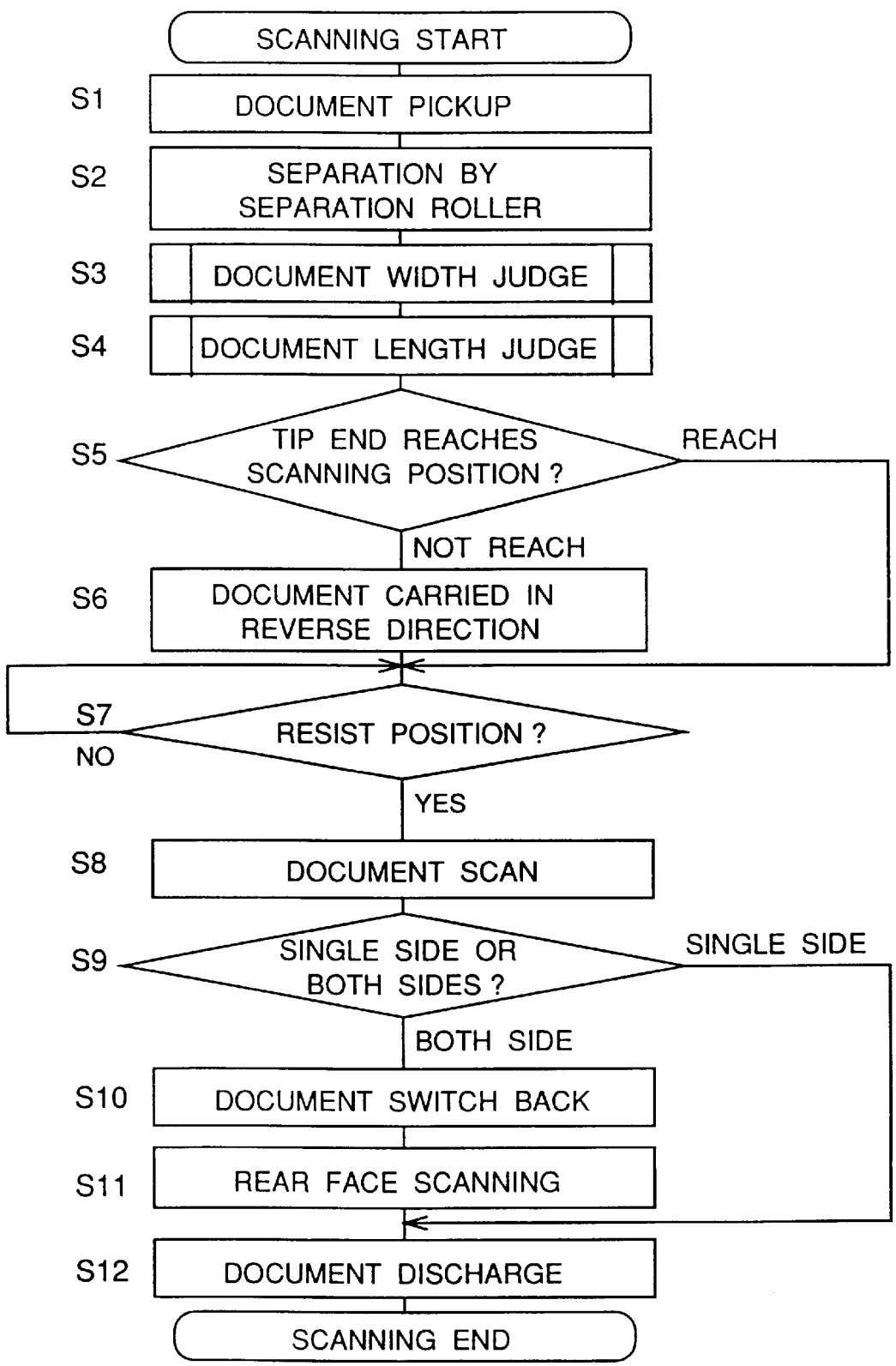
FIG. 4 is a flow chart for illustrating the operation of the first embodiment.
Figure 5:
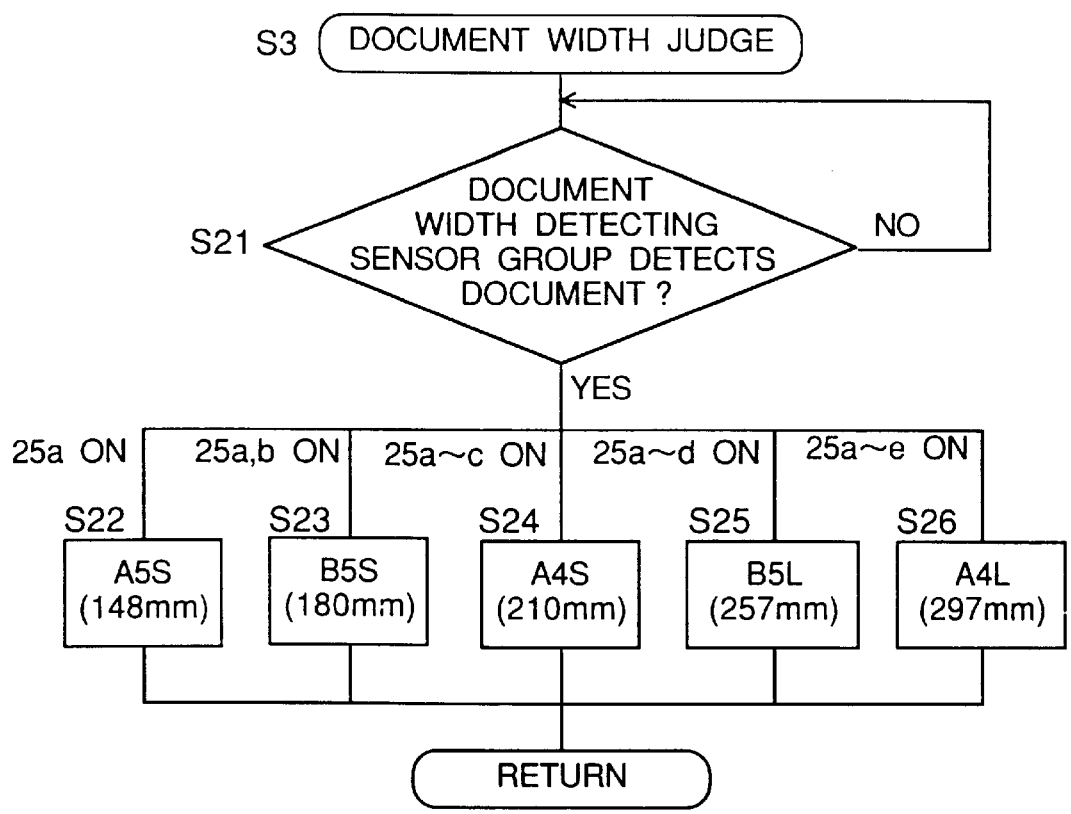
FIG. 5 is a flow chart for illustrating the process of a step S3 in FIG. 4.

At the step S4 in FIG. 4, the carrying direction and length of the document 4 are judged.

Figure 6:
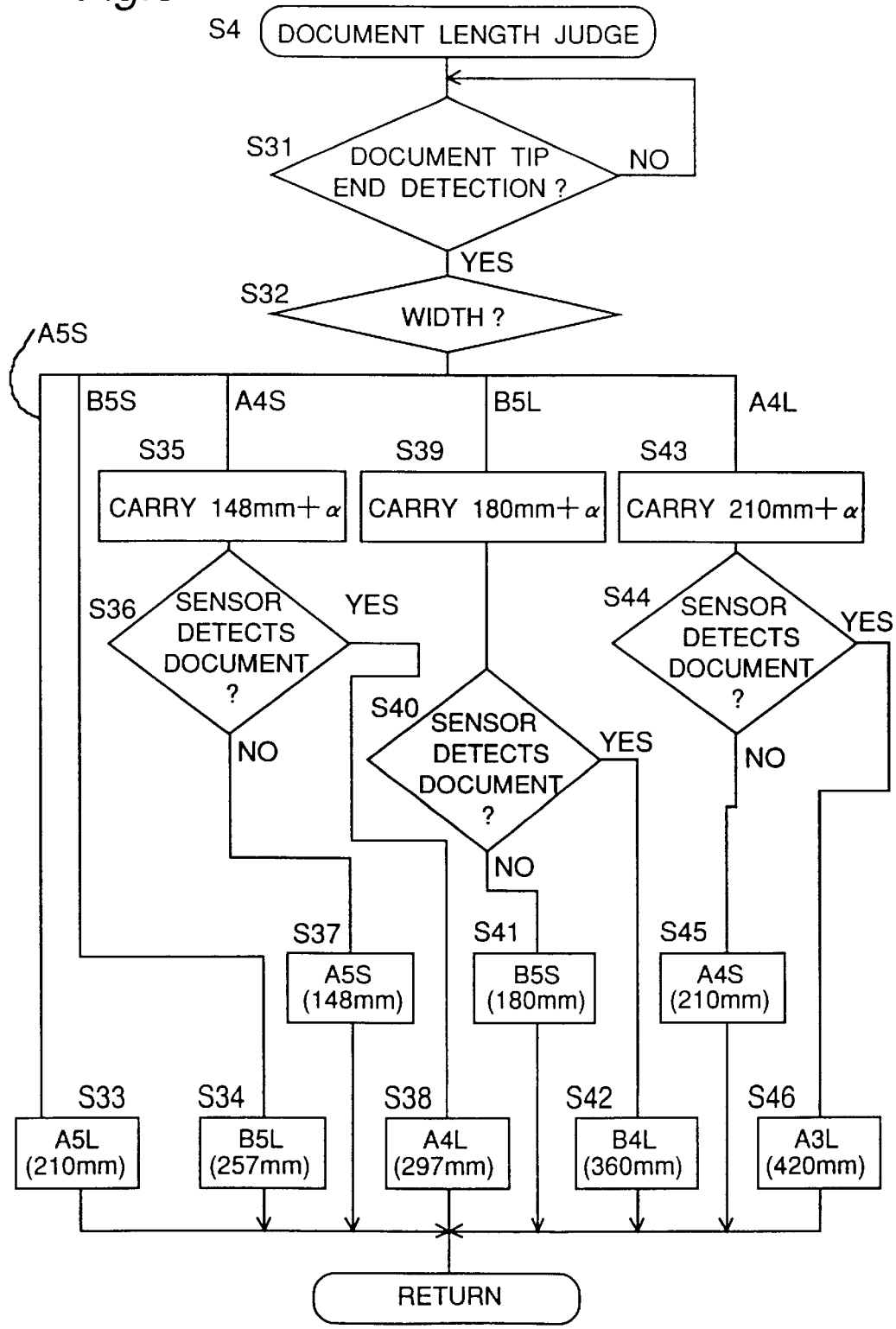
FIG. 6 is a flow chart for illustrating the process of a step S4 of FIG. 4.

Concretely, at a step S31 in FIG. 6, if it is detected that the tip end of the document 4 has passed the document length detection sensor 24, then the width of the document 4 detected at the step S3 in the FIG. 4 is read out at a step S32.

If the width is the short side A5S (148 mm) of the A5 size, then it is judged that the document 4 is an A5 size and is carried in a longitudinal direction at a step S33. Further, it is judged that the length of the document 4 is the long side A5L (210 mm) of the AS size at the step S33. Similarly, if the width is the short side B5S (180 mm) of the B5 size, then the document is the B5 size and is carried in a longitudinal direction at a step S34. Further, it is judged that the length of the document 4 is the long side B5L (257 mm) of the B5 size at the step S34. If the width is the short side A4S (210 mm) of the A4 size, the document size and the carrying direction cannot be judged by only this fact. Namely, the short side A4S of the A4 size is the same in length as the long side A5L of the A5 sizes shown in FIGS. 2B and 2C and FIG. 7, there are two possibilities that the A4 size document is carried in the longitudinal direction and that the A5 size document is carried in the lateral direction. In the former case, the length of the document 4 is the long side A4L (297 mm) of the A4 size. In the latter case, the length of the document 4 is the short side A5S (180 mm) of the A5 size. At a step S35 in FIG. 6, after the tip end of the document 4 passes the document length detection sensor 24, the document 4 is carried by a carrying amount D (D=148 mm+α) where a correcting amount α is added to the long size A5L (148 mm) of the A5 size. Concretely, the rotating speed and the rotating time from the pick up roller 15 through the discharge roller pair 20 are set so that the document 4 is carried by the carrying amount D. At a step S36, it is examined whether or not the document length detection sensor 24 detects the document 4, i.e., the rear end of the document 4 has passed the document length detection sensor 24. If the document 4 is not detected at the step S36, then it is judged that the document 4 of the A5 size is carried in a lateral direction and the length of the document 4 is the long side A5L (148 mm) of the A5 size at a step S37. If the document 4 is detected at the step S36, then it is detected that the document 4 of the A4 size is carried in a longitudinal direction at a step S38. Further, it is judged that the length of the document 4 is the long side A4L (297 mm) of the A4 size at the step S38.

The correcting amount α is added to prevent the error detection. Approximately 5 mm has only to be set in accordance with the dispersion of the document length, the detection margin of the document length detection sensor 24 and so on.

Figure 7:
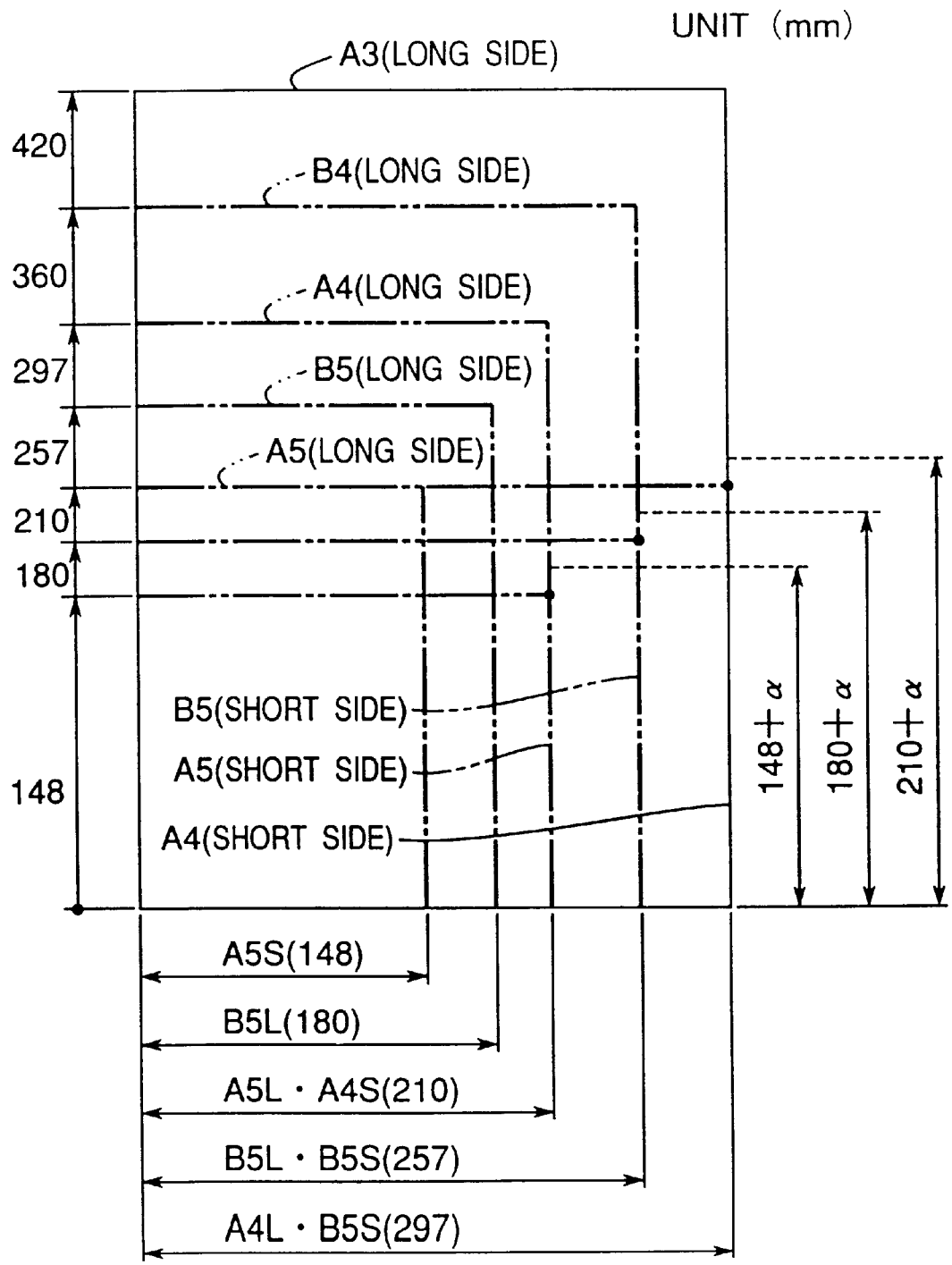
FIG. 7 is a schematic view for illustrating relationship between the long side and the short side.

When the width is judged to be the long side B5L (257 mm) at the step S32, as shown in FIG. 7, there are two possibilities that the document 4 of the B5 size is carried in a lateral direction or that the document 4 of the B4 size is carried in a longitudinal direction. Thus, at a step S39, the document 4 is carried by the carrying length D (D=180 mm+α) where the correction value α has been added to the short side B5S (180 mm) of the B5 size. If the document 4 length detection sensor 24 does not detect the document 4 at a step S40, it is judged that the document 4 of the A5 size is carried in the lateral direction at a step S41. Further, it is judged that the length of the document 4 is the short side B5S (180 mm) of the B5 size at the step S41. If the document 4 is detected at the step S40, then it is judged that the document 4 of the B4 size is carried in the longitudinal direction at a step S42. Further, it is judged that the length of the document is the long side B4L (360 mm) of the B4 size at the step S42.

When the width is judged to be the long side A4L (297 mm) at the step S32, as shown in FIG. 7, there are two possibilities that the document 4 of the AA size is carried in a lateral direction or that the document 4 of the A3 size is carried in a longitudinal direction. Thus, at a step S43, the document 4 is carried by the carrying length D (D=210 mm+α) where the correction value a has been added to the short side A4S (210 mm) of the A4 size. If the document length detection sensor 24 has not detected the document 4 at a step S44, then the document 4 of the A4 size is carried in the lateral direction at a step S45. Further, it is judged that the length of the document 4 is the short side A4S (210 mm) at the step S45. If the document 4 is detected at the step S44, it is judged that the document 4 of the A3 size is carried in the longitudinal direction at a step S46. Further, it is judged that the length of the document 4 is the long side A3L (420 mm) of the A3 size at the step S46.

After the document size and direction have been detected at the step S4, it is judged whether or not the tip end of the document 4 reaches the scanning position 7 at a step S5. Concretely, if the resist sensor 26 detects the existence of the document, then it is judged that the tip end reaches the scanning position 7, so that the step goes to a step S6. At the step S6, the upstream carrying roller pair 17 and the scanning front roller pair 18 are rotated in a reverse direction as shown with an arrow Y2 to carry the document 4 in the reverse direction shown with an arrow X2, and the tip end is returned onto the upstream side from the scanning position 7. At a step S7, it is examined whether or not the resist sensor 26 detects the document. If the resist sensor 26 does not detect the document 4, then it is judged that the document 4 has been returned to the given position and the step goes to a step S8.

If the resist sensor 26 does not detect the existence of the document at the step S5, then it is judged that the tip end of the document 4 does not reach the scanning position 7. In this case, the step goes to a step S7, because the document is not necessary to be carried in the reverse direction.

At a step S8, the document scanning is carried out. Concretely, the upstream carrying roller pair 17, the scanning front roller pair 18, the scanning rear roller pair 19 and the discharge roller pair 20 are normally rotated as shown with an arrow Y1, so that the document 4 is carried at a half speed of that when the document size are detected. Light beam is radiated from the light source 37 upon a document 4 which has reached the scanning position 7. The reflection beam reaches the reading sensor 40 through the mirror 38 and the lens 39. The reflection beam is image-formed at the reading sensor 40 so as to convert the images into the image data. The image data outputted by the reading sensor 40 are fed to the exposure device 67 of the image forming portion 60 through the image data process portion 66.

At a step S9, it is judged whether scanning is conducted on a single side or both sides. In the case of the single side scanning, the step goes to a step S12, and the document 4 which has been scanned is discharged to the document discharge portion 8 by the normally rotating of discharge roller pair 20.

If the both sides scanning operation is conducted at the step S9, then the reversing operation of the document 4 is conducted at a step S10. Concretely, if the switch back sensor 27 detects the existence of the document 4 no more, then the discharge roller pair 20 is rotated in a reverse direction to reverse the carrying direction of the document 4 since the rear end of the document 4 has passed the mylar plate 33. Thus, the tip end (rear end of the document 4 when the scanning is conducted) of the document 4 is guided to the recarrying path 30 by the mylar plate 33. Further, the document 4 lifts up the mylar plate 34 and returns to the main carrying path 10. At a step S11, the rear face of the document 4 is scanned as same as at the step S8.

In the present embodiment, the document 4 is carried in the normal and reverse directions on the main carrying path 10 set shorter than the length of the maximum size document (the long side A3L of the A3 size), thereby detecting and scanning the document size. Accordingly, time required to scan the individual document 4 is shortened as compared with the required time in a case where the conventional document circular feeding apparatus is used. Further, the auto document feeder 4 can be made smaller in size since it is no need to provide a feeding path for sending back the document to the document stack portion.

Second Embodiment

Figure 8:
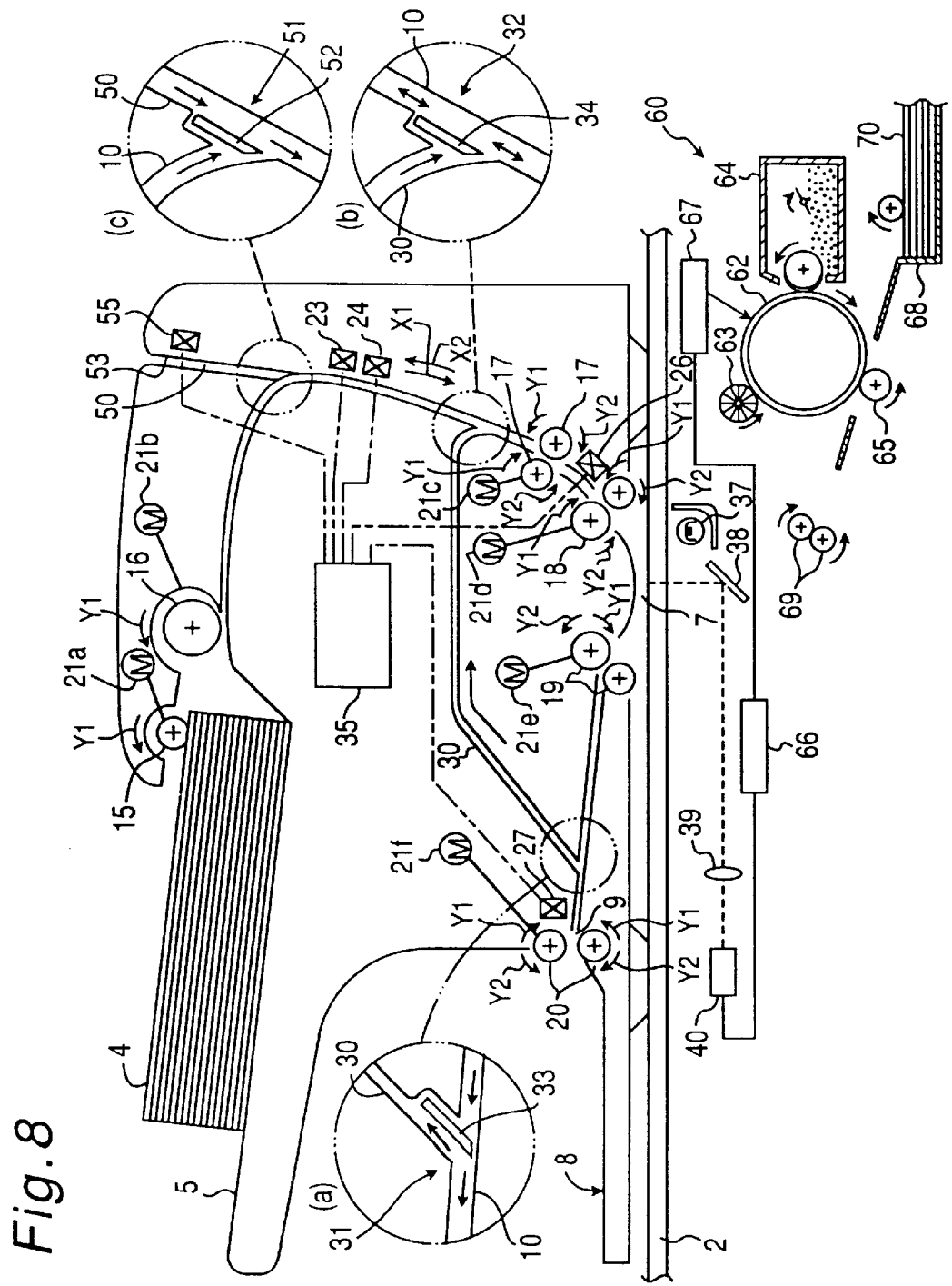
FIG. 8 is a schematic configuration view showing a document scan apparatus according to the second embodiment of the present invention.

FIG. 8 shows a second embodiment of this invention.

In the second embodiment, an interruption carrying path is provided. The interruption carrying path is merged into the main carrying path 10 on the upstream side higher than a portion 32 (see a portion (b) in FIG. 8) in which the refeeding path 30 is remerged into the main carrying path 10. In a portion 51 where the main carrying path 10 is connected with the interruption carrying path is provided a Mylar® plate 52 for regulating the carrying direction of the document 4 to prevent the document, which has been carried from the document tray 5, from being carried to the interruption carrying path. An input opening 53 of the interrupting document is provided in one end of the interruption carrying path. An interruption detection sensor 55 is provided near the input opening 53 of the interruption carrying path. The document width detection sensor group 23 and the document length detection sensor 24 are provided on the main carrying path 10 downstream side lower than the merging portion 51 so that both the length and width of the document 4 to be fed from the document tray 5 and the document 4 to be inputted from the input opening 53 can be detected.

In the second embodiment, the interruption detection sensor 55 detects the inputting of the interrupting document 4 from the input opening 53 by an operator to suspend the pick up rollers 15 and the separation rollers 16, thereby suspending the feeding of the document 4 from the document tray 5. The interrupting document 4 inputted from the input opening 53 is scanned on its single side or both sides by the same process as that of the document 4 fed from the document placement stand 5 (See steps S4 through S12 in FIG. 4).

The detailed description is omitted with the same reference numerals being given to the same elements, because the second embodiment is similar in other configurations and operations to the first embodiment.

Third Embodiment

A third embodiment of the present invention will be described.

Figure 9:
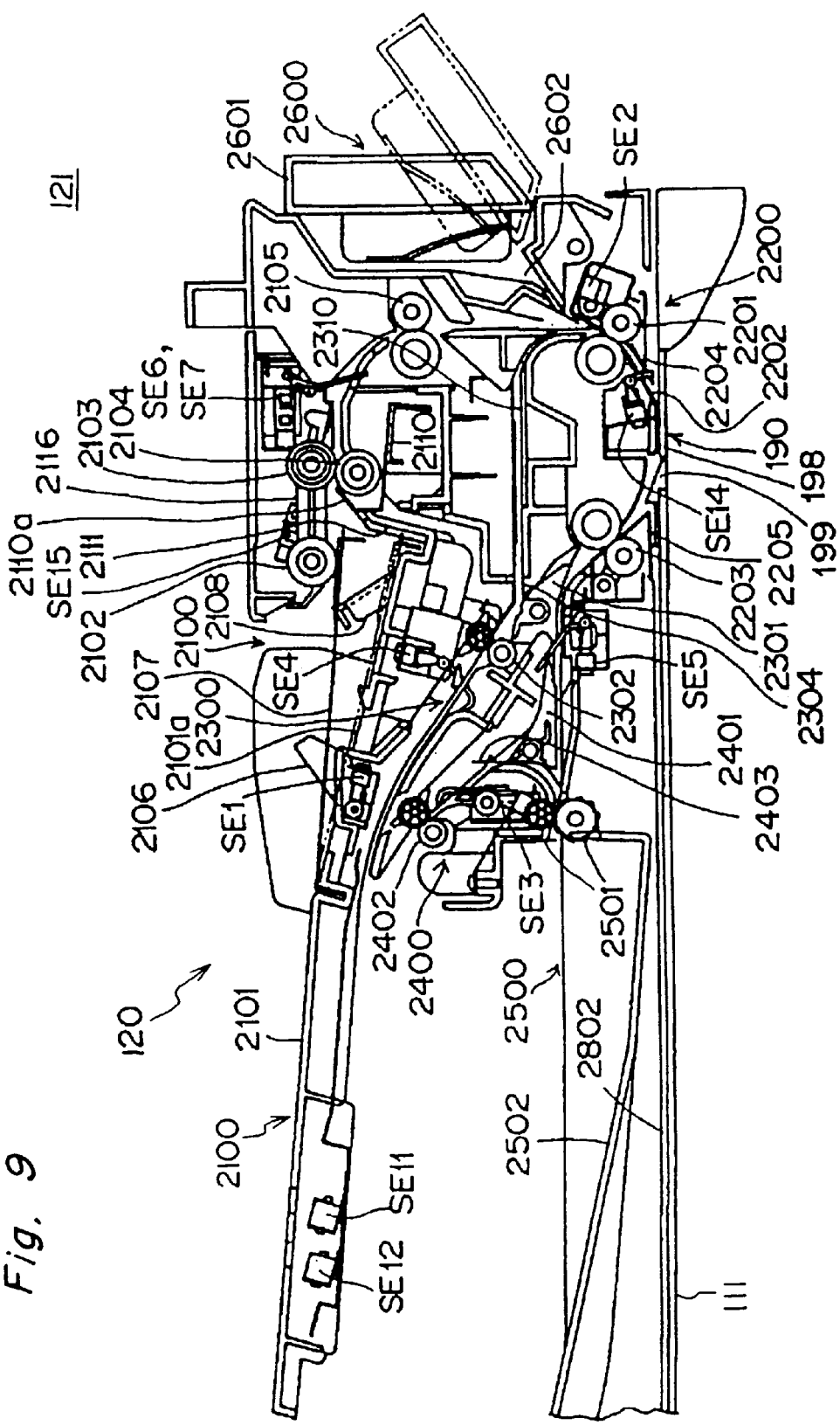
FIG. 9 is a schematic configuration view showing a document scan apparatus according to the third embodiment of the present invention.
Figure 10:
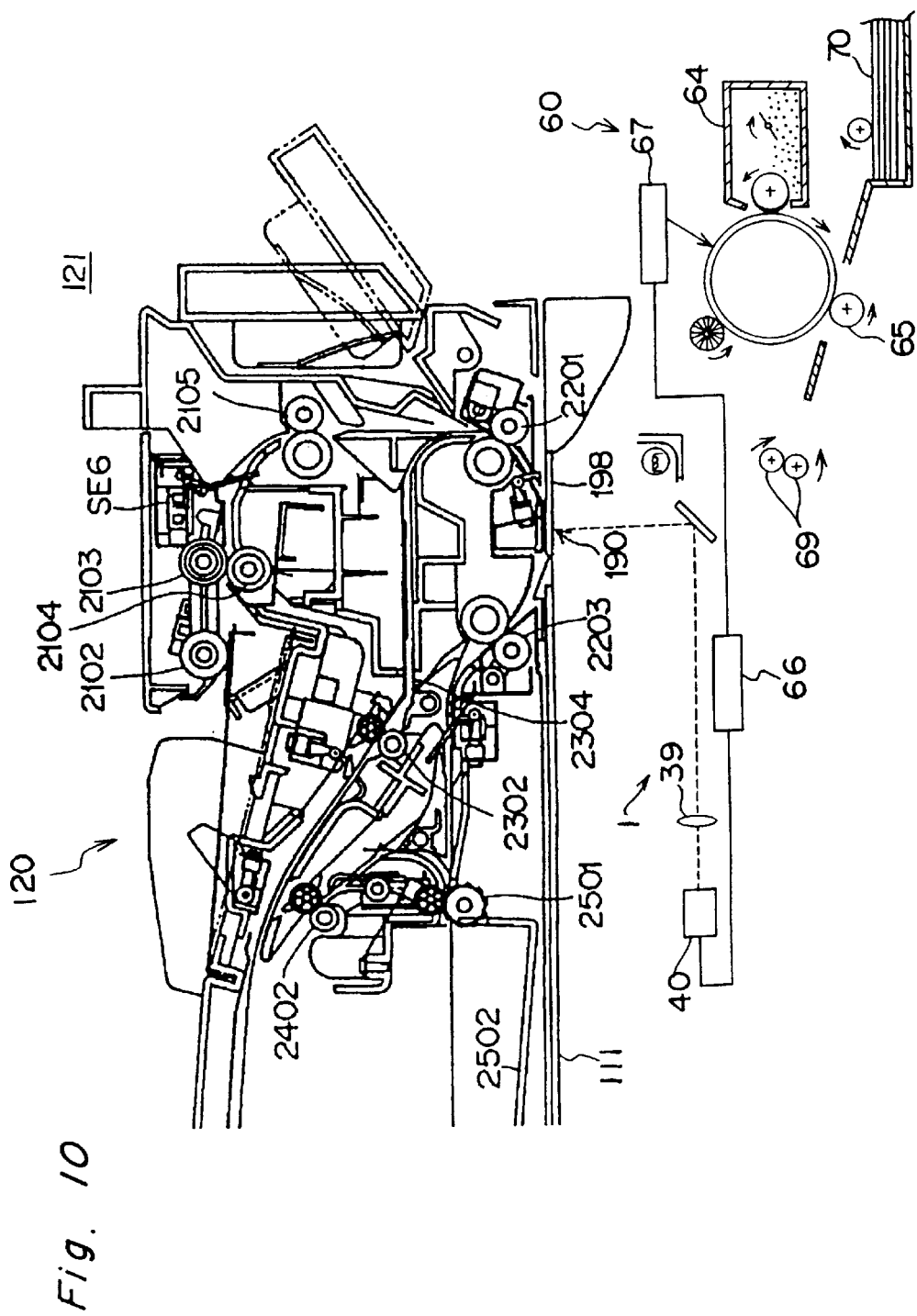
FIG. 10 is an enlarged view of the essential part of FIG. 9.
Figure 11:
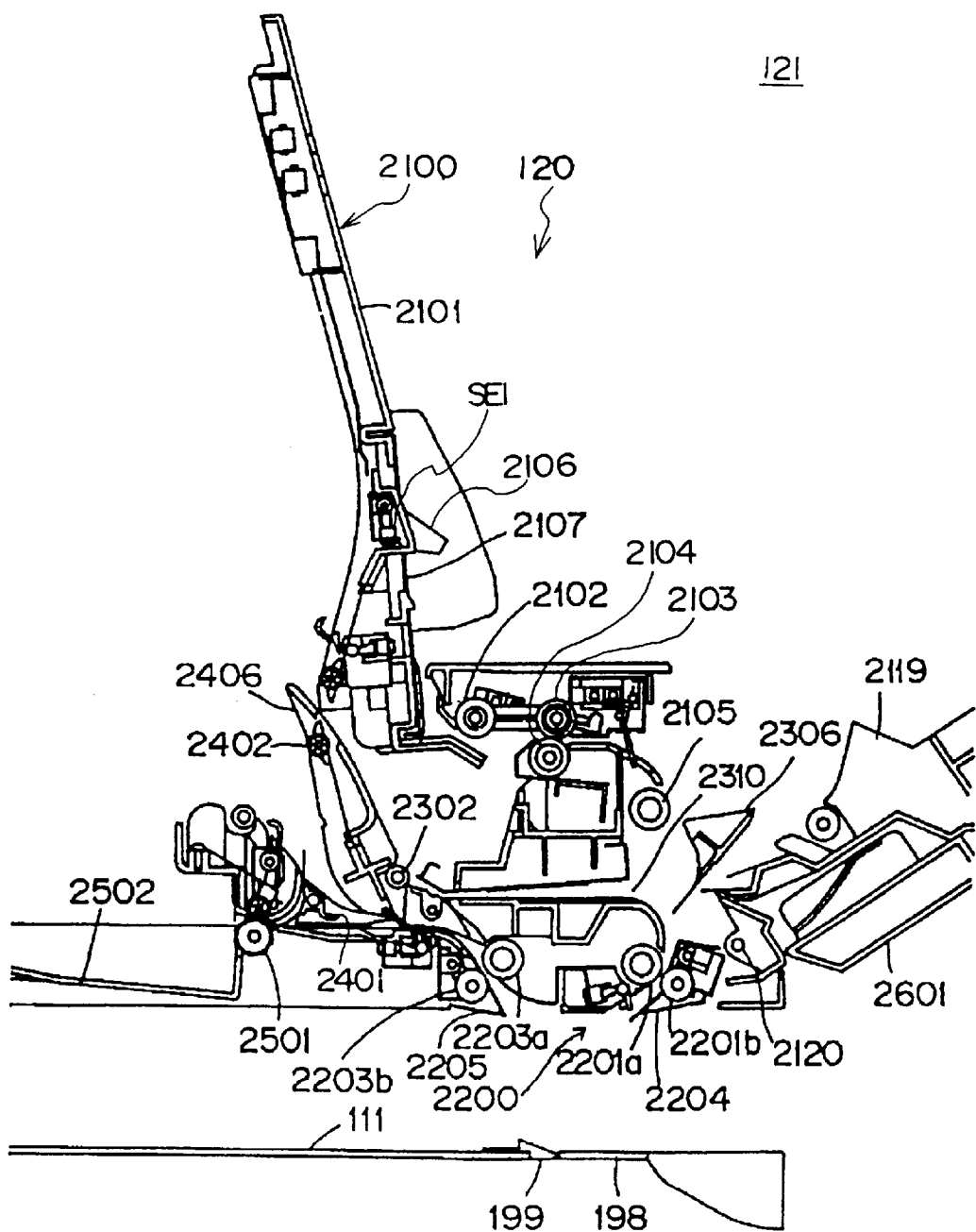
FIG. 11 is an enlarged view of the essential part of FIG. 9.

A copying machine shown in FIGS. 9 through 11 is provided with a document scan apparatus comprising an auto document feeder 120 and a scanner 1, and an image forming portion 60.

The auto document feeder 120 is constituted by main portions described herebelow.

A paper feeding portion 2100 comprises a document tray 2101, a pick up roller 2102, a paper feeding roller 2103, a separation roller 2104, and an upstream roller pair 2105.

The document scan portion 2200 comprises a scanning front roller pair 2201, a pressure contact guide plate 2202, a scanning rear roller pair 2203, an introducing guide plate 2204, and an exit guide plate 2205.

A circulating reversion portion 2300 for composing a reversing path for reversing the front side and the rear side of the document which has passed the scanning position comprises a switching claw 2301, a circulating reversion roller pair 2302, and a circulating carrying path 2310.

A paper discharge and reversion portion 2400 comprises a switching claw 2401, and a paper discharge and reversion roller pair 2402.

A paper discharge portion 2500 comprises a paper discharge roller pair 2501, and a paper discharge tray 2502.

A manual paper feeding portion 2600 comprises a manual paper feeding tray 2601 and a manual paper feeding insertion opening 2602.

A document holding plate 2802 retains documents set manually on a platen glass 111.

The document scan apparatus 121 can execute a single side document mode for scanning the images of the single side document having images only on the single side, a both sides document mode for scanning the images of the both sides document having images on a first side and a second side, and a single paper feeding mode for processing the documents of types which are not suitable for automatic separate-paper feeding operation by the paper feeding portion 2100.

A front half portion of the document tray 2101 constitutes an inclined portion 2101a. A tip end regulating plate 2111 is provided at the tip end of the inclined portion 2101a. A lift up plate 2107 is vertically movable in the matter where left side of it acts as a support point. The lift up plate 2107 lies normally in the same surface as the inclined portion 2101a.

The document is set on the document tray 2101 with its tip end being adjusted into the regulating plate 2111. When the rising of the driving lever 2108 by the lift up motor causes the rising of the lift up plate 2107, the topmost layer of the documents comes into pressure contact with the pick up roller 2102. The pick up roller 2102 is supported by an arm 2116. The pick up roller 2102 is vertically movable in the manner where a support axle of the paper feeding roller 2103 acts as a supporting point. Further, the pick up roller 2102 is urged downwards by its dead weight and a spring not shown. The pick up roller 2102 goes upwardly by rising of the lift up plate 2107 driven by the driving lever 2108. The driving of the driving lever 2108 is stopped when a top face detection sensor SE15 detects that the arm 2116 rises at given position.

The detecting condition of the top face detection sensor SE15 is usually monitored. When the top face detection sensor SE15 comes into a non-detecting condition by the lowering of the pick up roller 2102, the lift up plate 2107 is raised by the driving lever 2108. The pick up roller 2102 picks up the document at given height and with given pressure contact force, so as to feed the document from the given height. Accordingly, the tip end of the document contacts with a front pre-separation guide piece 2110a at a given angle and at a given height in spite of the remaining amount of the documents, so that the stable paper feeding operation is retained.

The pre-separation guide piece 2110a provided on the holder 2110 is arranged so as to be inclined upwardly from the upper end of the tip end regulating plate 2111. Further, a tip end of the pre-separation guide piece 2110a is close, with a slight gap, to the nip portion between the paper feeding roller 2103 and the separation roller 21104. Although a plurality of documents are carried together by the pick up roller 2102, the upper layer of documents can be separated to go ahead due to that the tip end of the upper layer documents contact with the pre-separation guide piece 2110a. As the result, only two or three documents are thrust into between the paper feeding roller 2103 and the separation roller 21104.

The paper feeding roller 2103 is rotated in anti-clockwise. Of a plurality of documents pushed into between the paper feeding roller 2103 and the separation 2104, one sheet of the uppermost layer is only fed toward the right by the paper feeding roller 2103, to prevent the other documents from going forwards by the separation roller 2104. Namely, the paper feeding roller 2103 is rotated in a fixed position shown in FIG. 9, and the separation roller 2104 is provided rotatably with the holder 2110 and is elastically urged to the paper feeding roller 2103 through the holder 2110 by a spring not shown. A torque limiter is mounted on the separation roller 2104. The torque of the torque limiter is set to a value so that the separation roller 2104 is rotated in anti-clockwise by the frictional force between the separation roller 2104 and the document to be carried by the paper feeding roller 2103 when only one document is interposed between the paper feeding roller 2103 and the separation roller 2104 during the paper feeding roller 2103 rotates. When a plurality of documents are thrust into between the paper feeding roller 2103 and the separation roller 2104, the rotation of the separation roller 2104 is stopped, so as to prevent the document positioned under the uppermost layer document and carried by the paper feeding roller 2103 from advancing.

The documents are stacked on the document tray 2101 with its first page being directed upwards. When a copy start key (not shown) is pushed by an operator (in the paper feeding of the first paper) or when the empty sensor SE1 is in a document detecting condition due to pushing an actuator lever 2106 on the document tray 2101 by the documents (in a second and its subsequent paper feeding), the pick up roller 2102 is rotated in anti-clockwise, so as to feed the documents to the right in FIG. 9.

The picked up documents are preliminarily separated by the pre-separation guide piece 2110a and are separated into one piece by passing through between the paper feeding roller 2103 and the separation roller 2104.

The subsequent document carrying operation will be described separately between the single side document and the both sides document.

In the single side document mode, the document separated into one sheet is carried by the upstream carrying roller pair 2105. The upstream carrying roller pair 2105 stops the rotating after lapse of the given time period from the detection of the tip end of the document by a resist sensor SE2, namely, when the tip end of the document has been curved in proper amount by contacting with the nip portion of the scanning front roller pair 2201 in the suspended rotation. Thus, the tip end of the document is aligned by the nip portion of the scanning front roller pair 2201, so as to correct its inclination.

The scanning front roller pair 2201 and the scanning rear roller pair 2203 are rotated so that the document is carried on the slit glass 198, being in pressure contact against the guide plate 2202. At this time, the document images are scanned by the scanner 1. The upstream carrying roller pair 2105 is rotated till the rear end of the document passes the nip portion.

The document guided by the under faces of the switching claws 2301 and 2401 is carried to the left from the scanning rear roller pair 2203, and is discharged onto the paper discharge tray 2502 from the paper discharge roller pair 2501 with the image face being downwards directed. When the rear end of the prior document is detected by the separation sensor SE6 to be described later, the next document is fed.

The rotating speed of the scanning front roller pair 2201 and the scanning rear roller pair 2203 is changed based on the copy magnification, and the rotating speed of the intermediate carrying roller pair 2105 is also changed. The carrying speed of the scanning front roller pair 2201 and the scanning rear roller pair 2203 is automatically set to V*m, wherein the carrying speed at the equalmagnification of the scanning front pair 2201 and the scanning rear roller pair 2203 is "V" (which is equal to the rotation peripheral speed of the photosensitive drum not shown) and the copy magnification is "m".

The document scanning by the scanner 1 starts after a constant time period from the detection of the document tip end by the scanning sensor SE14 set immediately after the first scanning roller pair 2201. Namely, by monitoring the driving amount of the carrying motor M2 (described hereinafter) of the scanning front roller pair 2201 and the scanning rear roller pair 2203 from the detection of the document tip end by the scanning sensor SE14, the timing when the tip of the document reaches the document scanning portion so as to start the document scanning.

The manual feeding insertion opening 2602, formed on the upstream side of the scanning front roller pair 2201, is opened by outward leveling of the manual paper feeding tray 2601. When an operator inserts the document into the insertion opening 2602 to bring it into contact with the nip portion of the scanning front roller pair 2201, the document is carried on the slit glass as the single face document by the rotation of the scanning front roller pair 2201 and the scanning rear roller pair 2203 so that the images are read. The rotation of the scanning front roller pair 2201 and the scanning rear roller pair 2203 is started after a constant time period from the detection of the tip end of the inserted document by the resist sensor SE2.

In a both sides document mode, the both sides document fed from the document tray 2101 is carried on the slit glass by the scanning front roller pair 2201 and the scanning rear roller pair 2203, so as to conduct image scanning operation of a first side of the document. At this time, the switching claw 2301 is set in a position rotated slightly anti-clockwise as compared with a position shown with solid lines in FIG. 9. Thus, the document whose first side image scanning has been conducted is carried to the circulating reversion roller pair 2302 and guided with the inclination face of the switching claw 2301. When the rear end of the document passes the resin film 2304 for preventing the reverse running, the reversion roller pair 2302 is rotated in the reverse direction so that the document is fed to the circulating carrying path 2310 with the document being reversed in front and rear. Then, the document is reversed in sides, and carried toward the scanning front roller pair 2201. The tip end comes into contact with the nip portion of the scanning front roller pair 2201 which is stationary in the rotation. The rotation of the reversion roller pair 2302 stops when the document has been curved by a proper amount. Thus, the document tip end is adjusted to correct the inclination.

Then, the scanning front roller pair 2201 and the scanning rear roller pair 2203 are rotated so that the document is carried onto the slit glass 198 with a second side (rear side) being directed downwards, and the image scanning of a second side is conducted. At this time, the switching claw 2301 is returned to the position shown with solid lines in FIG. 9, and the switching claw 2401 is set in a position rotated slightly anti-clockwise, as compared with a position shown with solid lines in FIG. 9. Accordingly, the document whose second side image scanning has been conducted is carried to the paper discharge and reversion roller pair 2402, being guided by the lower face of the switching claw 2301 and the upper face of the switching claw 2401. When the rear end of the document passes the resin film 2403 for preventing the reverse running, the paper discharge reversion roller pair 2402 is rotated in reverse direction so that the document reversed in front/rear and in sides is discharged onto the paper discharge tray 2502 by the paper discharge roller pair 2501, being guided by the resin film 2403 for preventing the reverse running. At this time, the document is discharged with the first side (top side) being directed downwards and is arranged in page order. In this both sides document mode, when the rear end of the document is detected by the resist sensor SE2 during the second side scanning operation, the paper feeding of the next document starts.

Figure 12:
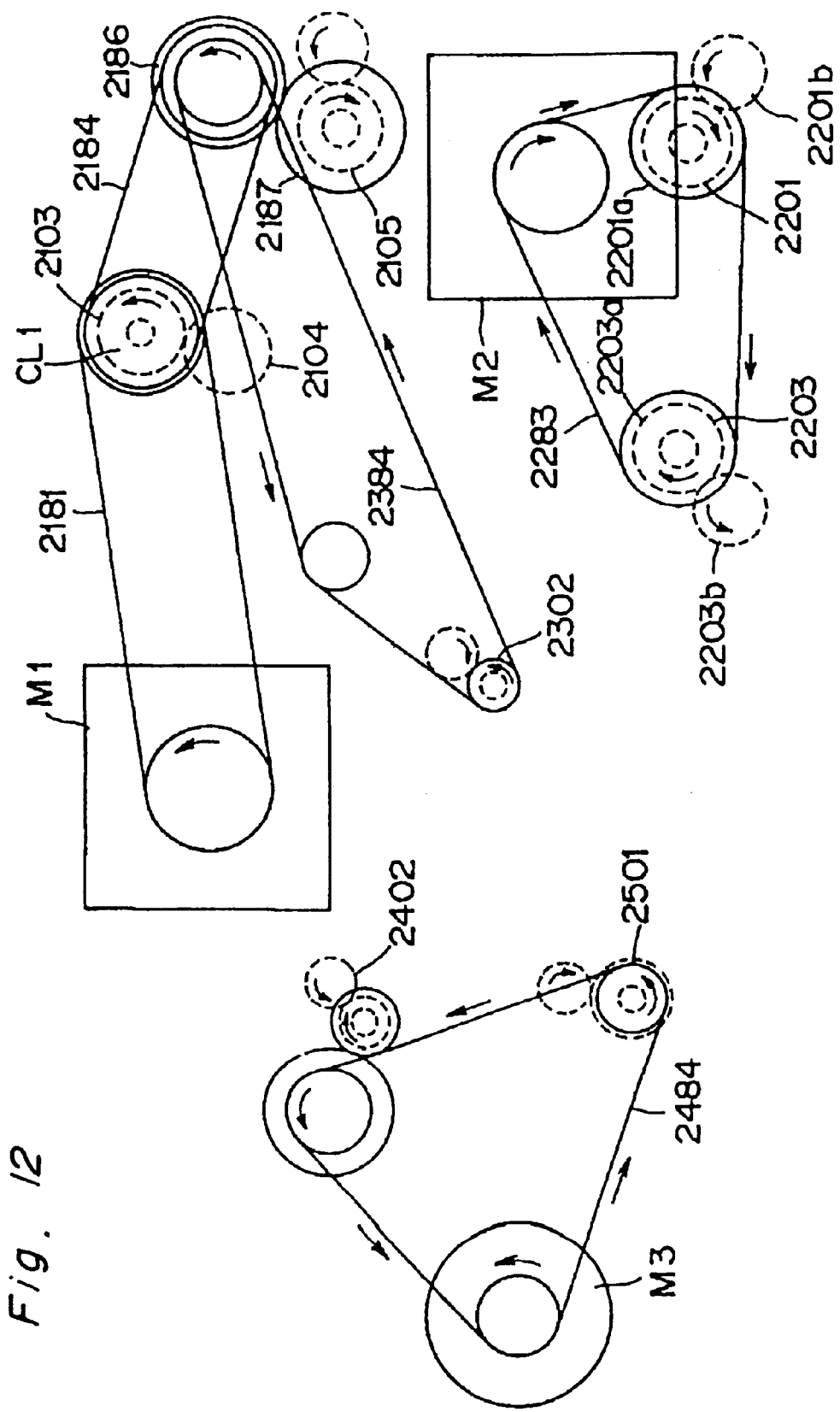
FIG. 12 is a schematic view showing the roller driving mechanism.

In order to execute the above operation, as shown in FIG. 12, the paper feeding roller 2103, the upstream carrying roller pair 2105 and the reversion roller pair 2802 are driven by the a paper feeding motor M1 capable of the normal and reverse rotation. The paper feeding roller 2103 is rotated by a belt 2181 through a clutch CL1. Rotating forth is transmitted to the pick up roller 2102 through the paper feeding roller 2103. When the document is carried by the scanning front roller pair 2201 and the scanning rear roller pair 2203, the clutch CL1 is turned off and the pick up roller 2102 and the paper feeding roller 2103 are pulled by the document to be rotated. In order to reduce the following resistivity, a one-way clutch is equipped with the pick up roller 2102 and the paper feeding roller 2103. The upstream carrying roller pair 2105 is rotated through a belt 2184, gears 2186 and 2187, not through the clutch CL1. The reversion roller pair 2302 is rotated through the belt 2384. When the upstream carrying roller pair 2105 is rotated in a direction so that the document is carried toward the scanning front roller pair 2201, the reversion roller pair 2302 is rotated in a direction so that the document is carried upwardly to the left.

The scanning front roller pair 2201 and the scanning rear roller pair 2203 are rotated by the carrying motor M2 through the belt 2283.

The discharge and reversion roller pair 2402 and the paper discharge roller pair 2501 are rotated by the paper discharge motor M3 capable of forward and backward rotations through the belt 2484. When the paper discharge reversion roller pair 2402 is rotated in a direction so that the documents is carried downwards to the right, the paper discharge roller pair 2501 is rotated in a direction so that the document is discharged onto the paper discharge tray 2502. The document scan apparatus 120 carries out the single side document mode and the both sides document mode according to the selection by an operator. When a plurality of documents are set onto the document tray 2101, the document feeding/carrying operation is conducted one by one. When the number of document set by the operator is plural, the image data read by the scanner 1 is stored in a memory of the image data process portion 66 temporally. Then, the image forming portion 60 carries out the image forming process in accordance with the number of the copies.

To detect the document size, the length size of the document is classified into a plurality of types on the document tray 2101. Thus, the rear end portion of the document tray 2101 is provided with the length size sensors SE11 and SE12. The length of the document is classified into three types by the length size sensors SE11 and SE12.

A separation sensor SE6 and five sensors SE7-1 through SE7-5 are provided immediately after the paper feeding roller 2103. The signals of the sensors SE7-1 through SE7-5 are inputted independently into a CPU 3000.

Figure 13:
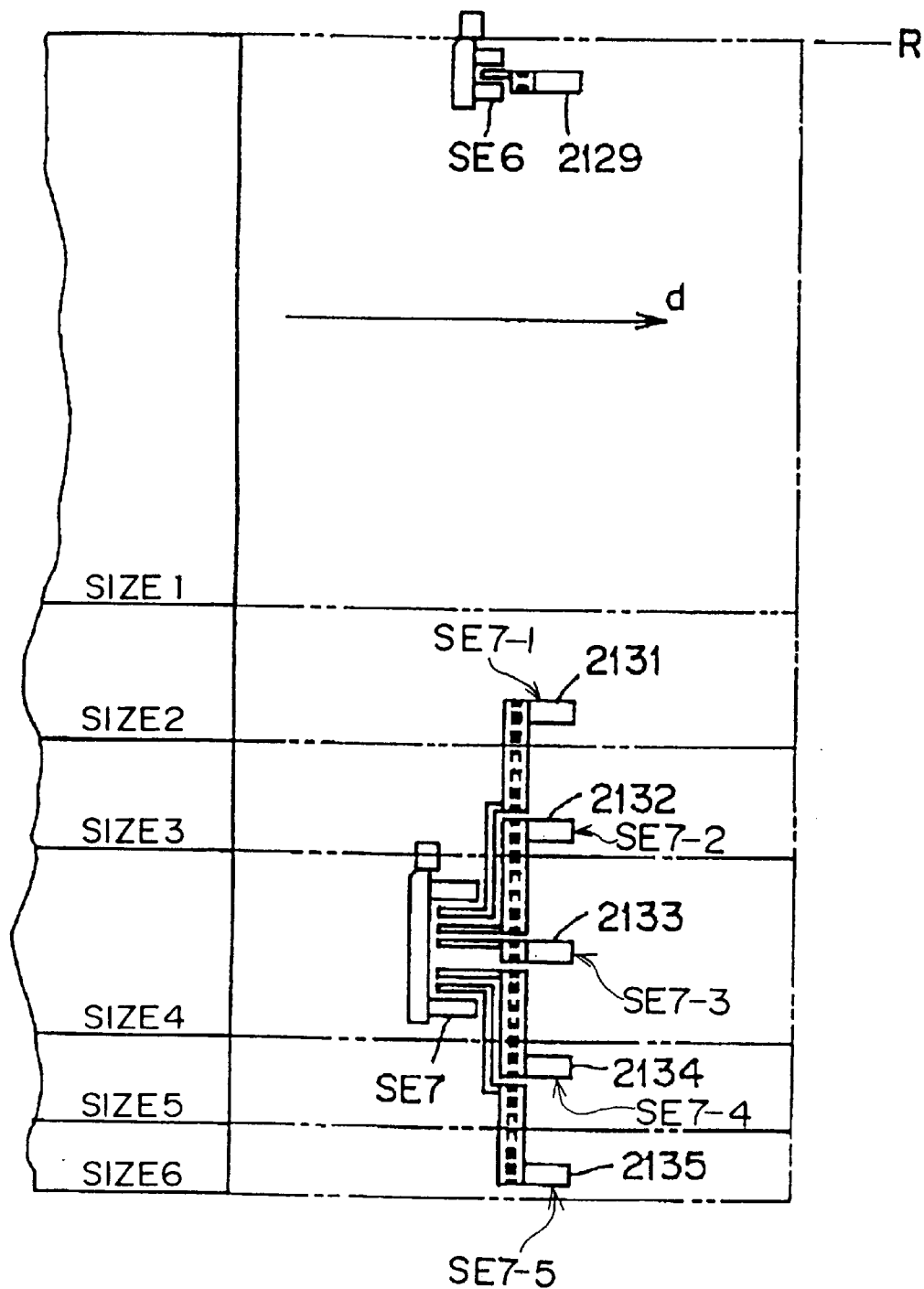
FIG. 13 is a schematic view for illustrating relationship between sensors and a document.
Figure 14:
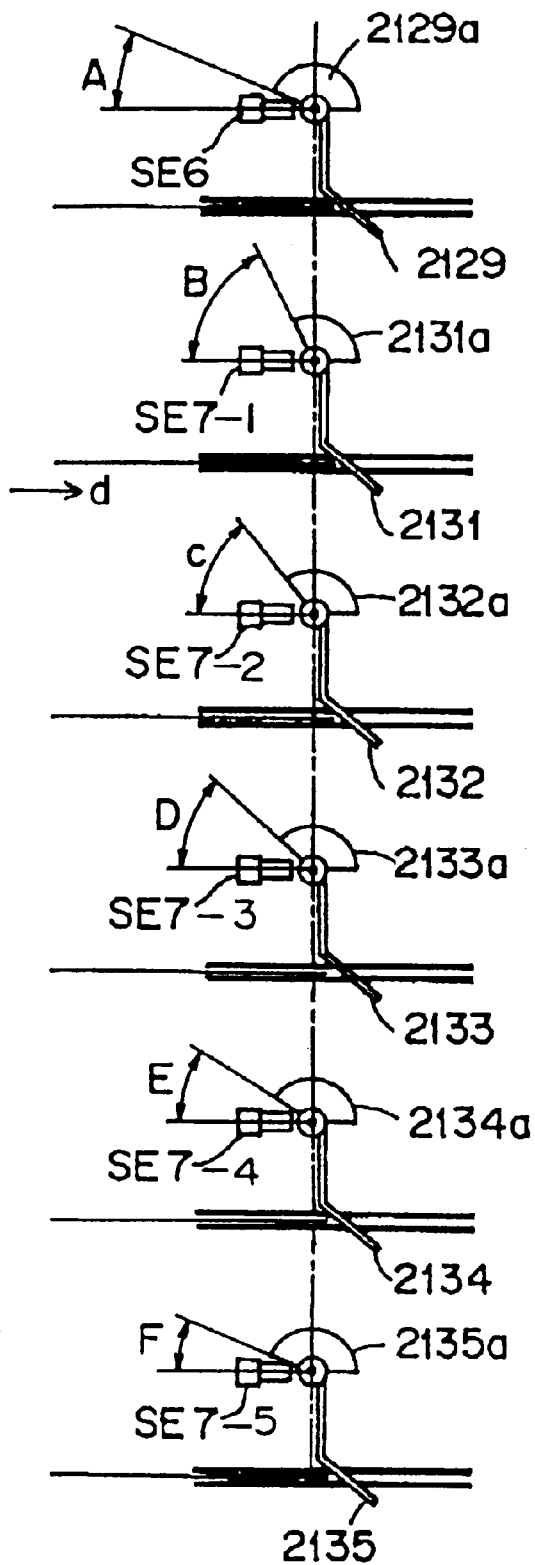
FIG. 14 is a schematic view showing a sensor SE6 and sensors SE7-1 through SE7-5.
Figure 15:
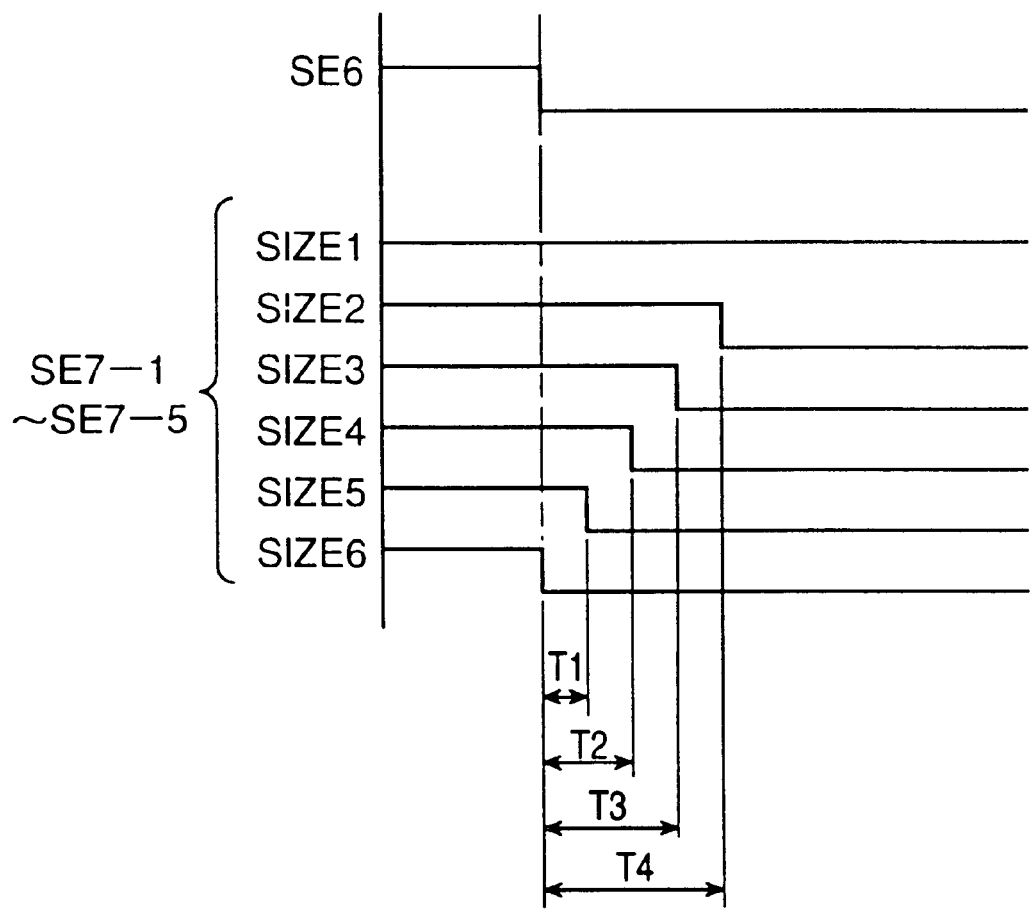
FIG. 15 is a diagram illustrating an example of a document length detection logic.

As shown in FIG. 13, the documents are carried in a direction shown by an arrow d with one side being aligned with the reference line R. The separation sensor SE6 is provided on the side of the reference line R so that the documents of any size can be detected. The sensors SE7-1 through SE7-5 are arranged on the opposite side of the separation sensor SE6. The separation sensor SE6 and sensors SE7-1 through SE7-5 are optical sensors of transmission type. The separation sensor SE6 is provided with the lever 2129 interfering with the document. The sensors SE7-1 through SE7-5 are provided with independently rotatable levers 2131 through 2135 each interfering with the documents. The levers 2129 and 2131 through 2135 are arranged in a straight line in a direction orthogonal to the document carrying direction d and advance into the document path by the dead weight, and are operated with the same timing by the tip end of the document to be carried in the direction shown by the arrow d. The levers 2131 through 2135 correspond to the sizes 2, 3, 4, 5, and 6 in accordance with the document width sizes of regular sizes. The document of the minimum width size 1 activates only the lever 2129 of the separation sensor SE6. As shown in FIG. 14, the levers 2129 and 2131 through 2135 have light shielding pieces 2129a and 2131a through 2135a. The respective light shielding angles are A through F, where A is equal to F and the relationship of F<E<D<C<B is set. Therefore, when one document has passed the separation sensors SE6 and SE7-1 through SE7-5, the detection signals of the separation sensors SE6 and SE7-1 through SE7-5 are generated at such a timing shown in FIG. 15. The absence of theses signals and time differences $T_1$, $T_2$, $T_3$, and $T_4$ are monitored in order to decide the width size of the document.

In this embodiment, the closer to the reference line R, the more slowly the sensors SE6 and SE7-1 through SE7-5 transmit the size detection signal. It is because that the judging logic shown in FIG. 15 can be adapted even though the detection of the document tip end on the side opposite to the reference line R by the sensors SE7-1 through SE7-5 is delayed. Supposed that the detection is conducted sequentially from the lever 2131 for detecting the small size document, a large width size document may be detected as a small width size document wrongly since the lever 2131 operates faster than other levers.

The separation sensor SE6 is not required by any means. Some reference signal can be used instead of the separation sensor SE6. The length of the document can be detected by the combination of the sensor (for example, sensors SE6 and SE2) and the counter during the carrying operation, except for the length size sensors SE11 and SE12.

In order to realize speedy control of copying in the various modes of the copying machine main body, the document size is preferable to be decided as soon as possible. The document size can be detected earliest on the tray 2101. But when the documents of various sizes are stacked mixedly, each document size cannot be detected on the tray 2101. Thus, when the separation sensors SE6 and the sensors SE7-1 through SE7-5 are provided immediately after the paper feeding roller 2103, the size of the next document to be copied can be detected at the earliest timing.

When the documents of the same size are set on the tray 2101, the size can be determined immediately after the starting of the paper feeding operation of the first document. When the documents of different size are mixedly stacked, the size is determined at a time point when the rear end of each document passes the separation sensor SE6 and the sensors SE7-1 through SE7-5. Thus, time required to start the paper feeding operation of the copy sheets by the copying machine main body can be made shortest. Hence, the copying time for the first document can be made shorter and the copying productivity can be increased.

When the copying sheets sorting, operation in the 2 in 1 mode, 4 in 1 mode or the like is conducted with the image data being stored in the copying machine main body, the number of the images which can be processed for working the image data depends upon the memory capacity. But, sufficient memory cannot be loaded often due to the higher cost of memory. Thus, by judging the document size before scanning the document images, the image data can be processed with the minimum memory capacity without reducing the copying productivity.

Figure 16:
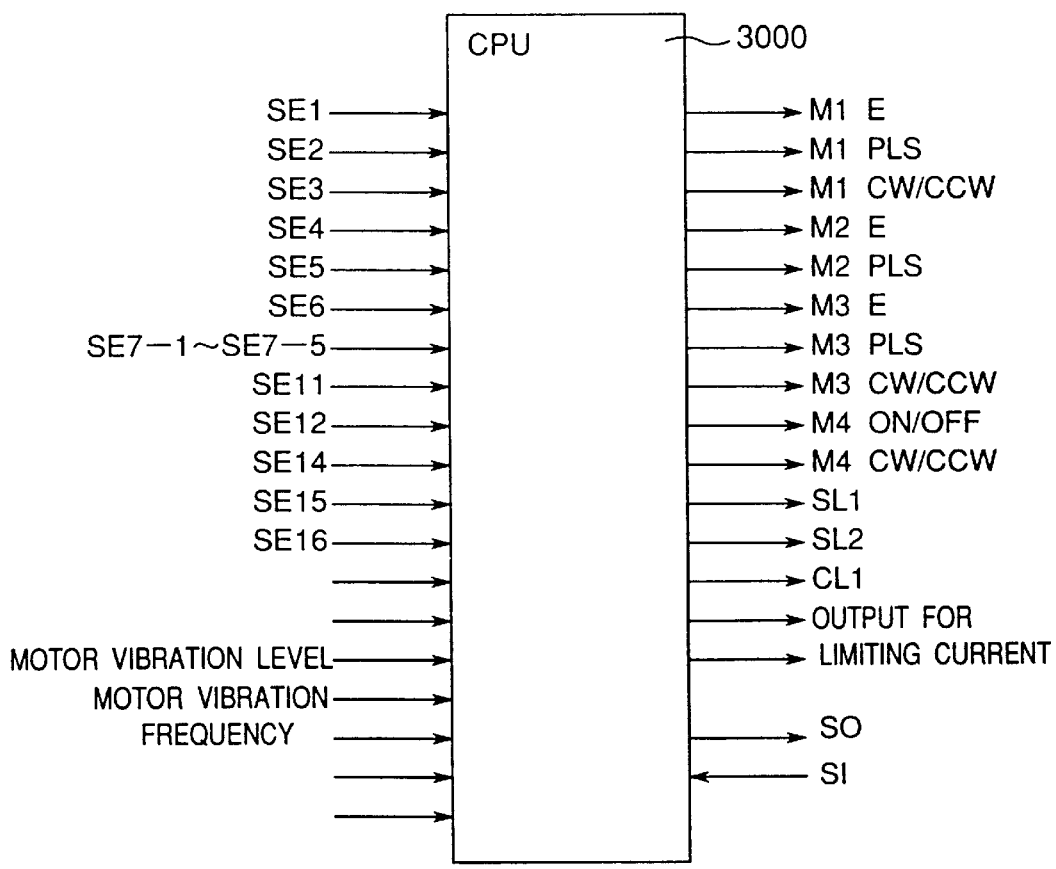
FIG. 16 is a schematic configuration view showing a control circuit.

FIG. 16 shows a schematic configuration of the controlling circuit of the document scan apparatus 121. The controlling circuit is composed with a CPU 3000 to which signals of the sensors shown below are inputted and which outputs controlling signals to motors, solenoids and so on.

The sensors will be described hereinafter.

A symbol SE1 denotes an empty sensor for detecting whether or not the document is set on the document tray 2101. When the empty sensor SE1 turns off, the document is detected.

A symbol SE2 denotes a resist sensor provided before the scanning front roller pair 2201 and detecting the document. When the resist sensor SE2 turns on, the document is detected. The resist sensor SE2 is used to detect the document length.

A symbol SE3 denotes a paper reversion and discharge sensor.

A symbol SE4 denotes a circulating reversion sensor detecting the document in the circulating switch back path. When the circulating reversion sensor SE4 turns on, the document is detected.

A symbol SE5 denotes a paper discharge sensor.

A symbol SE6 denotes a separation sensor.

Symbols SE7-1 through SE-5 denotes sensors for detecting the width size of the document fed. When the sensors SE7-1 through SE-5 turn on, the document is detected.

Symbols SE11 and SE12 denote length size sensor for detecting the length of the document set on the document tray 2101. When the length size sensors SE11 and SE12 turn on, the document is detected.

A symbol SE14 denotes a scanning sensor for detecting the document in a scanning portion 2200. When the scanning sensor SE14 turns on, the document is detected.

A symbol SE15 denotes an upper face detection sensor for detecting whether or not the document on the document tray 2101 has risen up to the paper feeding position. When the upper face detection sensor SE15 turns on, the completion of the rising is detected.

A symbol SE16 denotes a bottom limit sensor for detecting whether or not the lift up plate 2107 is set in the bottom limit (home position). When the bottom limit sensor SE16 turns on, it is detected that the lift up plate 2107 is in the home position. The bottom limit sensor SE16 is not shown in FIG. 9.

The motors will be described.

A symbol M1 denotes a paper feeding motor for driving the pickup roller 2102, the paper feeding roller 2103, the upstream feeding roller pair 2105, and the circulating reversion roller pair 2302. The rotating direction in the paper feeding and scanning operations is represented by a symbol CW, and the rotating direction in the circulating switch back is represented by a symbol CCW.

A symbol M2 denotes a carrying motor for driving the scanning front roller pair 2201 and the scanning rear roller pair 2203. The rotating direction is represented by a symbol CW.

A symbol M3 denotes a paper discharge motor for driving the paper discharge reversion roller pair 2402 and the paper discharge roller pair 2501. The rotating direction in the paper discharge switch back is represented by a symbol CW, and the rotating direction in the paper discharge operation is represented by a symbol CCW.

A symbol M4 denotes a lift up motor for lifting and lowering the lift up plate 2107. The rotating direction in the lowering operation is represented by a symbol CW, and the rotating direction of the lifting operation is represented by a symbol CCW. The lift up motor M4 is not shown in FIG. 12.

The solenoids and so on will be described.

A symbol SL1 denotes a circulating reversion solenoid for driving the switching claw 2301. Turning on, the circulating reversion solenoid SL1 rotates the switch claw 2301 clockwise from the solid line position shown in FIG. 9. The circuiting reversion solenoid SL1 is not shown in FIG. 9.

A symbol SL2 denotes a paper discharge reversion solenoid, for driving a switching claw 2401. Turning on, the paper discharge reversion solenoid SL2 rotates the switching claw 2401 clockwise from the solid line position shown in FIG. 9. The paper discharge reversion solenoid is not shown in FIG. 9.

A symbol CL1 denotes a paper feeding clutch for turning on/off the driving force to the paper feeding roller 2103. Turning on, the paper feeding clutch CL1 transmits the driving force.

A symbol S0 denotes a transmission signal to a copying machine main body.

A symbol S1 denotes a receiving signal from the copying machine main body.

Parameters to be used in controlling the document scan apparatus 120 by the CPU 3000 will be described.

The carrying mode is set in accordance with an operation mode selected by an operator. The data of the carrying mode is transmitted to the CPU 3000 from the copying machine main body. The carrying mode is calcified into the following types.

"1": single side high speed mood
"2": single side mixed stack mode
"3": both sides high speed mode (except for AMS)
"4": both sides mixed stack mode (except for AMS)
"5": single side mixed stack AMS mode
"6": both sides mixed stack AMS mode In the single side high speed mode and the single side mixed stack mode excepting for the AMS, the fed document is carried by the carrying motor M2 to turn on reading sensor 40 after the given time period from the carrying start, thereby starting the scanning operation. In case that the next document exists at a time point when the rear end of the document has passed the separation sensor SE6 during the scanning operation, the paper feeding operation starts. When the feeding of the next document has been completed after the scanning operation, the carrying for scanning the next document by the carrying motor M2 starts immediately. These operations are repeated until the documents runs out on the document tray 2101. In these modes, the length size is detected by the length size sensors SE11 and SE12 before starting to feed documents, and the width size is detected by the width size sensors SE7-1 through SE7-5 during the document is fed. The document size is detected by the combination of the detected length size and the width side.

In the single side high speed mode, the scanning magnification is normally fixed, thereby improving the productivity, because the paper feeding operation of the copy paper by the copying machine can be conducted faster by confirming the document size during the paper feeding of the document (before the scanning start) as described.

In the single side mixed stack mode excepting the AMS, the document length is calculated from the driving pulses of the carrying motor M2 at a time point when the document rear end has passed the sensor SE2 after the scanning start, because the document length detection cannot be conducted by the sensors SE11 and SE12.

In the both sides high speed mode and both sides mixed stack mode excepting the AMS, the first side is scanned as in the single face mode. When the scanning starts, the solenoid SL1 is turned on to guide the document tip end to the reversion path. When the given time period passes after completion of scanning, the paper feeding motor M1 is turned off to reverse the paper feeding motor M1 to switch back the document. After the tip end of the document has been resisted by the resist roller 2201, the carrying motor M2 is turned on to conduct the second scanning operation. Simultaneously with the scanning start, the solenoid SL1 is turned off and the solenoid SL2 is turned on to guide the document tip end to the reversion path. When the sensor SE4 is turned off since the rear end of the document has passed and the next document exists on the document tray 2101 during the second side scanning operation, the paper feeding operation starts after the given time period. The scanned document is stopped by the completion of the scanning operation. The carrying motor M2 is started again, waiting for the completion of the tip end direction of the next document, so as to conduct the discharge operation. In order to discharge the document, the paper discharge motor M3 is reversed and is once stopped after the given time period, and the paper discharge motor M3 is rotated again in the normal direction. The scanning of the next document and the discharging of the document after completion of scanning are conducted at the same time. Even in both sides modes, the size detection is same as in the single side mode.

In the single side mixed stack AMS mode and both sides mixed stack AMS mode, the document size is necessary to be confirmed before the scanning start to decide the magnification. Hence, the document carrying control operation as same as the first side scanning in both the sides mode is performed to conduct only the size detection after the paper feeding completion.

In the both sides mixed stack AMS mode, the reading sensor 40 is turned on to start the scanning of the reverse side after the given time period from the carrying start following the completion of resisting by the switch back operation. The solenoid SL1 is turned on again when the scanning starts so that the document tip end is guided to the paper reversion feeding path to conduct the reversing operation again.

In the single side mixed stack AMS mode, the reversing operation of the document is conducted without turning on the reading sensor 40 after the resisting has completed by the switch back operation. When the reversion is completed, the carrying operation is conducted for scanning the top side. When the sensor SE2 has turned off since the rear end of the document has passed during scanning of the top side and a document exists on the document tray 2101, detection of the top end of the next document starts after the given time period.

The discharging after the scanning completion is same as that of the single side mode. The detection of the document size is conducted when the sensor SE2 is turned ofef since the document rear end has passed during the first reversion time.

As described with reference to FIGS. 17 through FIG. 52, various types of counters, timers and flags are used. A symbol M2CNT denotes a driving pulse number counter of the carrying motor M2. A symbol SIZCNT is a counter for latching the driving pulse number of the carrying motor M2 when the resist sensor SE2 is turned off.

The operation of the third embodiment will be described in accordance with flow charts shown in FIG. 17 through FIG. 52.

Figure 17:
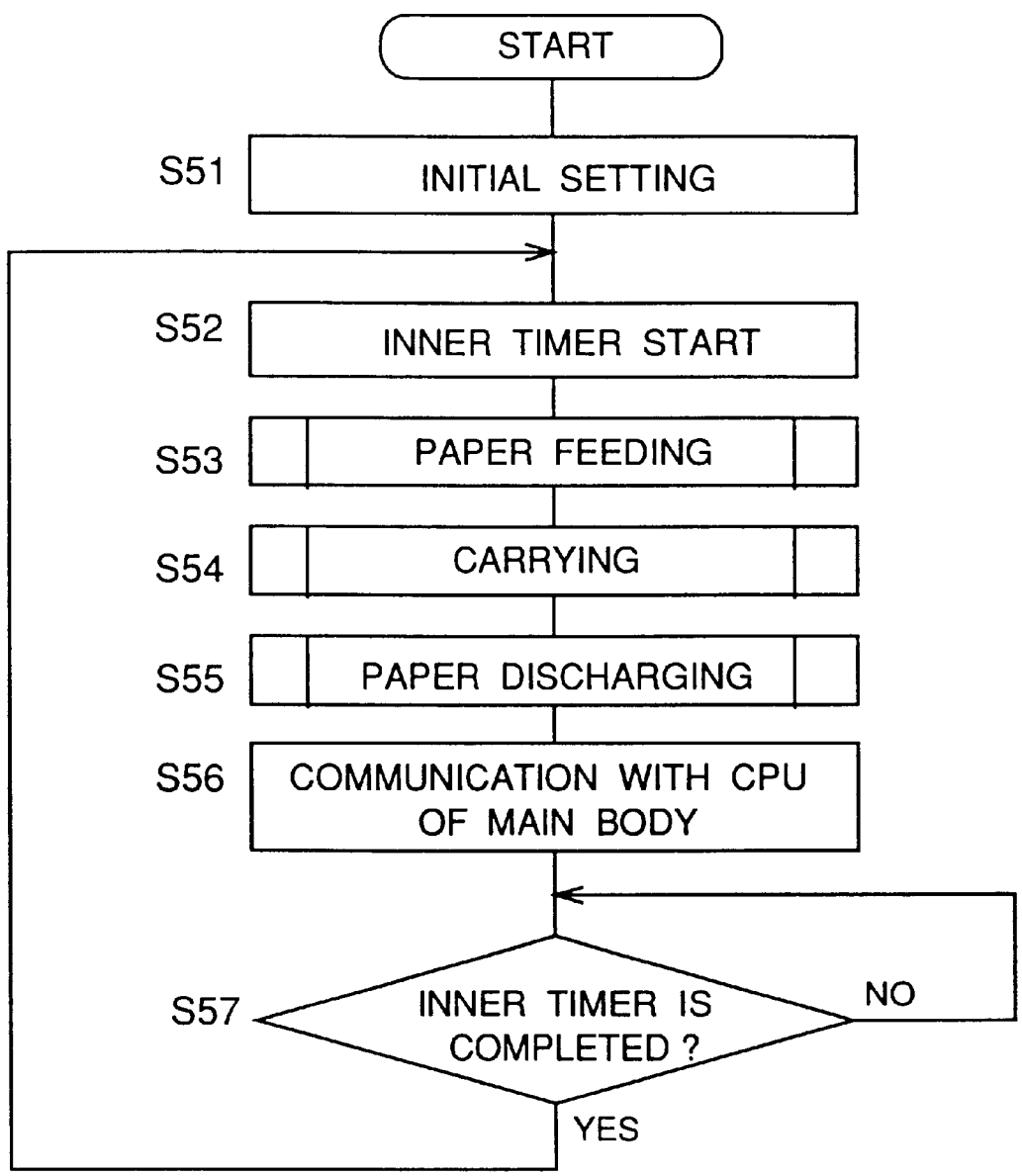
FIG. 17 is a flow chart showing a main routine in the third embodiment.

FIG. 17 shows a main routine. FIGS. 18 through FIG. 37 show subroutines of the main routine shown in FIG. 17. FIGS. 38 through FIG. 52 show subroutines of FIG. 18 through FIG. 37.

(Main Routine)

FIG. 17 shows a main routine of the CPU 3000. At a step S51, an initial setting operation is conducted. At a step S52, an inner timer is started. At a step S53, the paper feeding operation is conducted. At a step S54, the carrying operation is conducted, and at a step S55, the paper discharge operation is conducted. At a step S56, the communication with the CPU of the copying machine main body is conducted. Further, at a step S57, if the inner timer is completed, then the step returns to a step S52.

(External Interrupting Routine)

Figure 18:
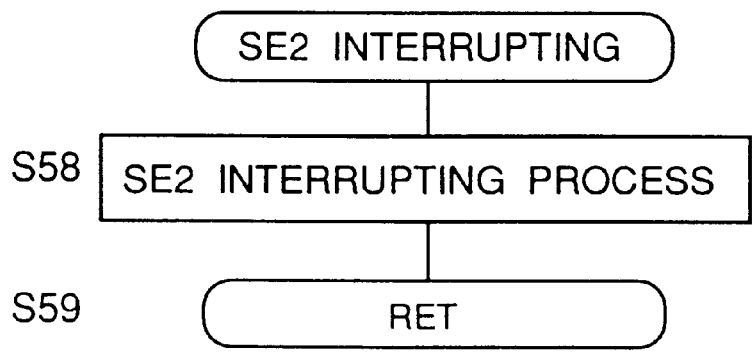
FIG. 18 is a flow chart showing an external interrupt routine in the third embodiment.
Figure 19:
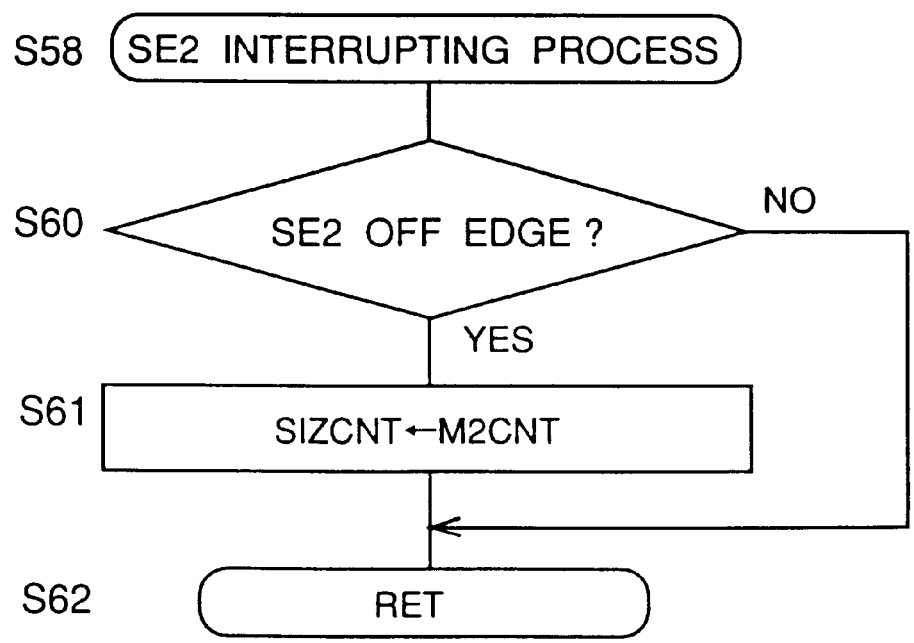
FIG. 19 is a flow chart showing an external interrupt routine in the third embodiment.

FIG. 18 shows an external interrupting routine by the resist sensor SE2. This routine is started when the signal inputted from the resist sensor SE2 changes. At a step S58, the SE2 interruption process is carried out. At the step S59, the step is returned to the main routine. At the step S58, if the off edge of the resist sensor SE2 is detected at a step S60 in FIG. 19, then the step is returned to the main routine at the step S62 after the counter M2CNT has been latched to the counter SIZNCNT at a step S61.

(Subroutine of the Paper Feeding Operation)

Figure 20:
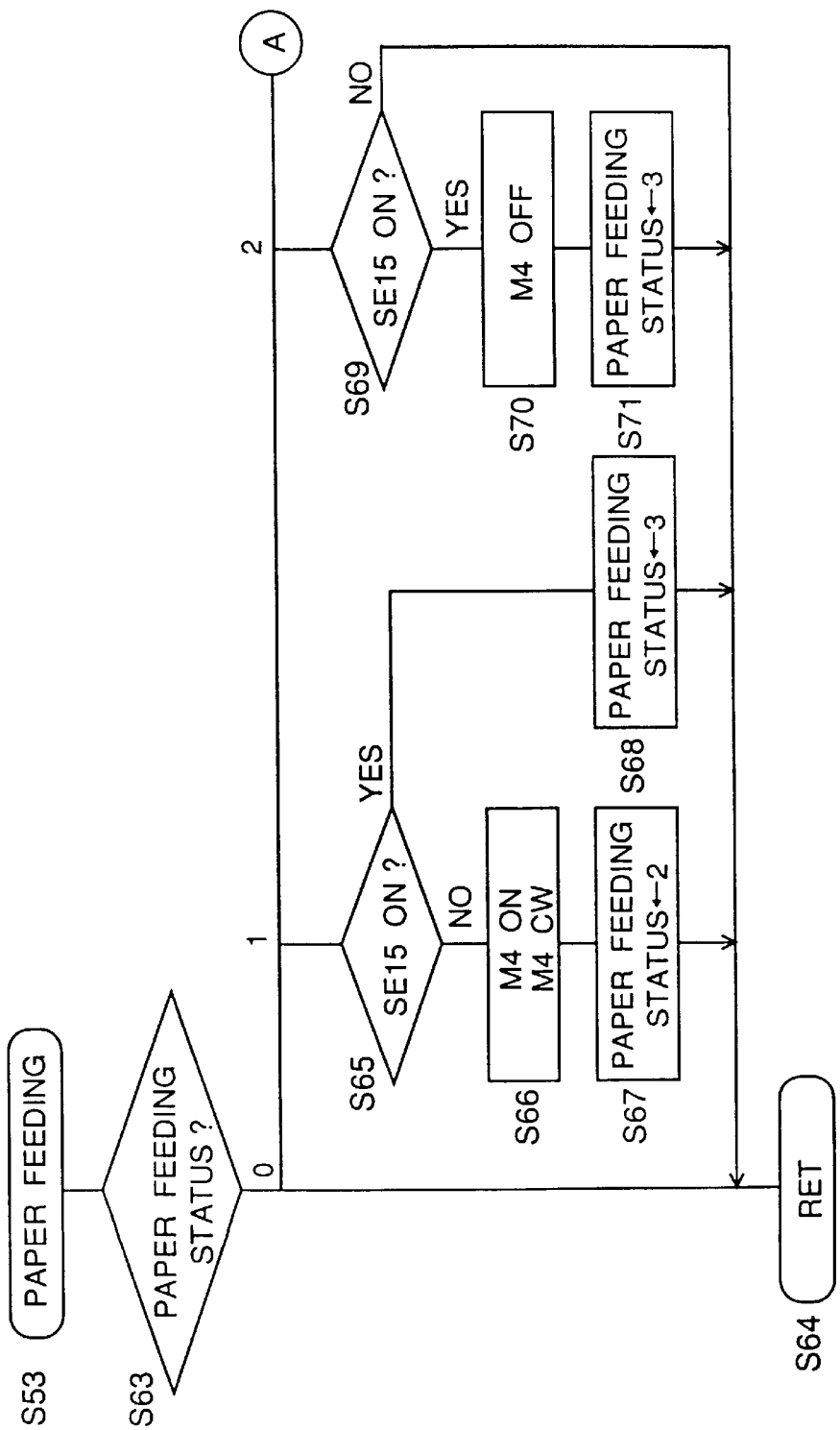
FIG. 20 is a flow chart showing a subroutine of a paper feeding operation in the third embodiment.
Figure 21:
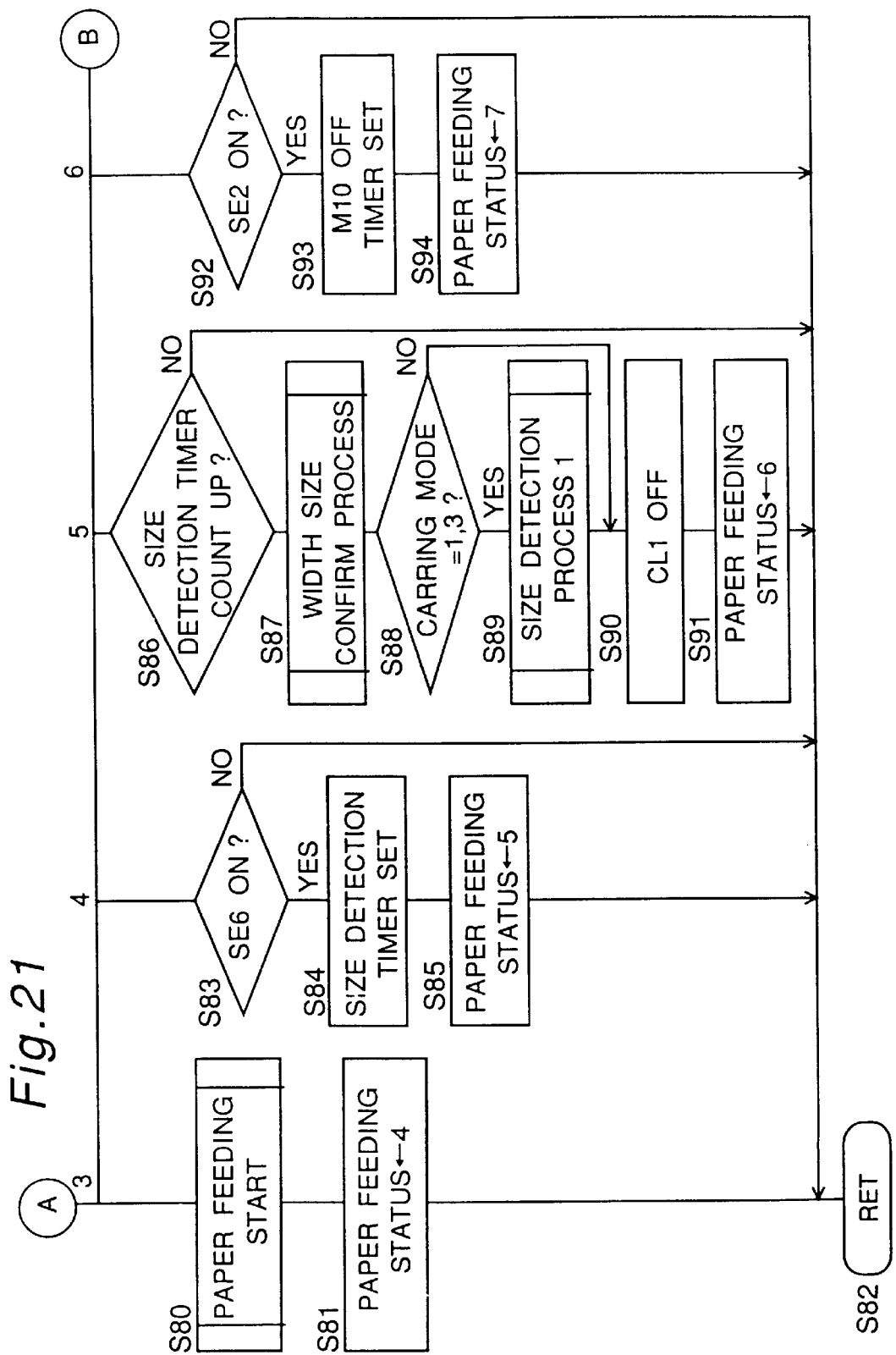
FIG. 21 is a flow chart showing a subroutine of a paper feeding operation in the third embodiment.
Figure 22:
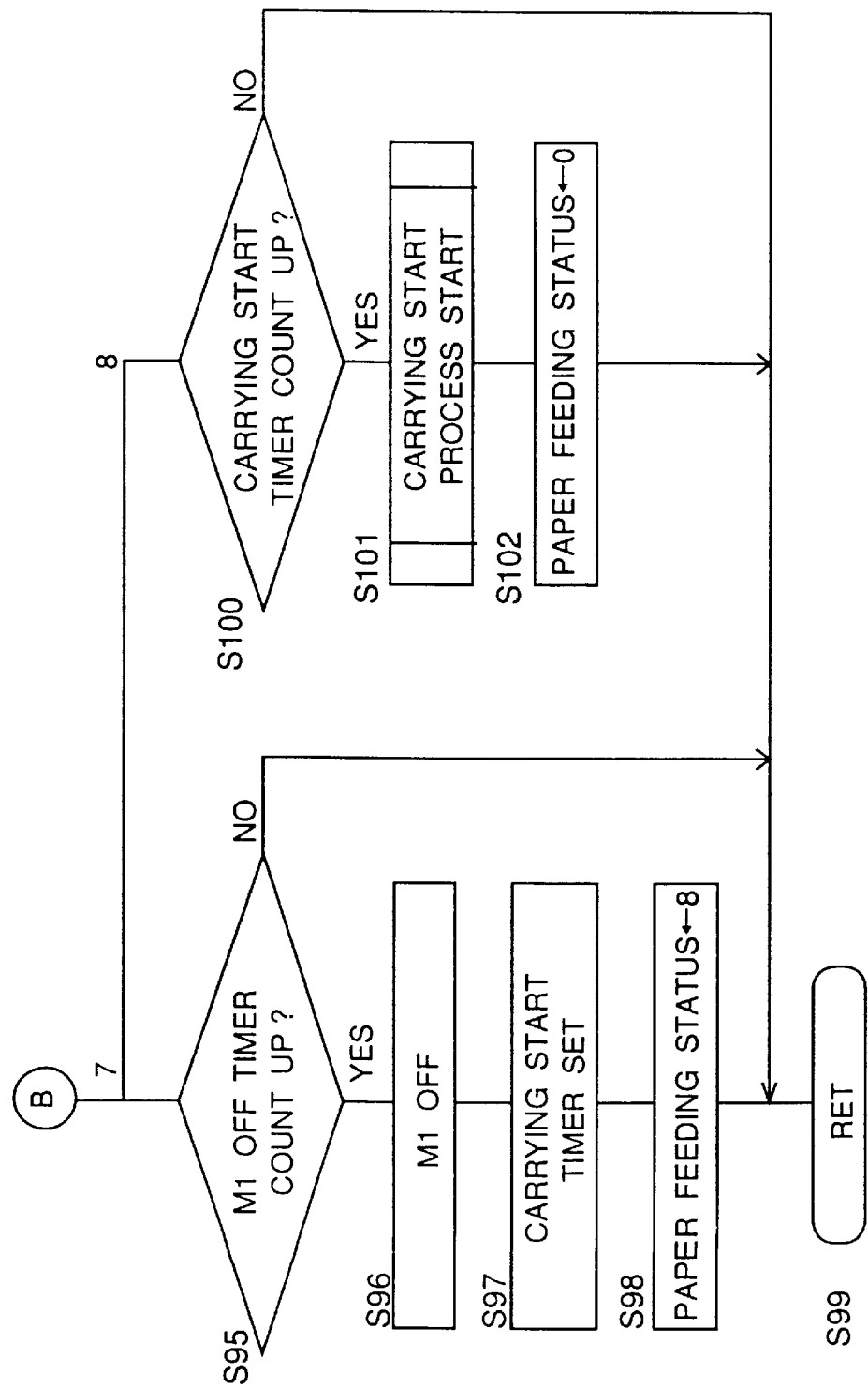
FIG. 22 is a flow chart showing a subroutine of a paper feeding operation in the third embodiment.

FIGS. 20 through FIG. 22 are the subroutine of the paper feeding operation at the step S53 in FIG. 17.

If the paper feeding status is "0" at a step S63, then the step is returned to the main routine at a step S64.

If the paper feeding status is "1" at the step S63, then the step goes to a step S65. At the step S65, if the top face detection sensor SE15 has turned on, then the paper feeding status is set to "3" at a step S68. At the step S65, if the top face detection sensor SE15 has not turned on, then the lift up motor M4 is rotated in normal direction at a step S66 and the paper feeding status is set to "2" at a step S67.

If the paper feeding status is "2" at the step S63, then the step goes to a step S69. If the top face detection sensor SE15 has tuned on at the step S69, then the lift up motor M4 stops at a step S70 and the paper feeding status is set "3" at the step S71. If the paper feeding status is "3" at the step S63, then the paper feeding operation shown in FIG. 38 described later is started at a step S80 in FIG. 21 and the step is returned to the main routine after setting the paper feeding status to "4" at the step S81.

If the paper feeding status "4" at the step S63, then the step goes to a step S83. If the separation sensor SE6 has turned on at the step S83, the size detection timer is set at a step S84 and the paper feeding status is set to "5" at a step S85.

If the paper feeding status is "5" at the step S63, the step goes to a step S86. If the size detection timer is counted up at the step S86, the step goes to a step S87 to execute the width size confirm process shown in FIGS. 40 and FIG. 41. Then, the step goes to a step S88. If the carrying mode is "1" or "3" (the single side high speed mode or both sides high speed mode) at the step S88, the step goes to a step S90 after executing the size detect process 1 shown in FIGS. 49 through 51 at a step S89. If the carrying mode is not "1" or "3" at the step S88, the step goes to the step S90. At the step S90, the clutch CL1 is turned off. At a step S91, the paper feeding status is set to "6".

If the paper feeding status is "6" at the step S63, the step goes to a step S92. If the resist sensor SE2 has turned on at the S92, then a M1 OFF timer is set at a step S93, and then, the paper feeding status is set to "7" at a step S94.

If the paper feeding status is "7" at the step S63, the step goes to a step S95 of FIG. 22. If the M1 OFF timer is counted up at the step S95, the paper feeding motor M1 is stopped at a step S96. At a step S97, the carrying start timer is set. At a step S98, the paper feeding status is set "8". Then, at a step S99, the step is returned to the main routine.

Figure 42:
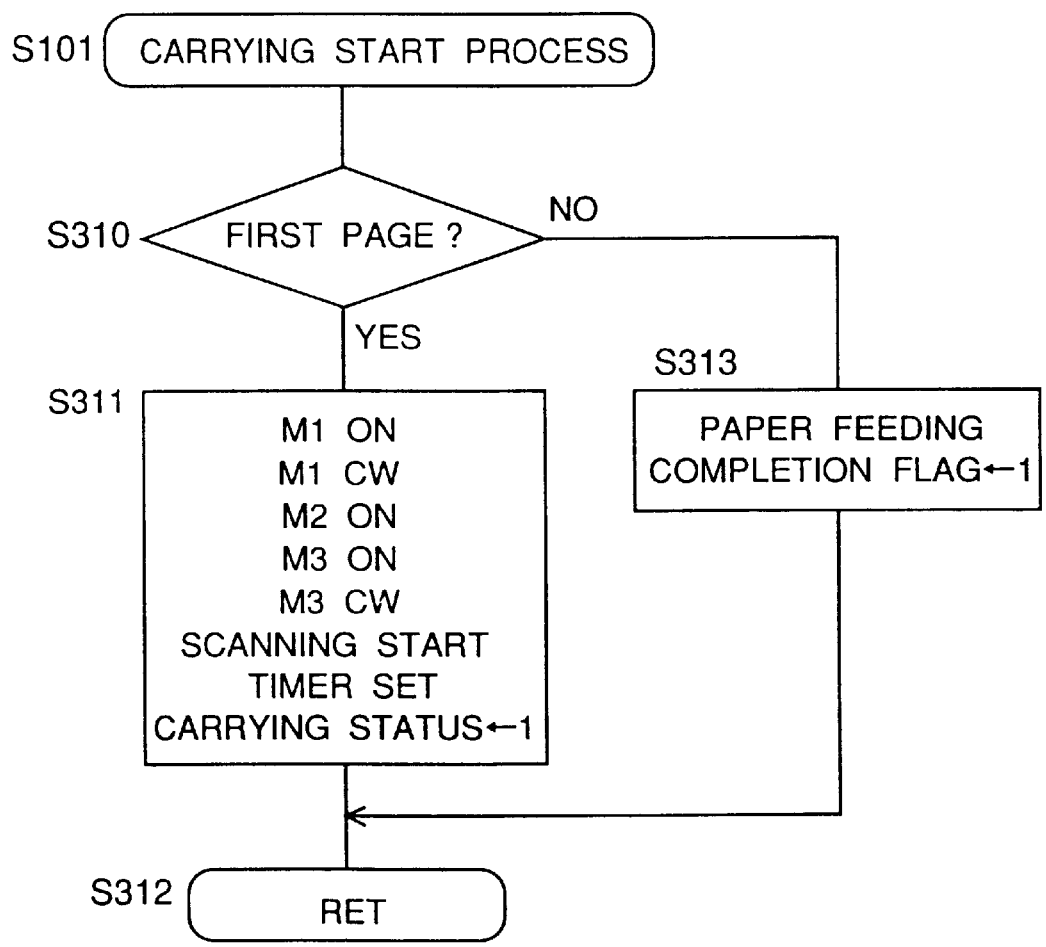
FIG. 42 is a flow chart showing a subroutine of a carrying start process in the third embodiment.

If the paper feeding status is "8" at the step S63, then the step goes to a step S100. If the carrying start timer is counted up at the step S100, then the carrying start process shown in FIG. 42 is executed at a step S101, and then, the paper feeding status is set to "0" at a step S102.

(Subroutine of the Carrying)

FIGS. 23 through FIG. 34 show the subroutine of the carrying at the step S54 in FIG. 17.

If the carrying mode is "1" or "2" (single side high speed mode or the single side mixed stack mode) at a step S103, then the step goes to a step S104. If the carrying mode "3" or "4" (both sides high speed mode or both sides mixed stack mode) at the step S103, then the step goes to a step S129 in FIG. 25. If the carrying mode is "5" or "6" (single side mixed stack AMS mode or both sides mixed stack AMS mode), the step goes to a step S182 in FIG. 30.

Figure 23:
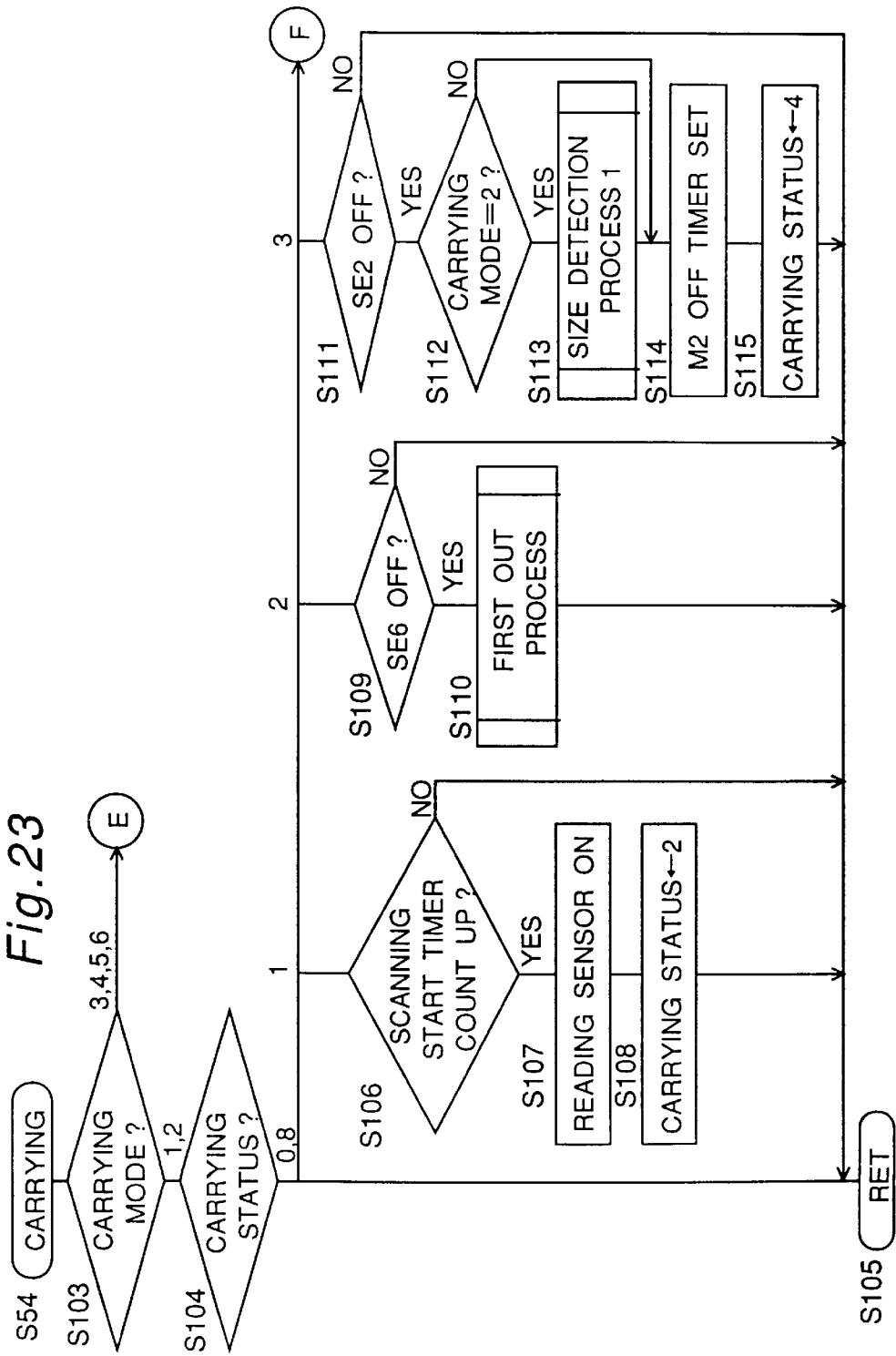
FIG. 23 is a flow chart showing a subroutine of a paper carrying operation in the third embodiment.

If the carrying status is "0" or "8" at the step S104 in FIG. 23, then the step goes to a step S105 to return the step to the main routine.

If the carrying status is "1" at the step S104, then the step goes to a step S106. If the scanning start timer is counted up at the step S106, then the reading sensor 40 is turned on at a step S107 to start the scanning operation, and then, the carrying status is set to "2" at a step S108.

If the carrying status is "2" at the step S104, the step goes to a step S109. If the separation sensor SE6 has turned off at the step S109, then first-out start process shown in FIG. 47 to be described later is started.

If the carrying status is "3" at the step S104, then the step goes to a step S111. If the resist sensor SE2 has turned off at the step S111, then the step goes to a step S112. If the carrying mode is "2" at the step S112, then the size detection process 1 is executed at a step S113. The M2 OFF timer is set at a step S114. Further, the carrying status is set to "4" at a step S115. If the carrying mode is not "2" at the step S112, the step goes to the step S114.

Figure 24:
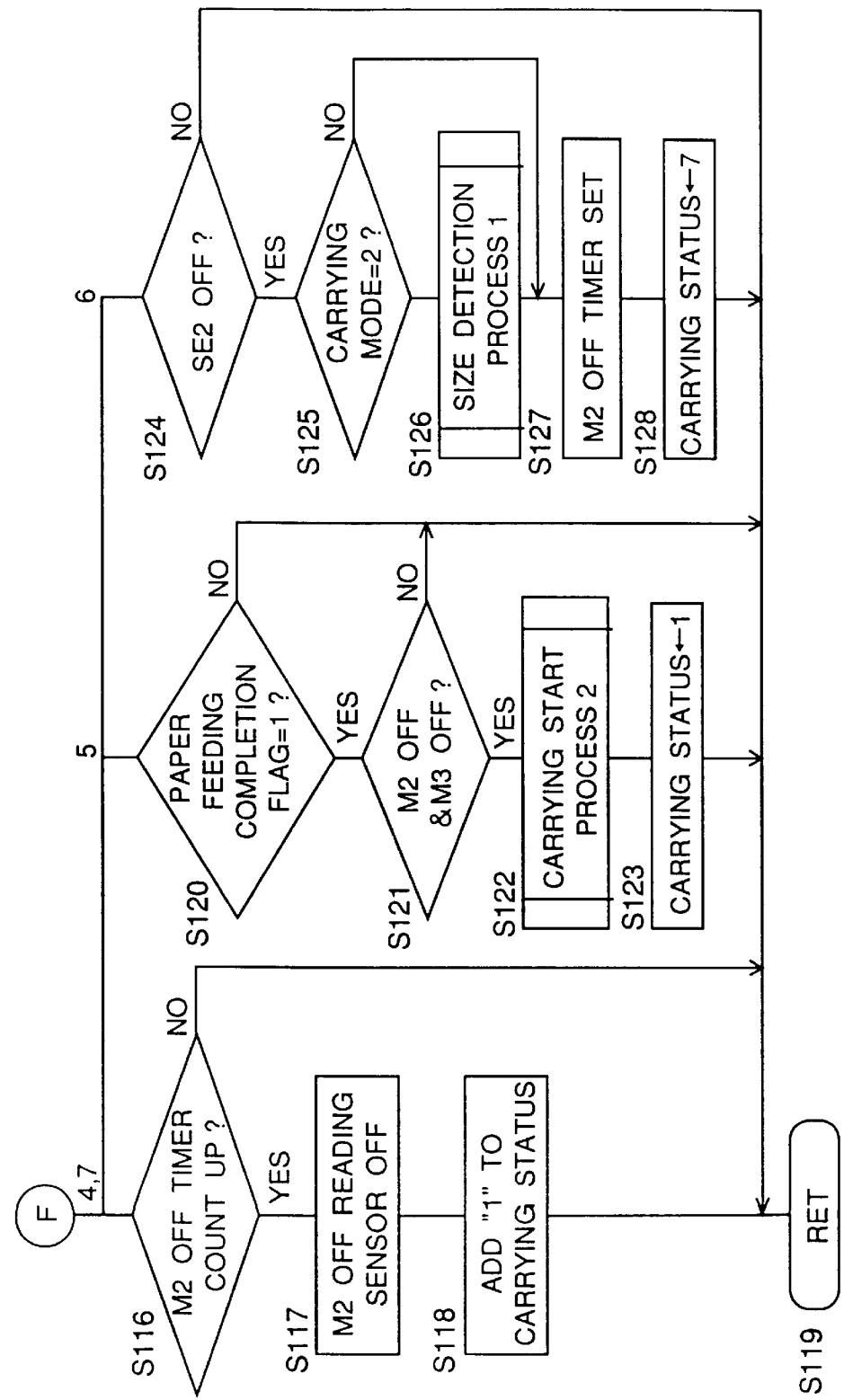
FIG. 24 is a flow chart showing a subroutine of a paper carrying operation in the third embodiment.

If the carrying status is "4" or "7" at the step S104, then the step goes to a step S116 of FIG. 24. If the M2 OFF timer is counted up at the step S116, then the step goes to a step S117 to turn off the carrying motor M2 and the reading sensor 40 for completing the reading. After the carrying status has been increased at a step S118, the step is returned to the main routine at a step S119.

If the carrying status is "5" at the step S104, then the step goes to a step S120. If the paper feeding completion flag is set to "1" at the step S120, then the step goes to a step S121. If the carrying motor M2 and the paper discharge motor M3 have turned off at the step S121, the step goes to a step S122. After the carrying start process 2 shown in FIG. 43 to be described later has been executed, the carrying status is set to "1" at a step S123.

If the carrying status is "6" at the step S104, which means that the process is the final document scanning process, then the step goes to a step S124. If the resist sensor SE2 has turned off at the step S124, then the step goes to a step S125. If the carrying mode is "2" at the step S125, then the size detection process 1 is executed at a step 126. Then, the M2 OFF timer is set at the step S127. At a step S128, the carrying status is set to "7". If the carrying mode is not "2" at the step S125, then the step goes to the step S127.

Figure 25:
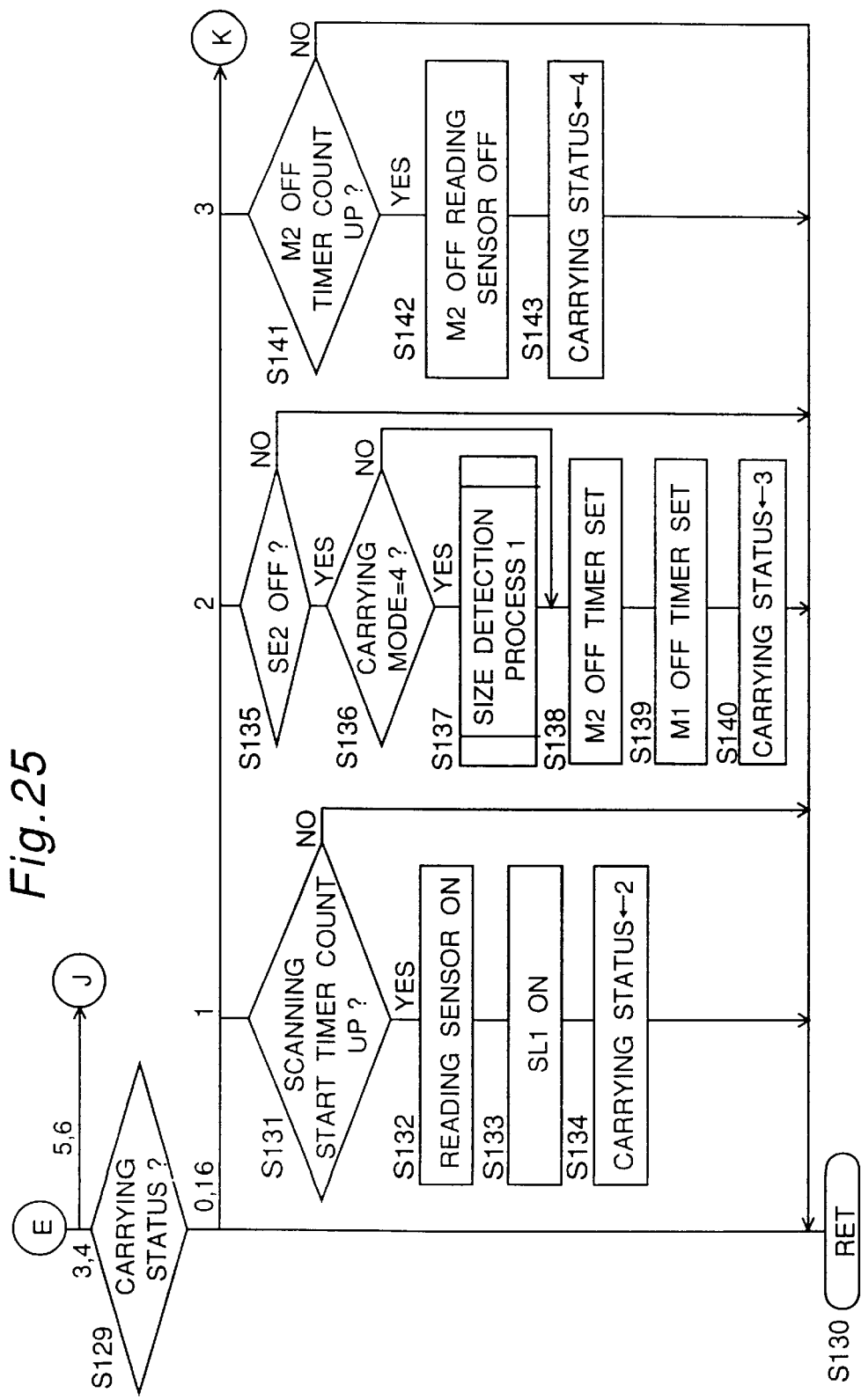
FIG. 25 is a flow chart showing a subroutine of a paper carrying operation in the third embodiment.

If the carrying mode is "3" or "4" (both sides high speed mode or both sides mixed stack mode) at the step S103 of the FIG. 23, then the step goes to a step S129 of FIG. 25.

If the carrying status is set to "0" or "16" at the step S129, then the step returns to the main routine at the step S130.

If the carrying status is "1" at the step S129, then the step goes to a step S131. If the scanning start timer is counted up at the step S131, then the reading sensor 40 is turned on at a step S132, the solenoid SL1 is turned on at a step S133, and the carrying status is set to "2" at a step S134.

Figure 49:
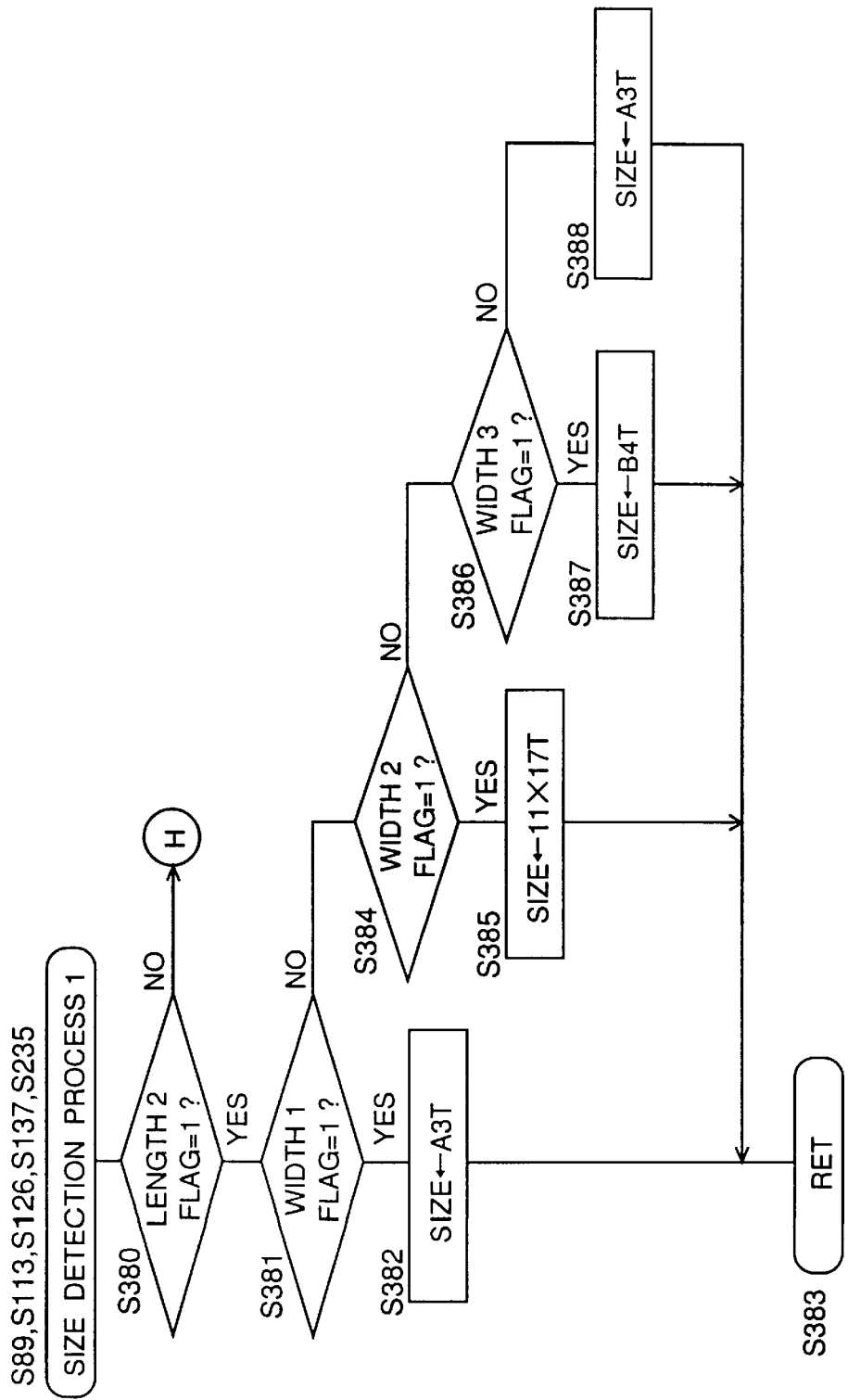
FIG. 49 is a flow chart showing a subroutine of a size detection process 1 in the third embodiment.

If the carrying status is "2" at the step S129, then the step goes to a step S135. If the resist sensor SE2 has turned on at the step S135, then the step goes to a step S136. If the carrying mode is "4" at the step S136, then the size detect process 1 shown in FIG. 49 is executed at a step S137. At steps S138 and S139, the M2 OFF timer and the M1 OFF timer are set. At a step S140, the carrying status is set to "3".

If the carrying status is "3" at the step S129, the step goes to a step S141. If the M2 OFF timer is counted up at the step S141, the carrying motor M2 and the scanning sensor 40 are turned off at a step S142. At a step S143, the carrying status is set to "4".

Figure 26:
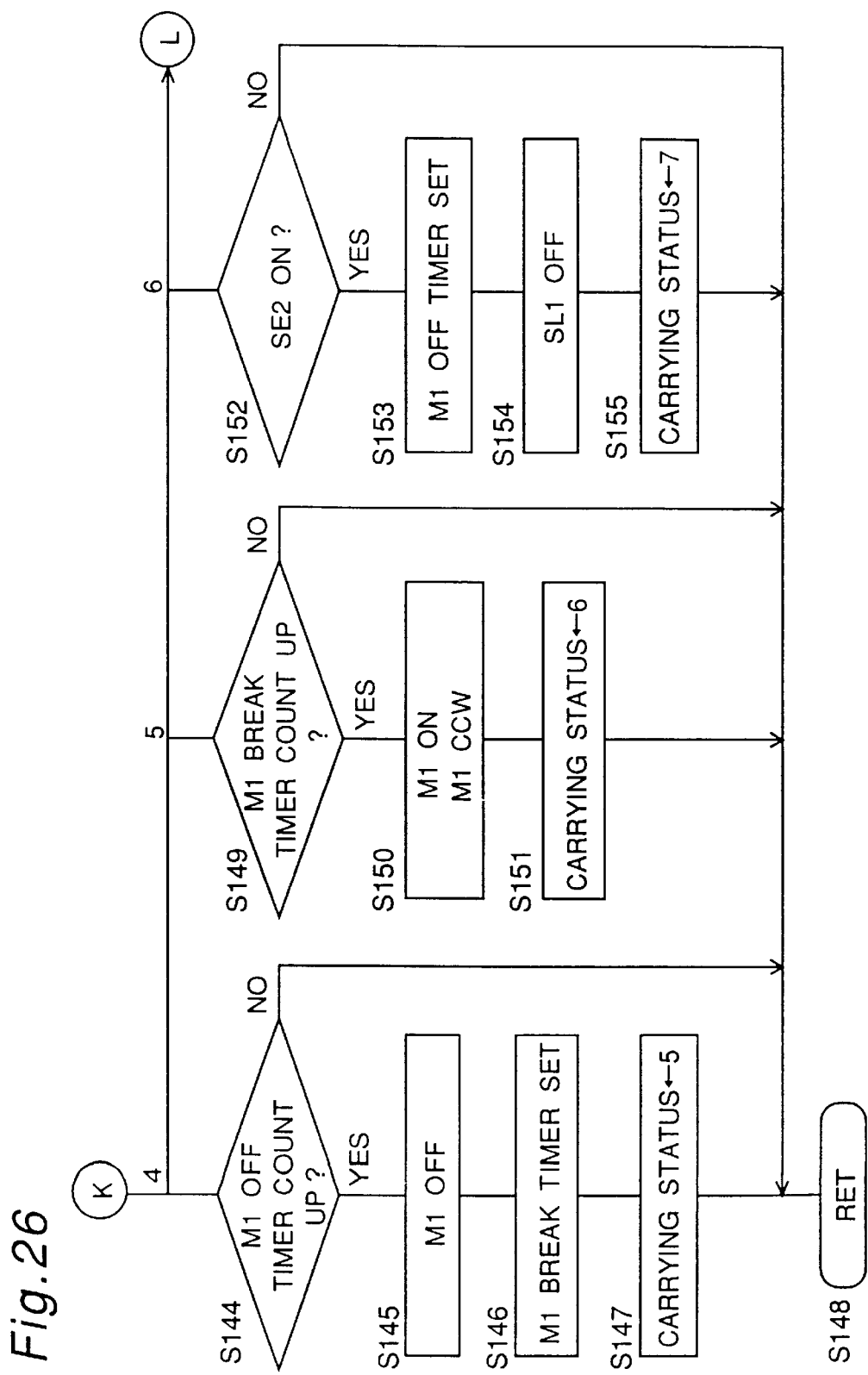
FIG. 26 is a flow chart showing a subroutine of a paper carrying operation in the third embodiment.

If the carrying status is "4" at the step S129, then the step goes to a step S144 in FIG. 26. If the M1 OFF timer is counted up at the step S144, the paper feeding motor M1 is turned off at a step S145 and the M1 brake timer is set at a step S146. After thelcarrying status is set to "5" at a step S147, the step is returned to the main routine at a step S148.

If the carrying status is "5" at the step S129, then the step goes to a step S149. If the M1 brake timer is counted up at the step S149, then the paper feeding motor M1 is rotated in reverse direction at a step S150, and the carrying status is set to "6" at a step S151.

If carrying status is "6" at the step S129, then the step goes to a step S152. If the resist sensor SE2 has turned on at the step S152, then the M1 OFF timer is set at a step S153, the solenoid SL1 is turned off at a step S154, and the carrying status is set to "7" at a step S155. If the carrying status is "7" at the step S129 in FIG. 25, then the step goes to a step S156 in FIG. 27. If the M1 OFF timer is counted up at the step S156, the paper feeding motor M1 is tuned off at a step S157. The M1 brake timer is set at a step S158. After the carrying status is set to "8" at a step S159, the step is returned to the main routine at a step S160.

If the carrying status is "8" at a step S129, then the step goes to a step S161. If the M1 brake timer is counted up at the step S161, the carrying start process 4 shown in FIG. 45 to be described later is executed at a step S162. At a step S163, the carrying status is set to "9".

If the carrying status is "9" at the step S129, the step goes to a step S164. If the scanning start timer is counted up at the step S164, the reading sensor 40 is turned on at a step S165 and the carrying status is set to "10" at a step S166.

Figure 28:
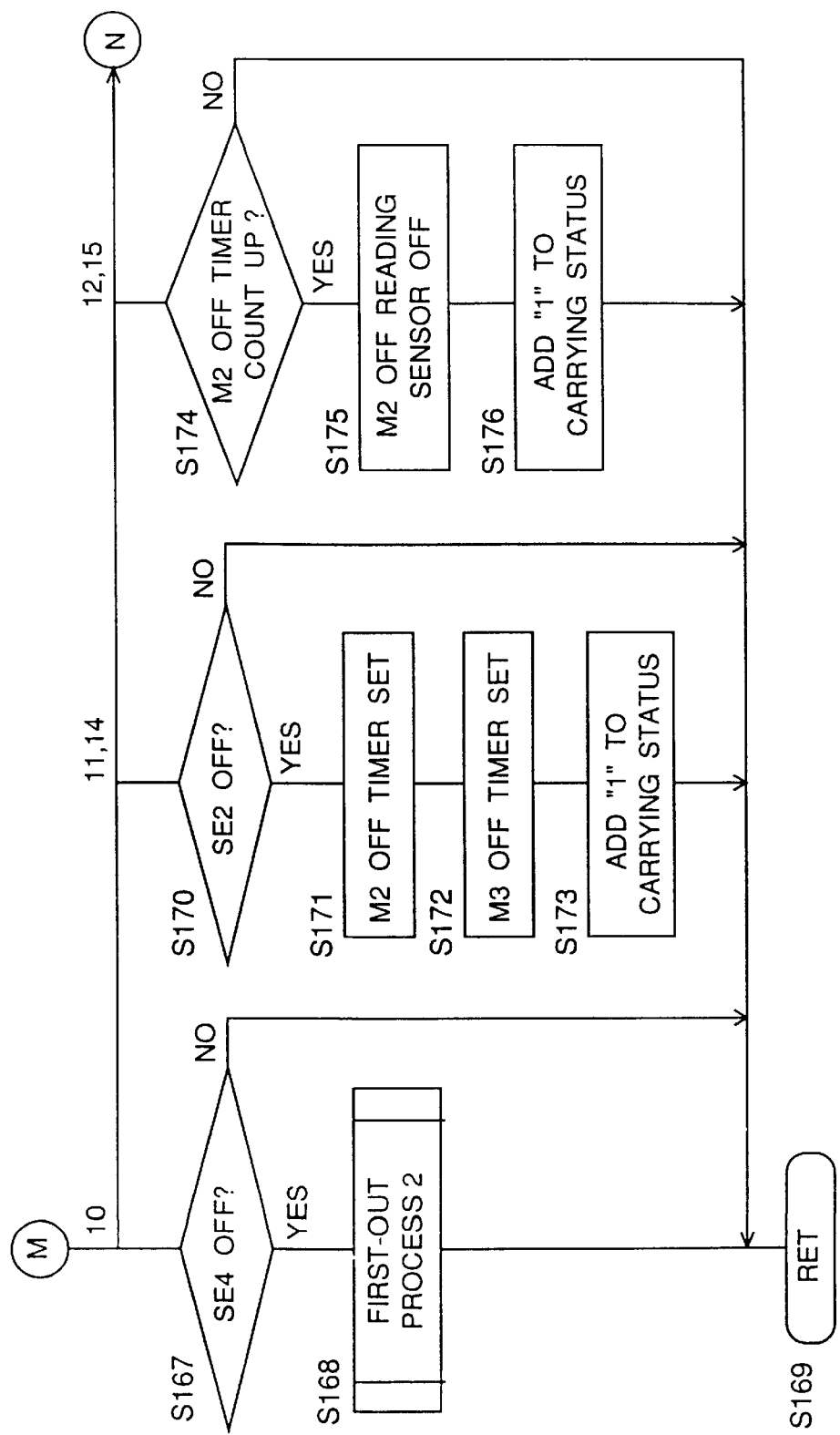
FIG. 28 is a flow chart showing a subroutine of a paper carrying operation in the third embodiment.
Figure 48:
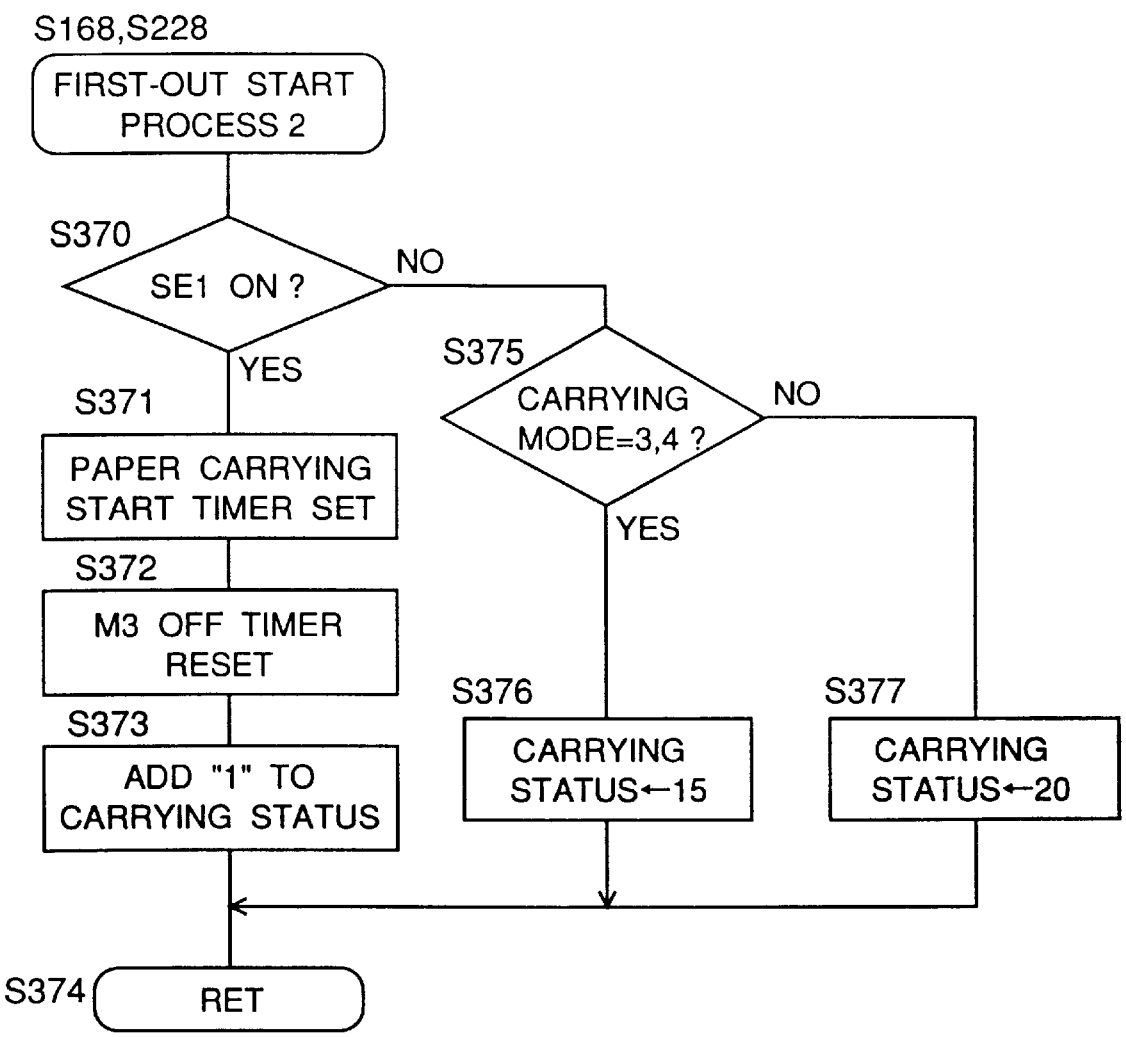
FIG. 48 is a flow chart showing a subroutine of a first-out start process 2 in the third embodiment.

If the carrying status is "10" at the step S129 in the FIG. 25, the step goes to a step S167 in FIG. 28. If the circulating reversion sensor SE4 has turned off, then the first-out start process 2 shown in FIG. 48 is executed at a step S168. If the circulating reversion sensor SE 4 is not turned off, then the step is returned to the main routine at a step S169.

If the carrying status is "11" or "14" at the step S129, then the step goes to a step S170. If the resist sensor SE2 has turned off at the step S170, then the M2 OFF timer and the M3 OFF timer are set at steps S171 and S172, and then, the carrying status is increased at a step S173.

If the carrying status is "12" or "15" at the step S129, then the step goes to a step S174. If the M2 OFF timer is counted up at the step S174, the carrying motor M2 and the reading sensor 40 are turned off at a step S175. At a step S176, the carrying status is increased.

Figure 29:
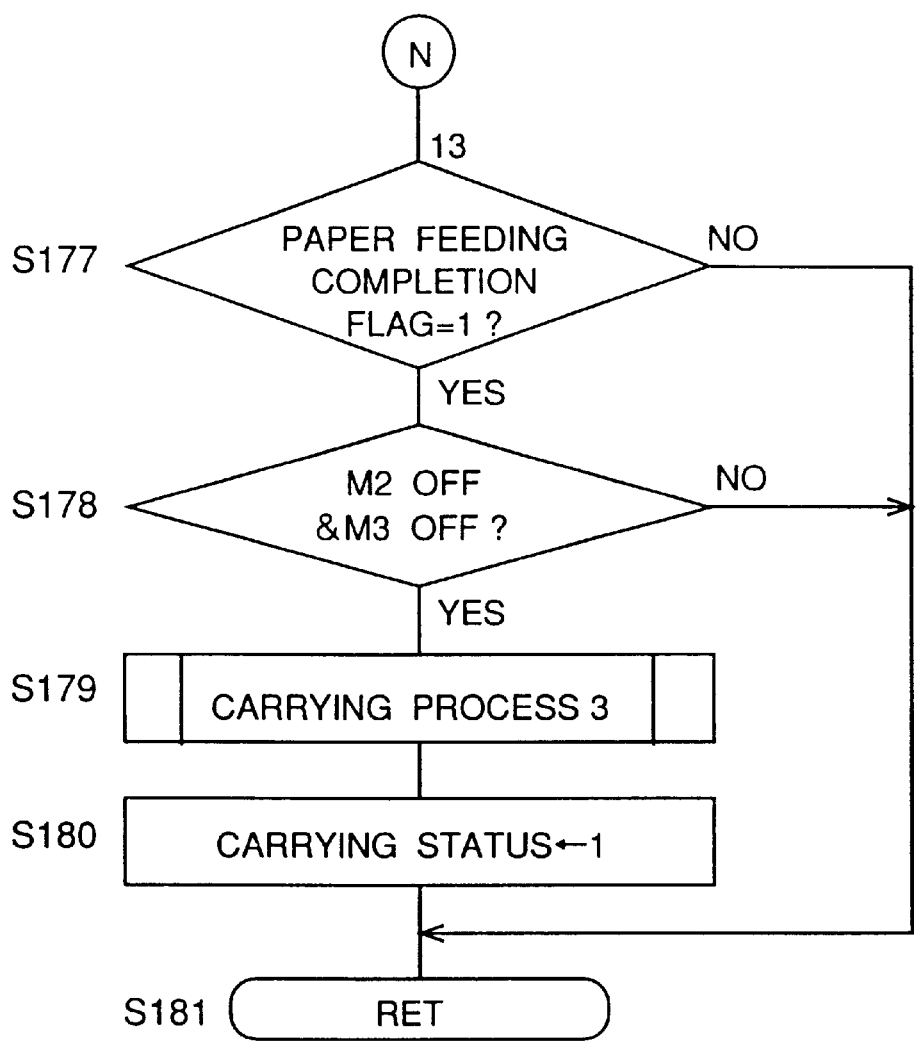
FIG. 29 is a flow chart showing a subroutine of a paper carrying operation in the third embodiment.
Figure 44:
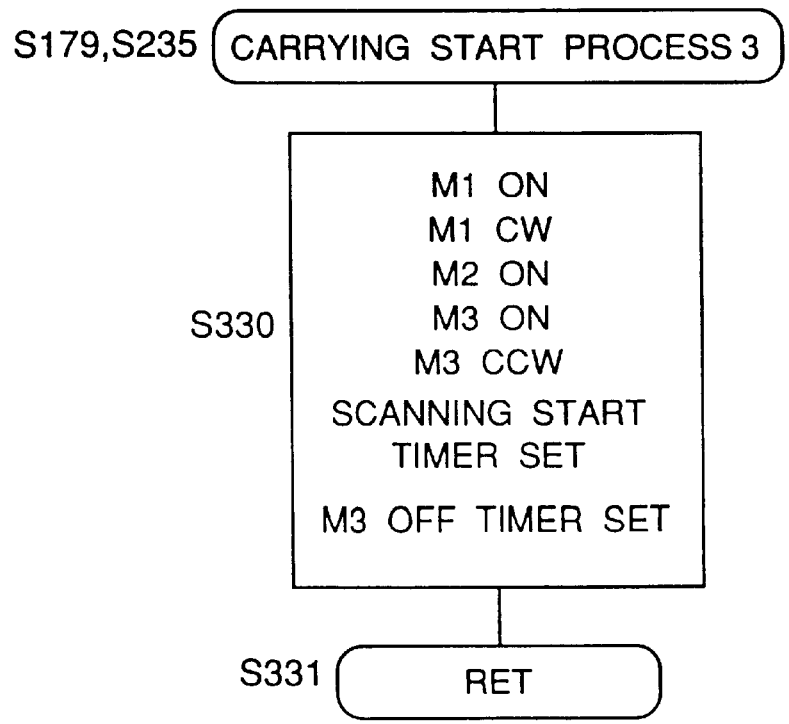
FIG. 44 is a flow chart showing a subroutine of a carrying start process 3 in the third embodiment.

If the carrying status is "13" at the step S129 of FIG. 25, then the step goes to a step S177 of FIG. 29. If the paper feeding completion flag is "1" at the step S177, the step goes to a step S178. The carrying motor M2 and the paper discharge motor M3 have turned off at the step S178, then the carrying start process 3 shown in FIG. 44 is executed at a step S179. After the carrying status is set to "1" at a step S180, the step goes to the main routine at a step S181.

Figure 30:
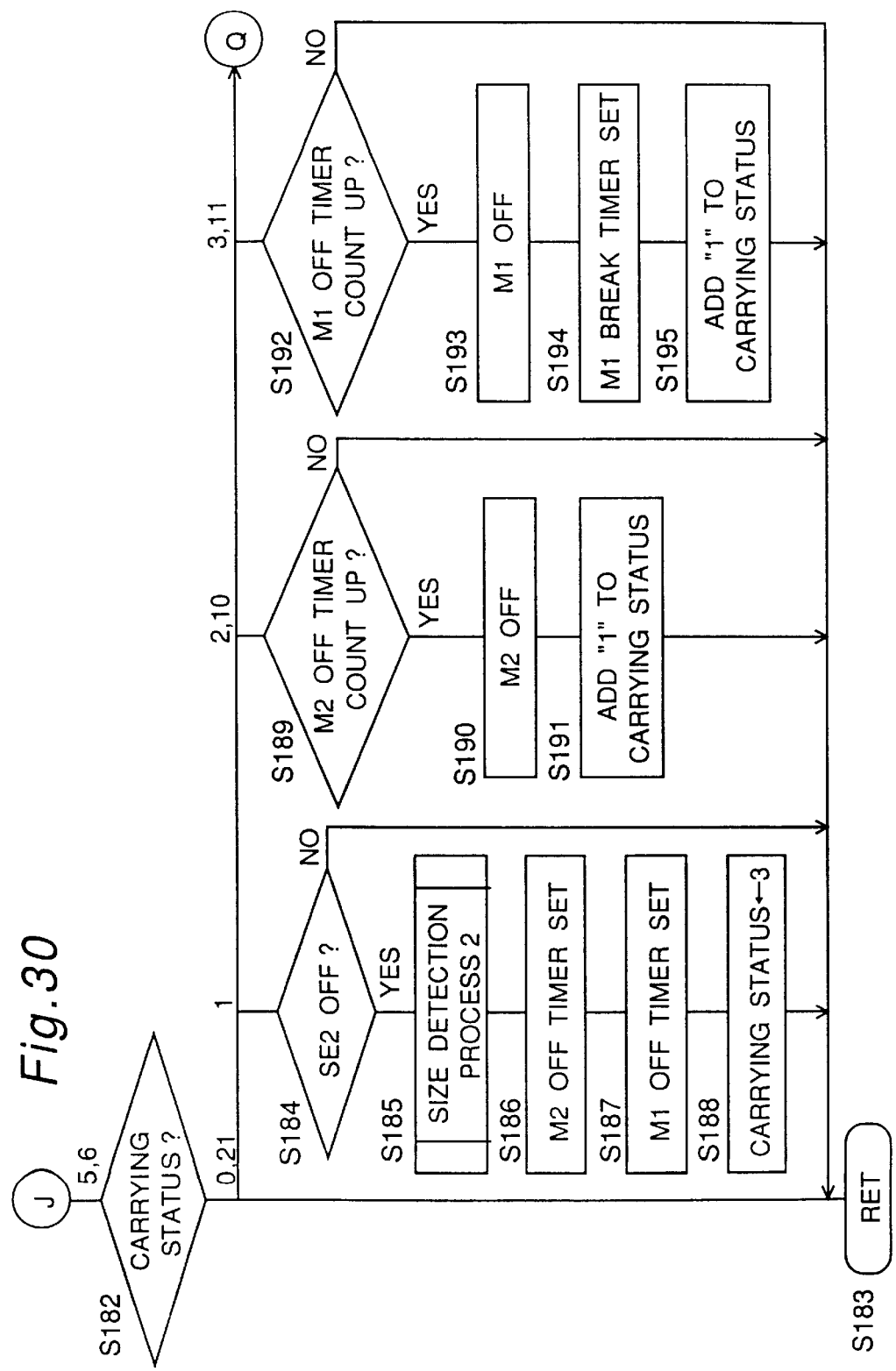
FIG. 30 is a flow chart showing a subroutine of a paper carrying operation in the third embodiment.

If the carrying mode is "5" and "6" (single side mixed stack AMS mode or both sides mixed stack AMS mode) at the step S103 of FIG. 23, then the step goes to a step S182 in FIG. 30.

If the carrying status is "0" or "21" at the step S182, the step is returned to the original routine at a step S183.

If the carrying status is "1" at the step S182, the step goes to a step S184. If the resist sensor SE2 has turned off, then the size detection process 2 shown in FIG. 52 to be described later is executed at a step S185. At steps S186 and S187, the M2 OFF timer and the M1 OFF timer are set. Further, at a step S188, the carrying status is set to "3".

If the carrying status is "2" or "10" at the step S182, the step goes to a step S189. If the M2 OFF timer is counted up at the step S189, then the carrying motor M2 is turned off at a step S190, and then, the carrying status is increased at a step S191.

If the carrying status is "3" or "11" at the step S182, the step goes to a step S192. If the M1 OFF timer is counted up at the step S192, then the paper feeding motor M1 is turned off at a step S193, and then, the M1 brake timer is set at a step S194. Also, the carrying status is increased at a step S195.

Figure 31:
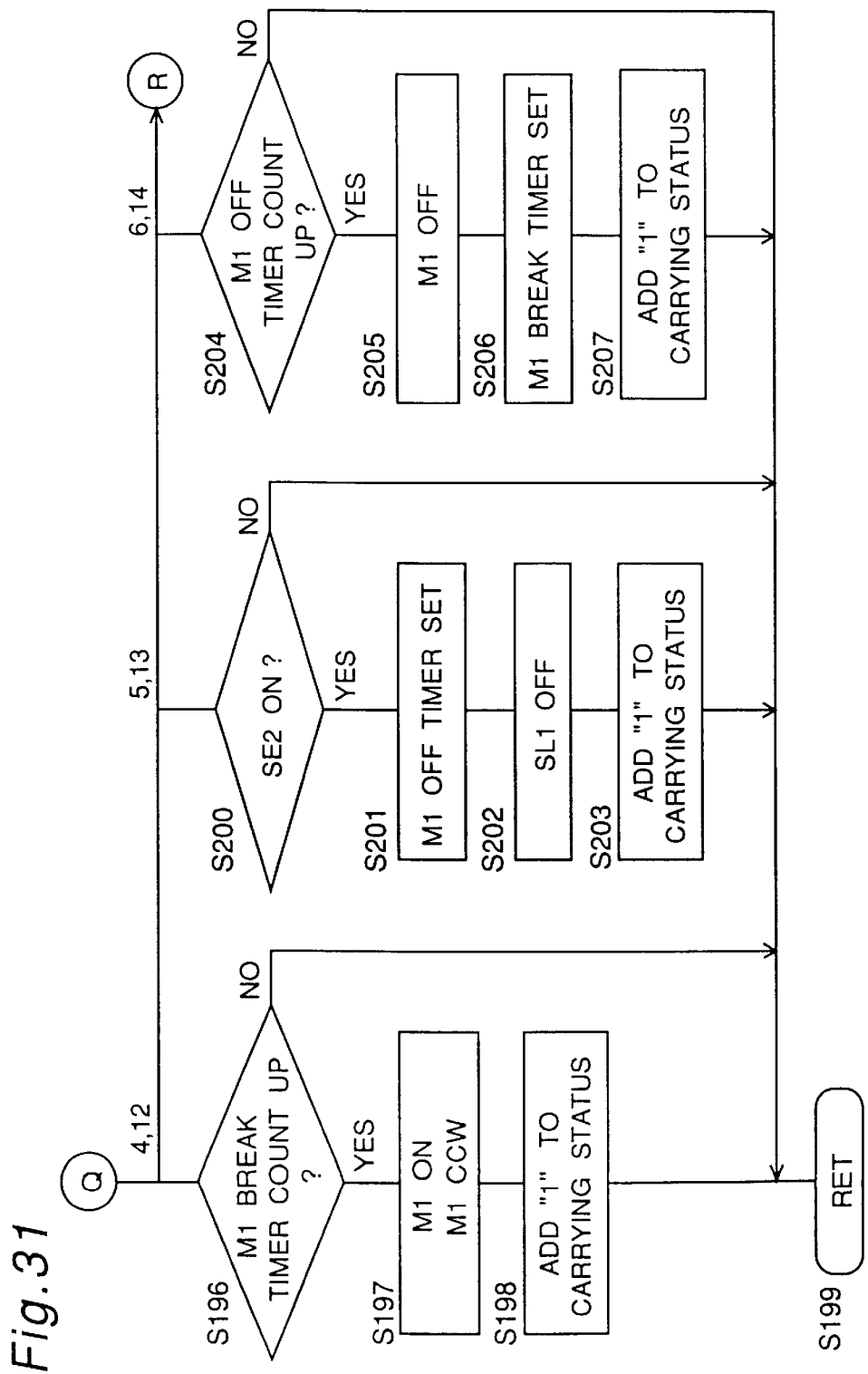
FIG. 31 is a flow chart showing a subroutine of a paper carrying operation in the third embodiment.

If the carrying status is "4" or "12" at the step S182 in FIG. 30, the step goes to a step S196 in FIG. 31. If the M1 brake time is counted up at the step S196, then the paper feeding motor M1 is rotated in circulating switch back direction at a step S197. At a step S198, the carrying status is increased. Thereafter, the step is returned to the main routine at a step S199.

If the carrying status is "5" or "13" at the step S182 in FIG. 30, the step goes to a step S200. If the resist sensor SE2 has turned on, then the M1 OFF timer is set at a step S201 and the solenoid SL1 is turned off at a step S202. At a step S203, the carrying status is increased.

If the carrying status is "6" or "14" at the step S182, the step goes to a step S204. If the M1 OFF timer is counted up at the step S204, then the paper feeding motor M1 is turned off at a step S205, and then, the M1 brake timer is set at a step S206. At a step S207, the carrying status is increased.

Figure 32:
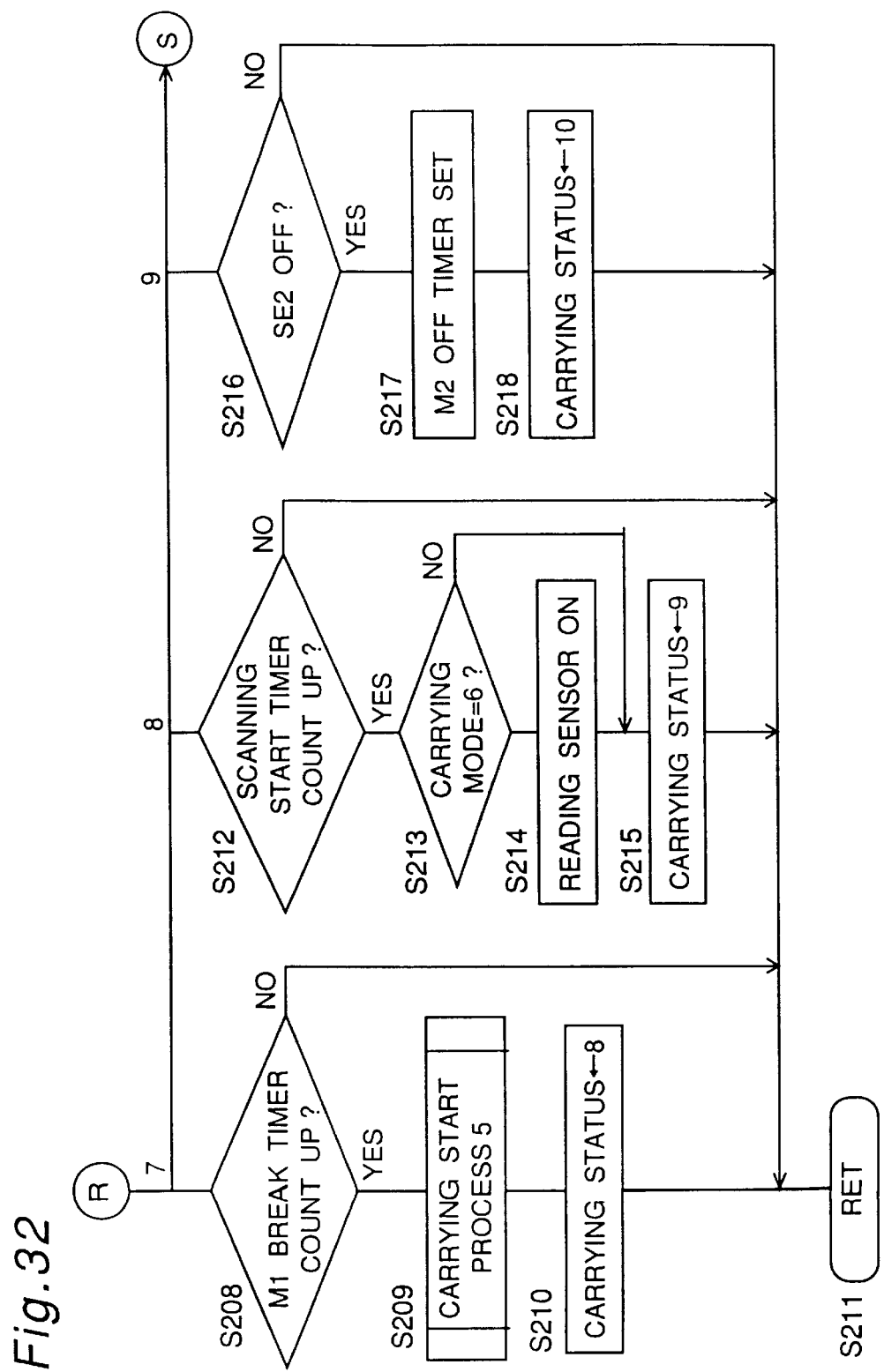
FIG. 32 is a flow chart showing a subroutine of a paper carrying operation in the third embodiment.

If the carrying status is "7" at the step S182 in the FIG. 30, then the step goes to a step S208 in FIG. 32. If the M1 brake timer is counted up at the step S208, the carrying start process 5 shown in FIG. 46 to be described later is executed at a step S209. After the carrying status is set to "8" at a step S210, the step is returned to the original routine at a step S211.

If the carrying status is "8" in the step S182, then the step goes to a step S212. If the scanning start timer is counted up at the step S212, the step goes to a step S213. If the carrying mode is "6" at the step S213, then the reading sensor 40 is turned on at a step S214 to start scanning, and then, the carrying status is set to "9" at step S215.

If the carrying status is "9" at the step S182, then the step goes to a step S216. If the resist sensor SE2 has turned off at the step S216, then the M2 OFF timer is set at a step S217 and the carrying status is set to "10" at a step S218.

Figure 33:
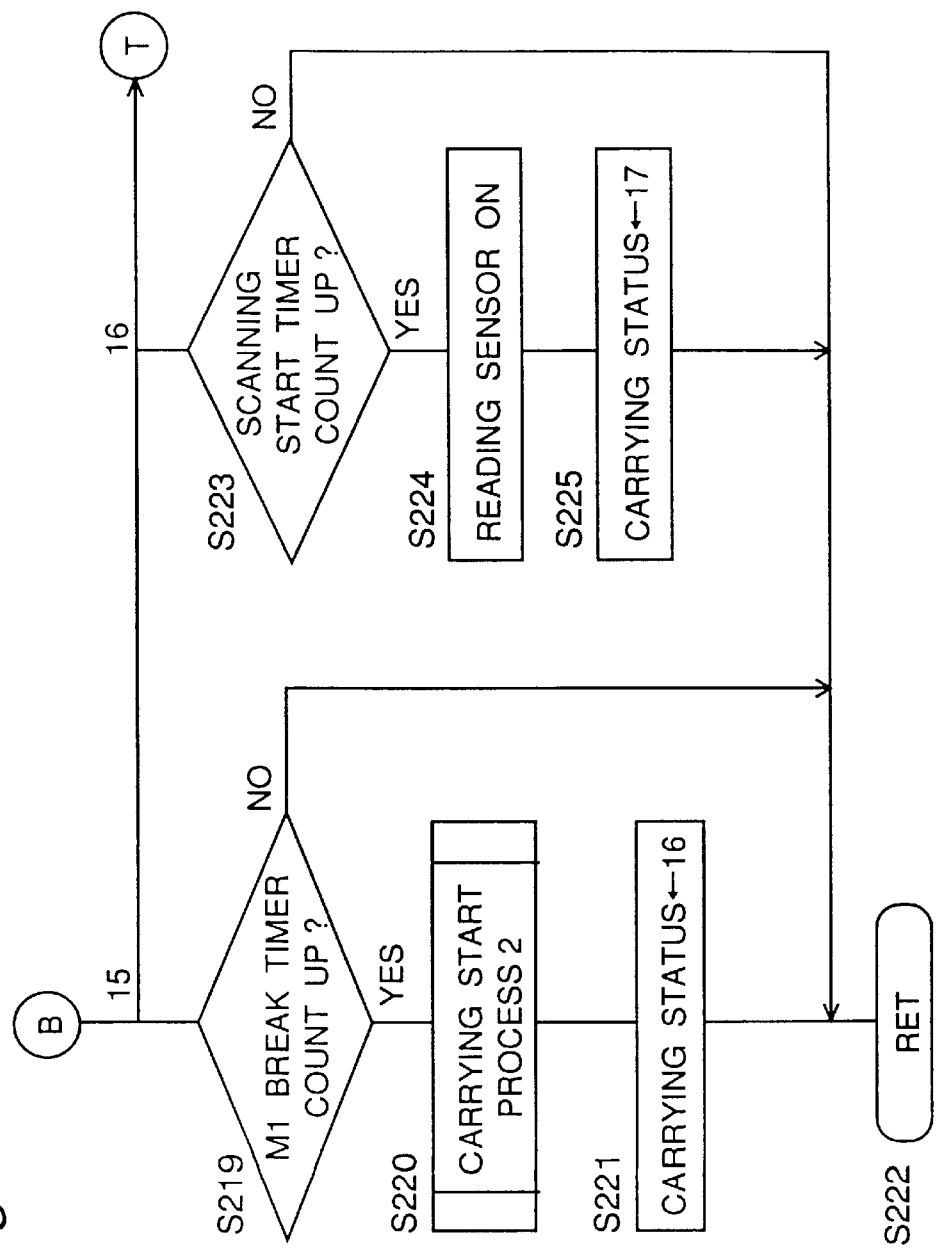
FIG. 33 is a flow chart showing a subroutine of a paper carrying operation in the third embodiment.

If the carrying status is "15" at the step S182 in FIG. 30, then the step goes to a step S219 of FIG. 33. If the M1 brake timer is counted up at the step S219, the step goes to a step S220 to execute the carrying start process 2. After the carrying status is set to "16" at a step S221, the step is returned to the main routine at a step S222.

If the carrying status is "16" at the step S182, the steps goes to a step S223. If the scanning start timer is counted up at the step S223, the reading sensor 40 is turned on at a step S224 and the carrying status is set "17" at a step S225.

Figure 34:
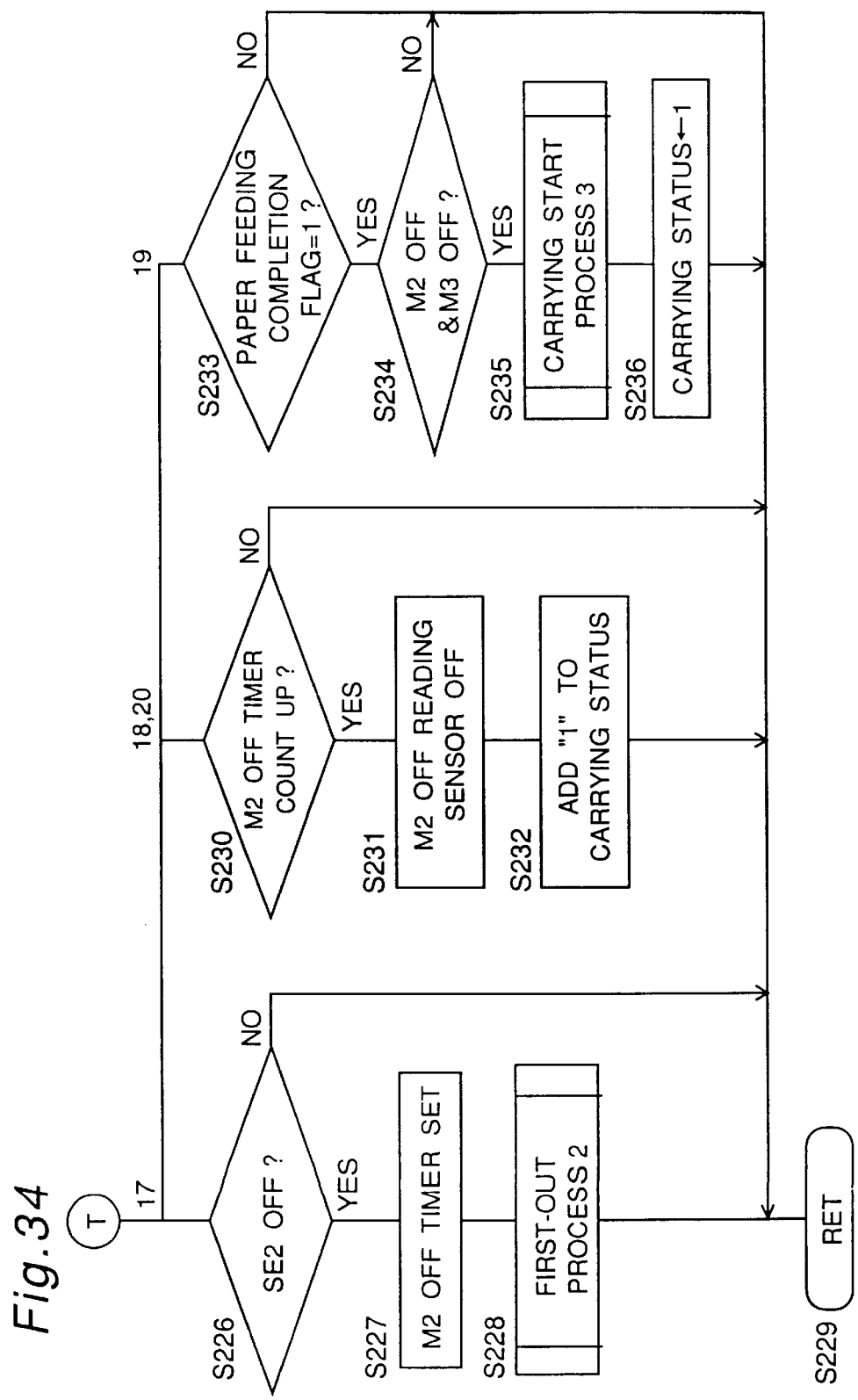
FIG. 34 is a flow chart showing a subroutine of a paper carrying operation in the third embodiment.

If the carrying status is set to "17" at a step S182 in FIG. 30, the step goes to a step S226 of FIG. 34. If the resist sensor SE2 has turned off at the step S226, the step goes to a step S227 to set the M2 OFF timer. After the first-out start process 2 shown in FIG. 48 to be described later is executed at the step S228, the step is returned to the original routine at a step S229.

If the carrying status is "18" or "20", then the step goes to a step S230. If the M2 OFF timer is counted up at the step S230, then the step goes to a step S231 to turn off the carrying motor M2 and the reading sensor 40. At a step S232, the carrying status is increased.

If the carrying status is "19" at the step S182, then the step goes to a step S233. If the paper feeding completion flag is set to "1" at the step S233, the step goes to a step S234. If the carrying motor M2 and the paper discharge motor M3 have turned off at the step S234, then the carrying start process 3 is executed at a step S235 and the carrying status is set to "1" at a step S236.

(Subroutine of the paper Discharge)

Figure 35:
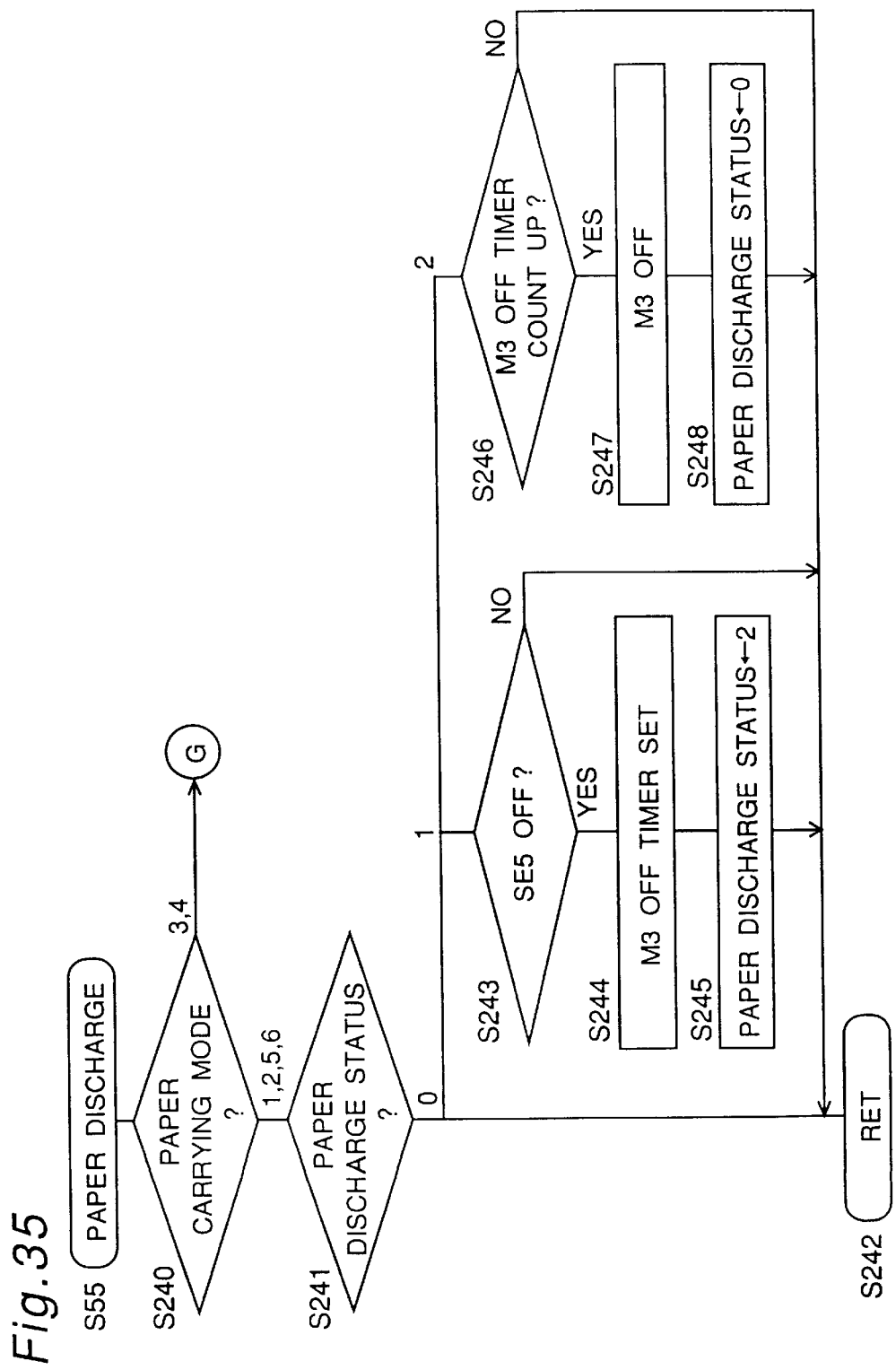
FIG. 35 is a flow chart showing a subroutine of a paper discharge operation in the third embodiment.
Figure 36:
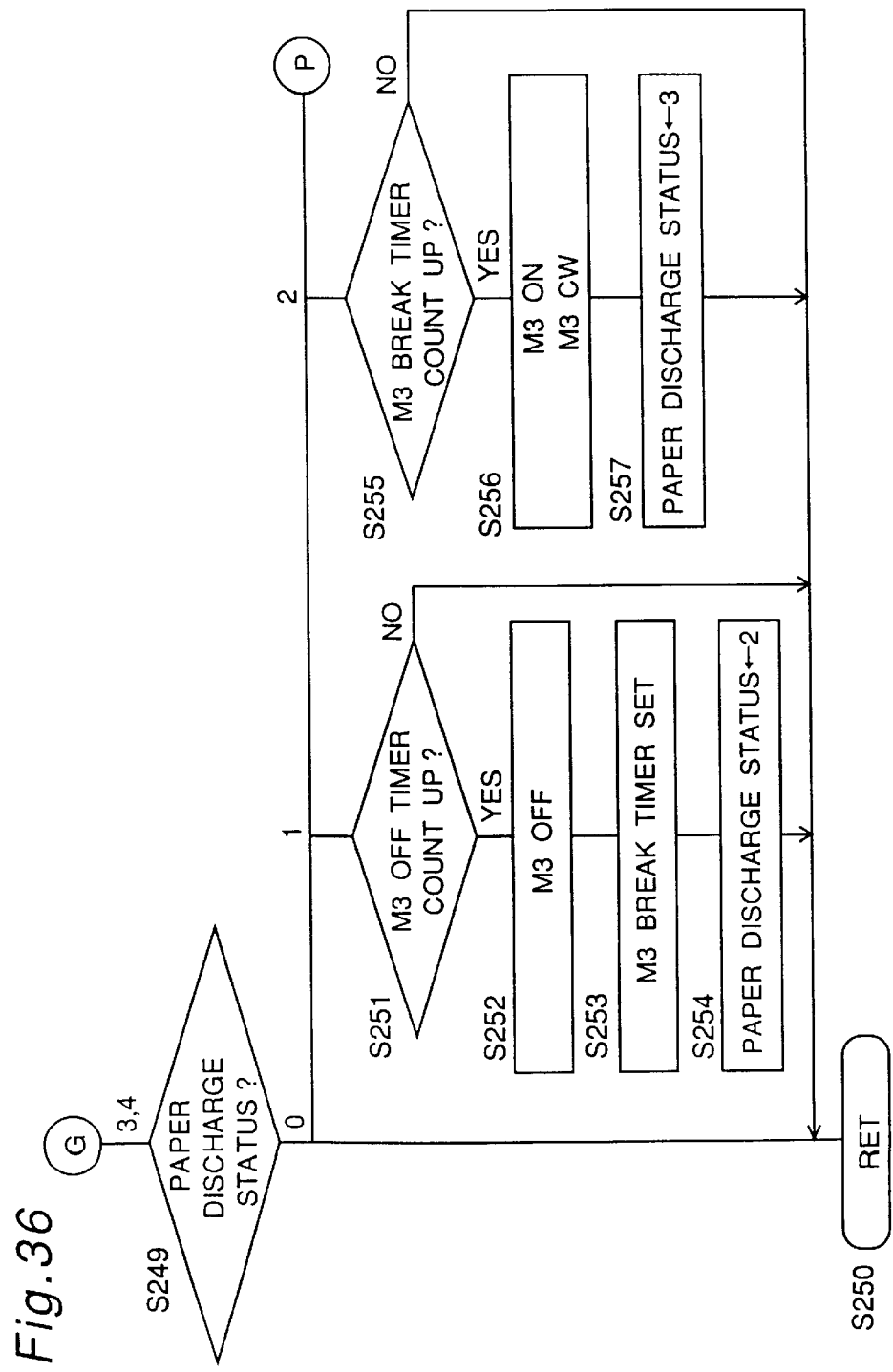
FIG. 36 is a flow chart showing a subroutine of a paper discharge operation in the third embodiment.
Figure 37:
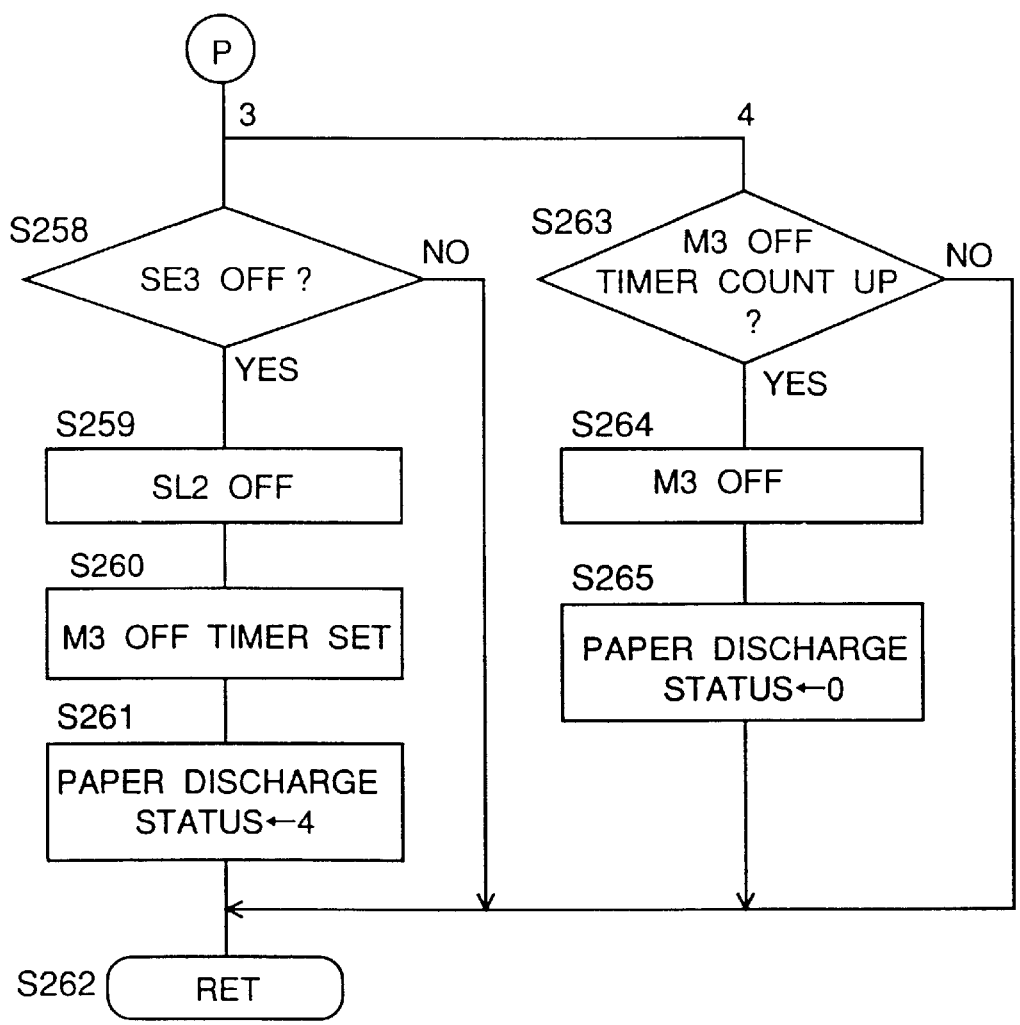
FIG. 37 is a flow chart showing a subroutine of a paper discharge operation in the third embodiment.

FIGS. 35 through FIG. 37 show the subroutine of the paper discharge at the step S55 in FIG. 17.

If the carrying mode is "1", "2", "5" or "6" at a step S240, then the step goes to a step S241.

If the paper discharge status is "0" at the step S241, then the step is returned to a main routine at a step S242.

If the paper discharge status is "1" at the step S241, then the step goes to a step S243. If the paper discharge sensor SE5 has turned on at the step S243, then the M3 OFF timer is set at the step S244, and a paper discharge status is set to "2" at a step S245.

If the paper discharge status is "2" at the step S240, then the step goes to a step S246. If the M3 OFF timer is counted up at the step S246, the paper discharge motor M3 is turned off at a step S247, and then, the paper discharge status is set "0" at a step S248.

If the carrying mode is "3" or "4" (both sides high speed mode or both sides mixed stack mode) at the step S240 in FIG. 35, then the step goes to a step S249 in FIG. 36.

If the paper discharge status is "0" at the step S249, then the step returns to the main routine at a step S250.

If the paper discharge status is "1" at the step S249, then the step goes to a step S251. If the M3 OFF motor is counted up at the step S251, the step goes to a step S252 to turn off the paper discharge motor M3. At a step S253, the M3 brake timer is set. At a step S254, the paper discharge status is set to "2".

If the paper discharge status is "2" at the step S249, then the step goes to a step S255. If the M3 brake timer is counted up at the step S255, then the step goes to a step S256 to rotate the paper discharge motor M3 in the switch back direction. At a step S257, the paper discharge status is set to "3".

If the paper discharge status is "3" at the step S249 in FIG. 36, then the step goes to a step S258 in FIG. 37. If the paper reversion and discharge sensor SE3 has turned off at the step S258, then the solenoid SL2 is turned off at a step S259. After the M3 OFF timer is set at a step S260, the paper discharge status is set to "4" at a step S261. Then, the step goes to the main routine at a step S262.

If the paper discharge status is "4" at the step S249, then the step goes to a step S263. If the M3 OFF timer is counted up at the step S263, then the step goes to a step S264 to turn off the paper discharge motor M3. At a step S265, the paper discharge status is set to "0".

(Subroutine of the Paper Feeding Start)

Figure 38:
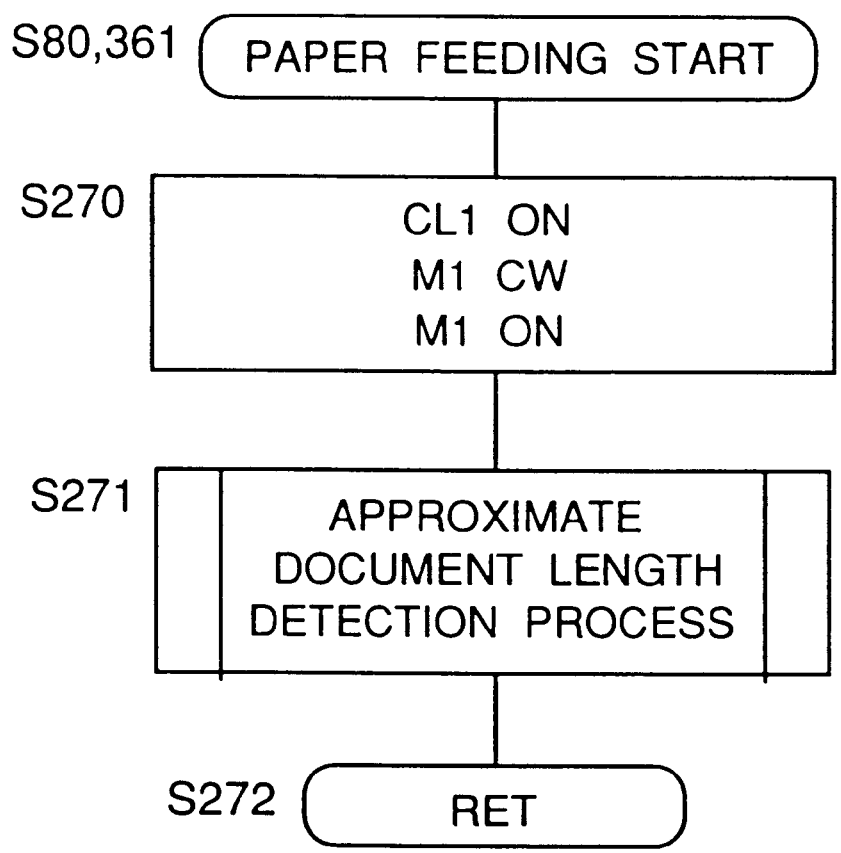
FIG. 38 is a flow chart showing a subroutine of a paper feeding start operation.
Figure 47:
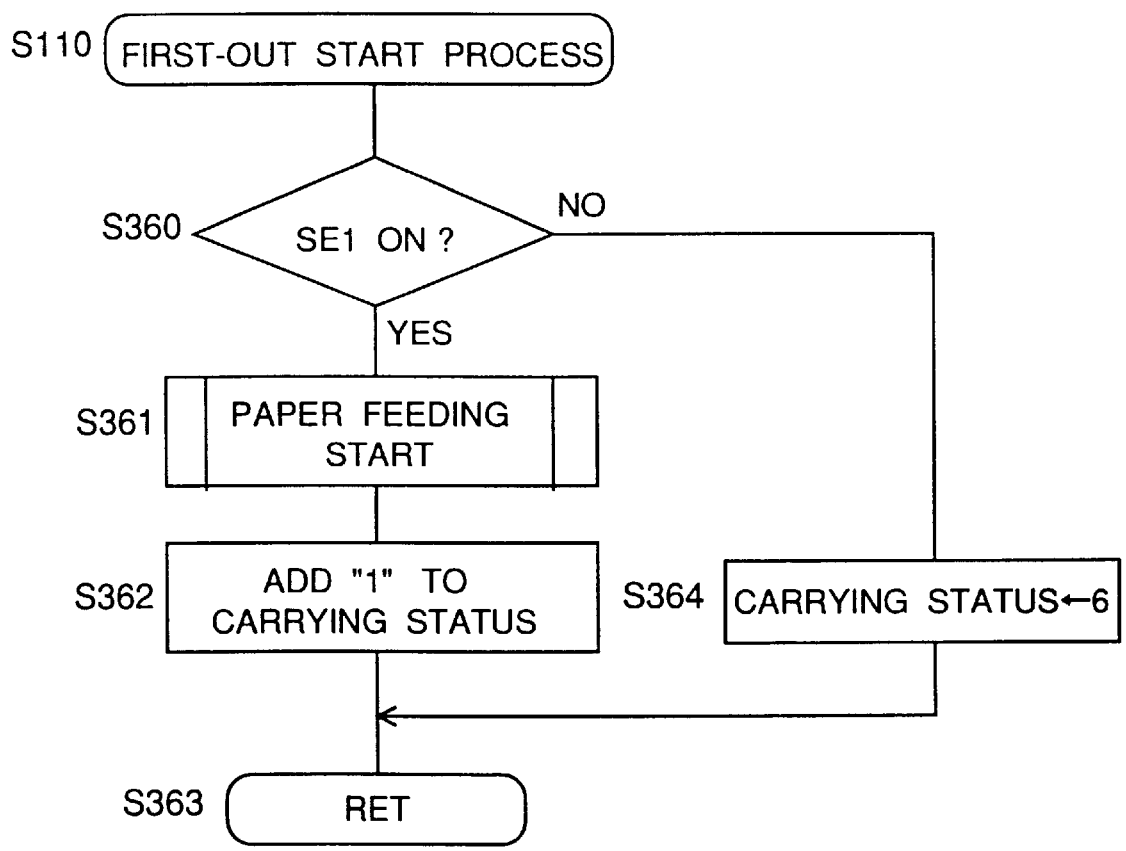
FIG. 47 is a flow chart showing a subroutine of a first-out start process in the third embodiment.

FIG. 38 shows a subroutine of the paper feeding start which is executed at the step S80 of FIG. 21 and the step S361 in FIG. 47.

At a step S270, the clutch CL1 is turned on and the paper feeding motor M1 is rotated in the normal direction. At a step S271, the approximate document length detect process is executed. After then, the step returns to the original routine at a step S272.

Figure 39:
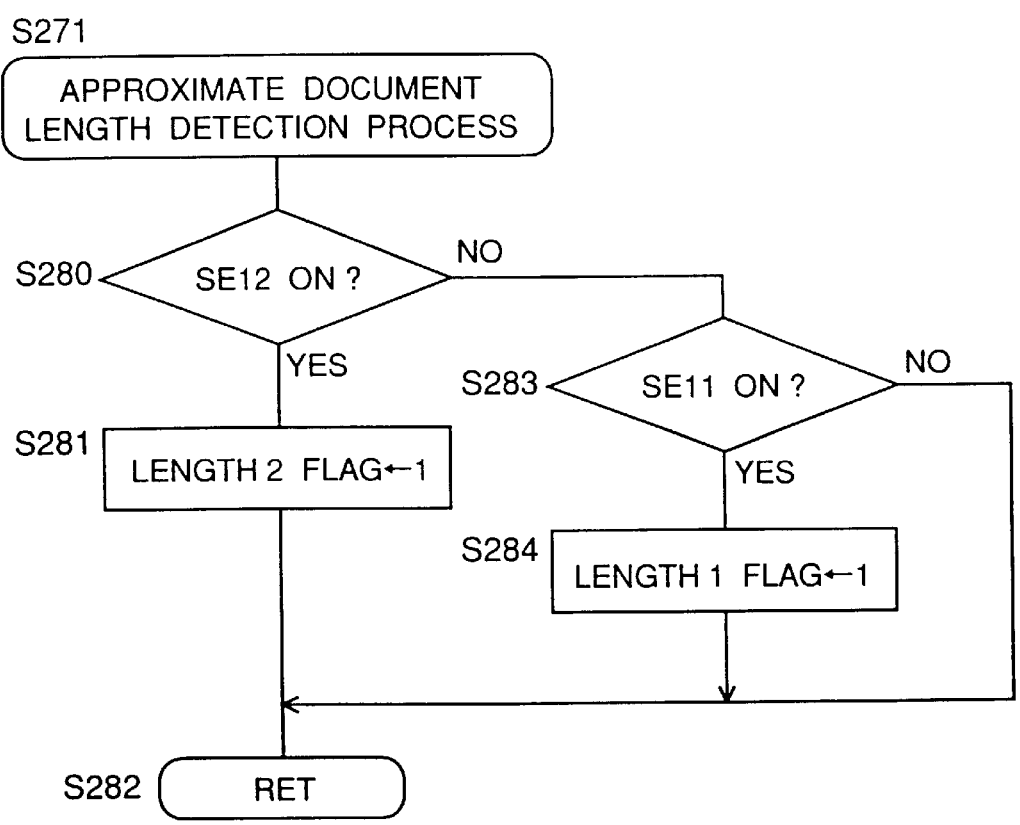
FIG. 39 is a flow chart showing a subroutine of an approximate document length detection process in the third embodiment.

(Subroutine of the Approximate Document Length Detection Process) FIG. 39 shows the subroutine of the approximate document length detect process at the step S271 in FIG. 38. If the length size sensor SE12 has turned on at a step S280, then the length 2 flag is set to "1" at a step S281, and then, the step returns to the original routine at a step S282. If the length sensor SE12 has not turned on at the step S280, then the step goes to a step S283. If the length size sensor SE12 has turned on at the step S283, then the step goes to a step S284 and the length 1 flag is set to "1".

Figure 40:
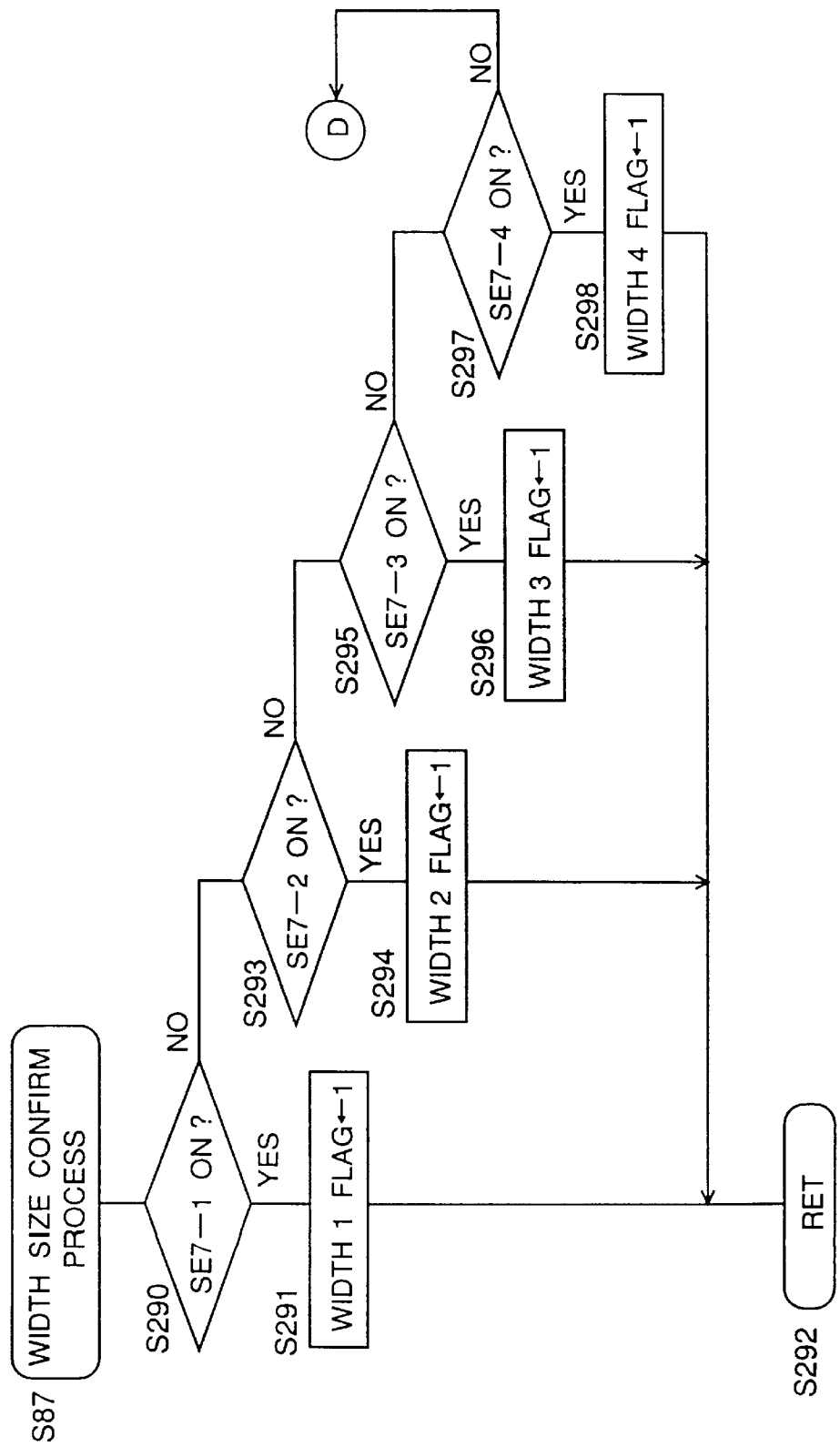
FIG. 40 is a flow chart showing a subroutine of a width size confirm process in the third embodiment.
Figure 41:
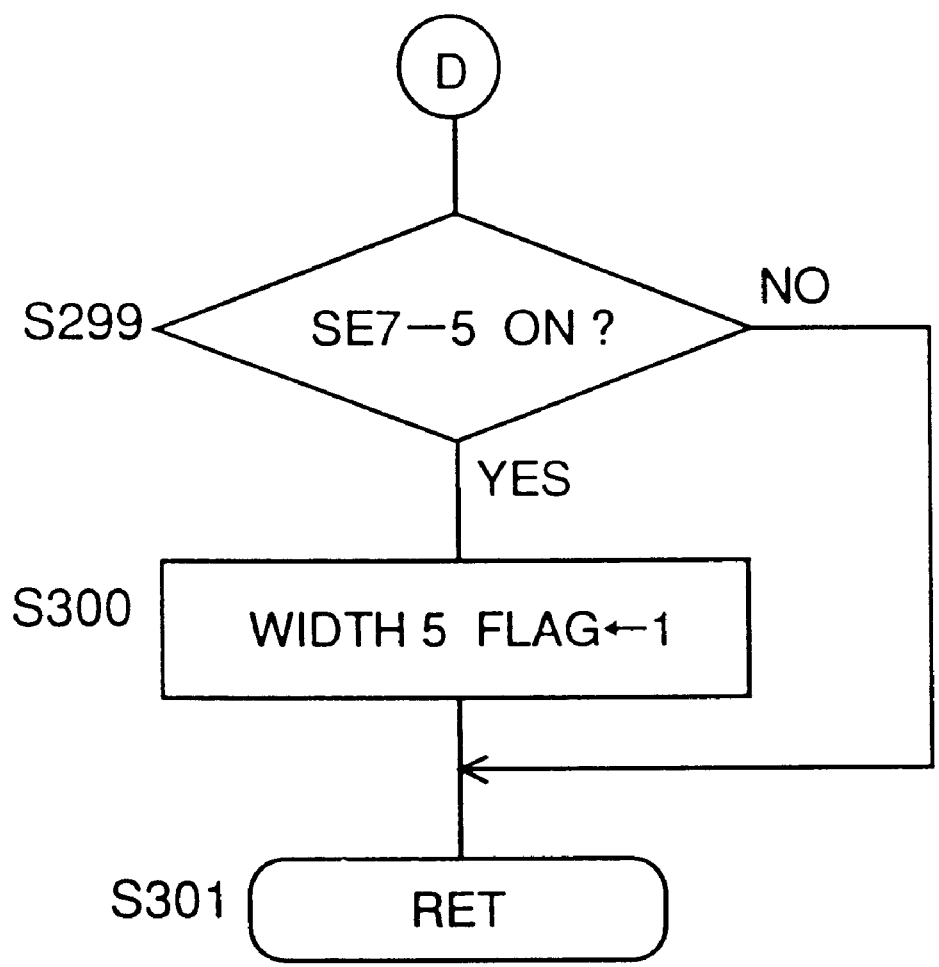
FIG. 41 is a flow chart showing a subroutine of a width size confirm process in the third embodiment.

(Subroutine of the Width Size Confirm Process) FIG. 40 and FIG. 41 show the subroutine of the width size confirm process at the step S87 in FIG. 21.

If the sensor SE7-1 has turned on at a step S290 in FIG. 40, then the width 1 flag is set to "1" at a step S291 and the step is returned to the original routine at a step S292 If the sensor SE7-2 has turned on at the step S293, then the width 2 flag is set to "1" at a step S294. If the sensor SE7-2 has not turned on, then the step goes to a step S295. If the sensor SE7-3 has turned on, then the width 3 flag is set to "1" at a step S296. If the sensor SE7-3 has not turned on at the step S296, then the step goes to a step S297. If the sensor SE7-4 has turned on at the step S297, then the width 4 flag is set to "1" at a step S298. If the sensor SE7-4 has not turned on, then the step goes to a step S299 in FIG. 41. If the sensor SE7-5 has turned on at the step S299, then the width 5 flag is set to "1" at a step S300, and then, the step is returned to the original routine at a step S301.

(Subroutine of the Carrying Start Process)

FIG. 42 shows a subroutine of the carrying start process of the step S101 in FIG. 22.

If the document is a first page at a step S310, then the step goes to a step S311. At the step S311, the paper feeding motor M1 is rotated in the normal direction, the carrying motor M2 is rotated, and the paper discharge motor M3 is rotated in the switch back direction. At a step S311, the scanning start timer is set, and the carrying status is set to "1".Thereafter, at a step S312, the step returns to the original routine. If the document is not a first one at the step S310, then the step goes to a step S313 after setting to the paper feeding completion flag to "1" at the step S312.

(Subroutine of the Carrying Start Process 2)

Figure 43:
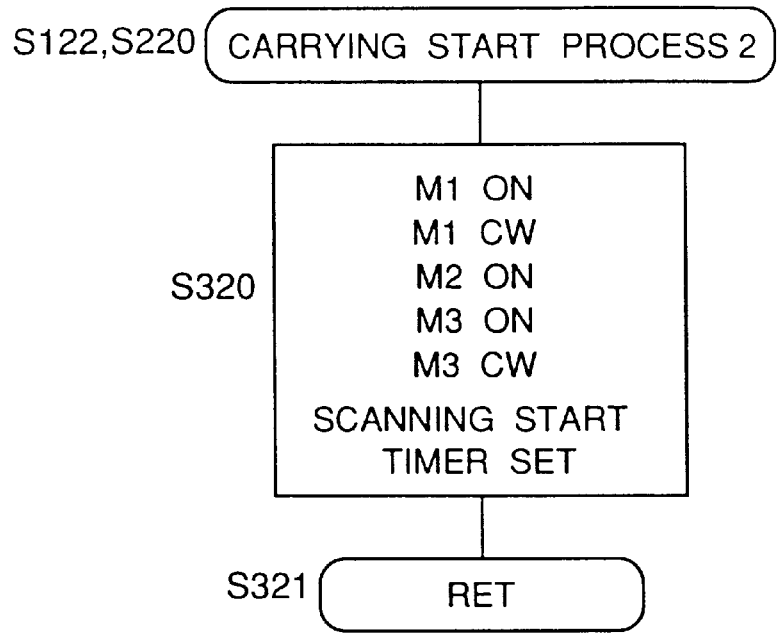
FIG. 43 is a flow chart showing a subroutine of a carrying start process 2 in the third embodiment.

FIG. 43 shows the subroutine of the carrying start process 2 of the step S122 in FIG. 24 and the step S220 in FIG. 33.

At a step S320, the paper feeding motor M1 is rotated in the normal direction, the carrying motor M2 is rotated, and the paper discharge motor M3 is rotated in the switch back direction. Further, the scanning start timer is set at the step S320. Then, at a step S321, the step is returned to the original routine.

(Subroutine of the Carrying Start Process 3)

FIG. 44 shows the subroutine of the carrying start process 3 of the step S179 in FIG. 29 and the step S235 in FIG. 34.

The paper feeding motor M1 is rotated in the normal direction, the carrying motor M2 is rotated, and the paper discharge motor M3 is rotated in the paper discharge direction at a step S330. Further, the scanning start timer is set and the M3 OFF timer is set at the step S331. Then, at a step S331, the step is returned to the original routine.

(Subroutine of the Carrying Start Process 4)

Figure 27:
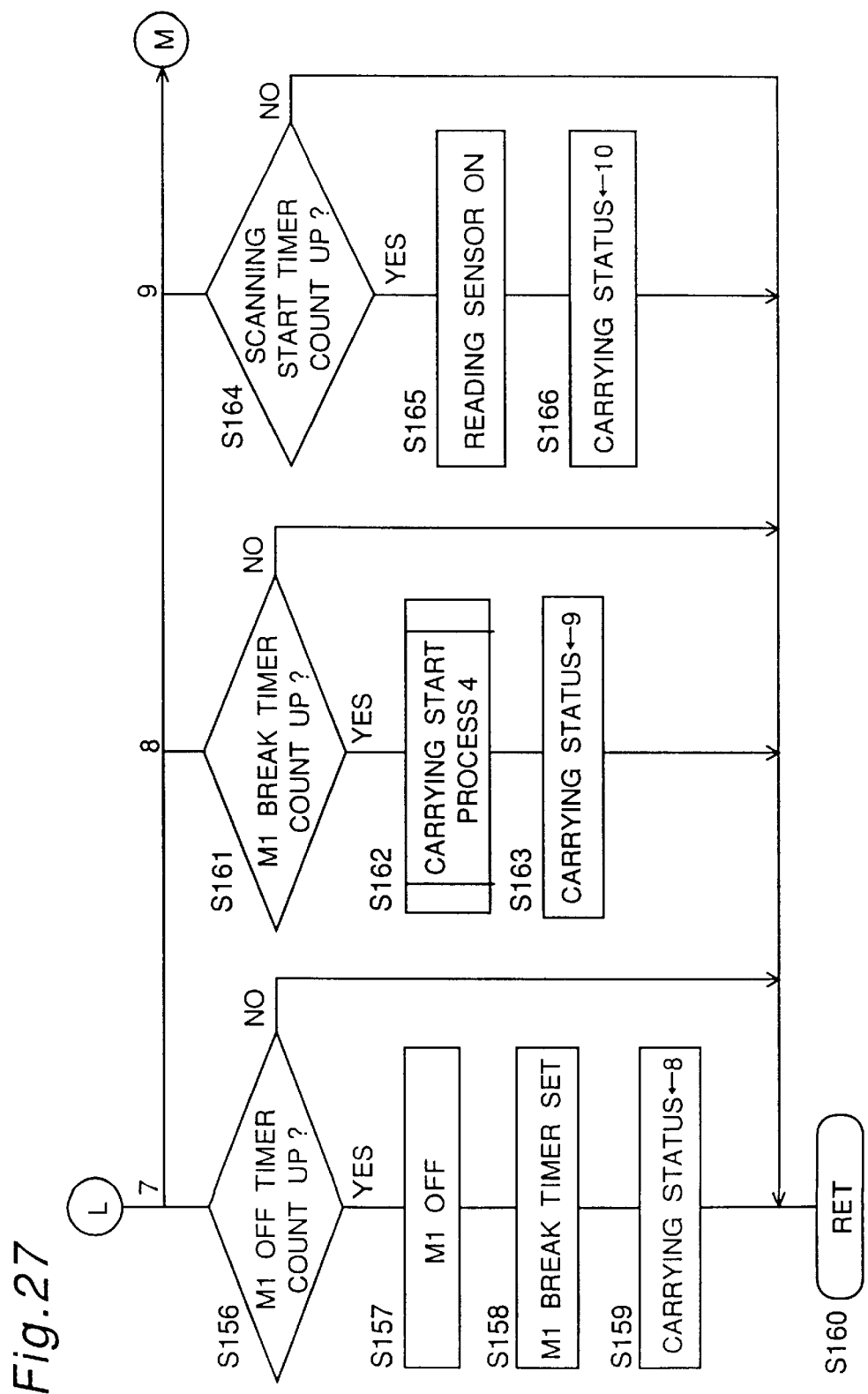
FIG. 27 is a flow chart showing a subroutine of a paper carrying operation in the third embodiment.
Figure 45:
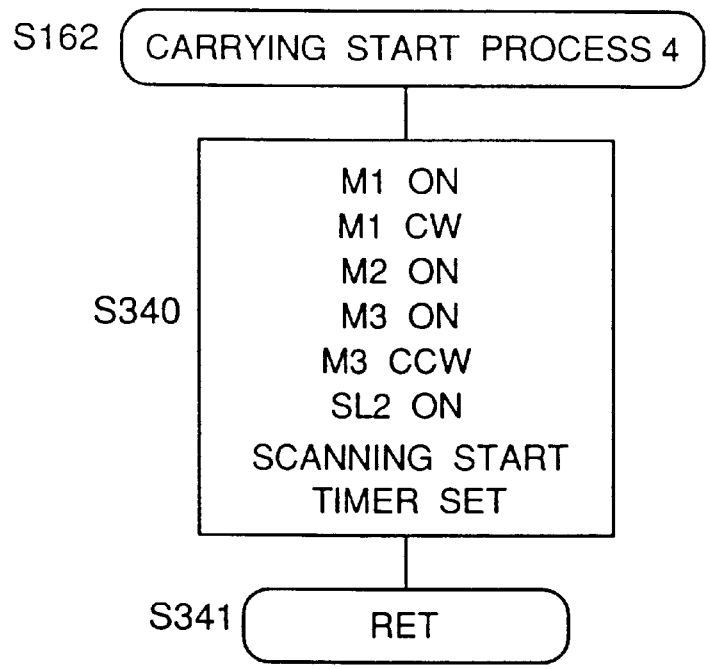
FIG. 45 is a flow chart showing a subroutine of a carrying start process 4 in the third embodiment.

FIG. 45 shows the subroutine of the carrying start process 4 of the step S162 in FIG. 27.

At a step S340, the paper feeding motor M1 is rotated in the normal direction, the carrying motor M2 is rotated, and the paper discharge motor M3 is rotated in the paper discharge direction. Further, the solenoid SL2 is turned on and the scanning start timer is set at the step S340. Then, at a step S341, the step is returned to the original routine.

(Subroutine of the Carrying Start Process 5)

Figure 46:
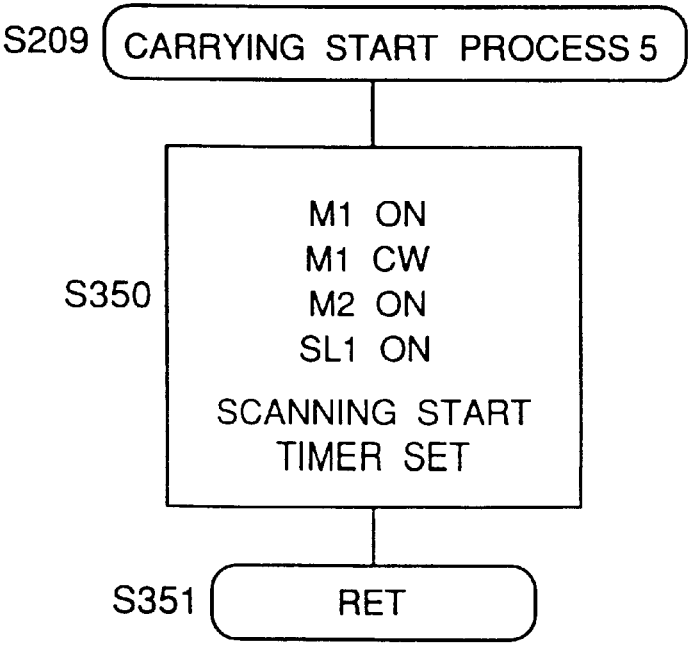
FIG. 46 is a flow chart showing a subroutine of a carrying start process 5 in the third embodiment.

FIG. 46 shows the subroutine of the carrying start process 5 of the step S209 in FIG. 32.

At a step S350, the paper feeding motor M1 is rotated in the normal direction and the carrying motor M2 is rotated. Further, the solenoid SL1 is turned on, and the scanning start timer is set, at the step S350. Then, at a step S351, the step is returned to the original routine.

(Subroutine of First-out Start Process)

FIG. 47 shows the subroutine of the tip end detection process at the step S110 in FIG. 23.

If the empty sensor SE1 has turned on at a step S360, then the step goes to a step S361 to start the paper feeding process. At a step S362, the carrying status is increased, and then, the step is returned to the original routine at a step S363.

If the empty sensor SE1 has not turned on, then the carrying status is set to "6" at a step S364.

(Subroutine of the First-out Start Process 2)

FIG. 48 shows a subroutine of the first-out start process 2 of the step S168 in FIG. 28 and the step S228 in FIG. 34.

If an empty sensor SE1 has turned on at a step S370, then the paper feeding start timer is set at a step S371. The M3 OFF timer is reset at a step S372. After increasing the carrying status at a step S373, the step returns to the original routine at a step S374.

If the empty sensor SE1 has not turned on at the step S370, then the step goes to a step S375. If the carrying mode is "3" or "4" at the step S375, then the carrying status is set to "15" at a step S376. If the carrying mode is not "3" or "4" at the step S375, then the carrying status is set to "20" at a step S376.

(Subroutine of the Size Detection Process 1)

Figure 50:
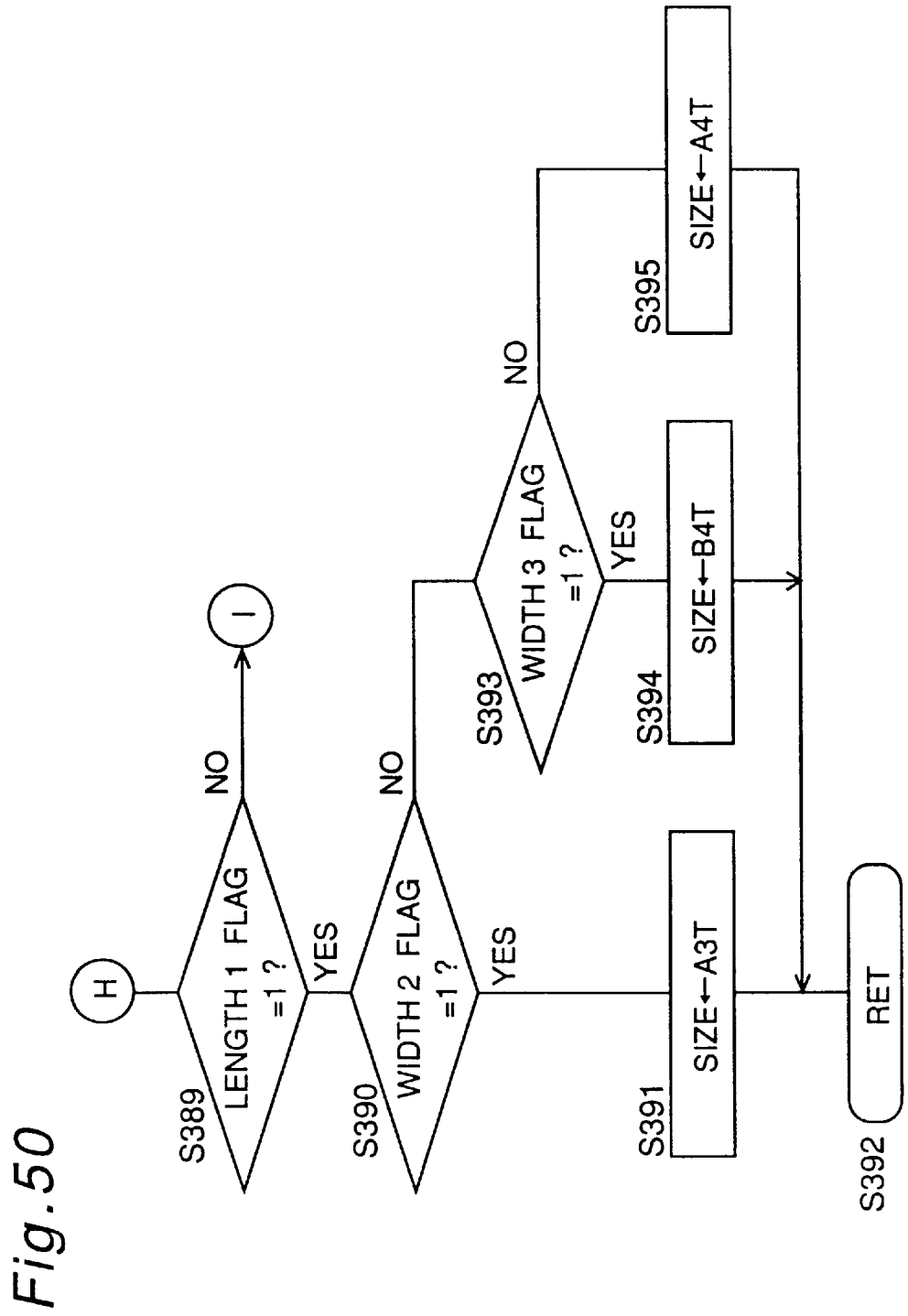
FIG. 50 is a flow chart showing a subroutine of a size detection process 1 in the third embodiment.
Figure 51:
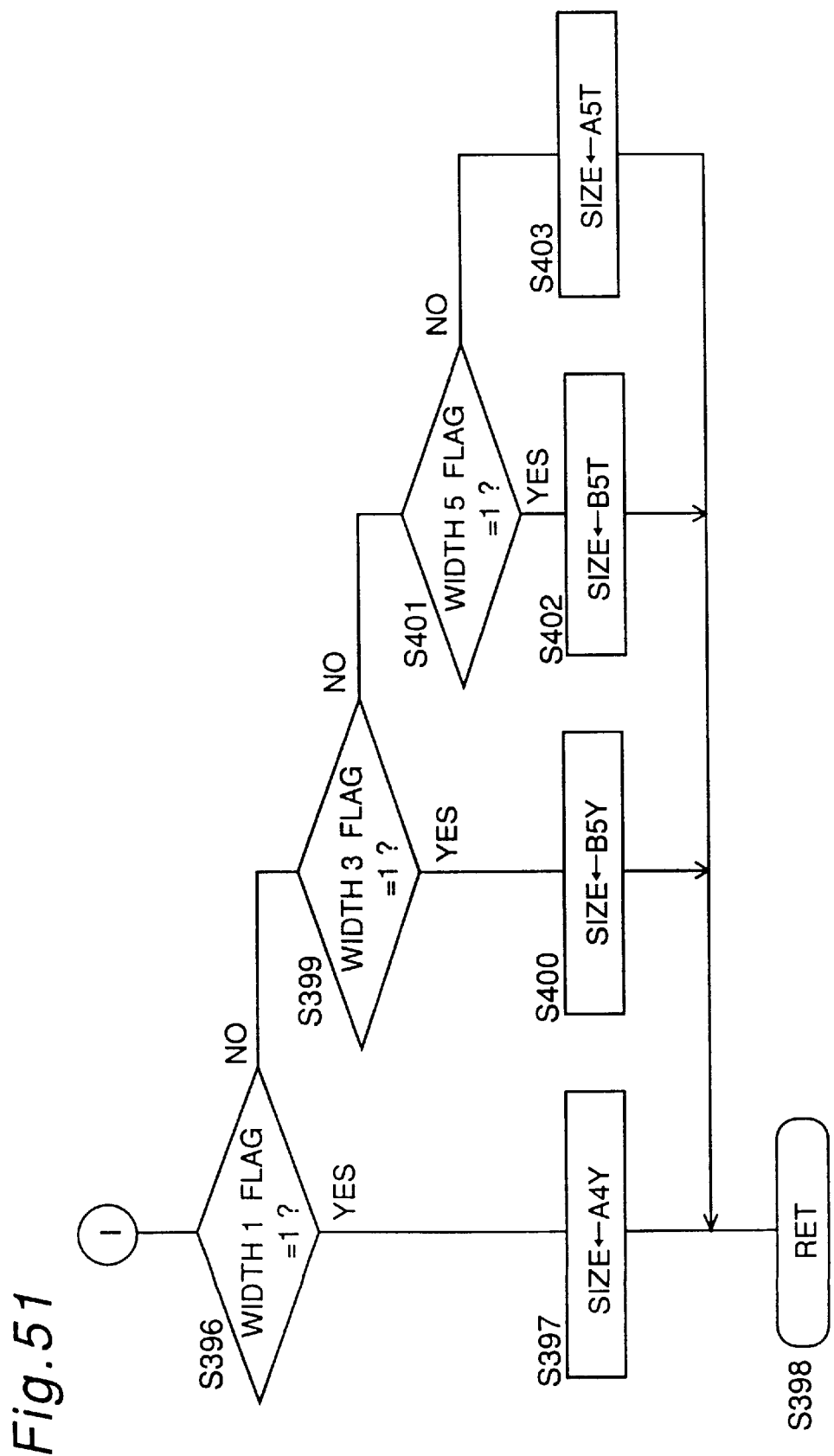
FIG. 51 is a flow chart showing a subroutine of a size detection process 1 in the third embodiment.

FIGS. 49 through 51 show the subroutine of the size detection process 1 of the step S89 in FIG. 21, the step S113 in FIG. 23, the step S126 in FIG. 24, the step S137 in FIG. 25 and the step S235 in FIG. 34.

If the length 2 flag is "1" at a step S380 in FIG. 49, then the step goes to a step S381. If it is not "1", then the step goes to a step S389 in FIG. 50.

If the width 1 flag is "1" at the step S381 in FIG. 49, then the document size is judged to be A4 longitudinal at a step S382. If the width 1 flag is not "1" at the step S380, then the step goes to a step S384. If the width 2 flag is "1" at the step S384, then the document size is judged to be longitudinal of 11×17 at a step S385. If it is not "1", then the step goes to a step S386. If the width 3 flag is "1" at a step S386, then the document size is judged to be B4 longitudinal at step S387. If it is not "1" at the step S386, then the document size is judged to be A3 longitudinal at a step S388.

If the length 1 flag is "1" at a step S389 in FIG. 50, then the step goes to S390. If it is not "1", then the step goes to a step S396 in FIG. 51.

If the width 2 flag is "1" at the step S390, then the document size is judged to be A3 longitudinal at a step S391, and the step is returned to the original routine at a step S392. If the width 2 flag is not "1" at the step S390, then the step goes to a step S393.

If the width 3 flag is "1" at the step S393, then the document size is judged to be B4 longitudinal at a step S394. If the width 3 flag is not "1" at the step S393, the document size is judged to be A4 longitudinal at a step S395.

If the width 1 flag is "1" at the step S396 in FIG. 51, then the document size is judged to be A4 lateral at a step S397. If the width 1 flag is not "1" at the step S396, then the step goes to a step S399.

If the width 3 flag is "1" at the step S399, the document size is judged to be B5 lateral at a step S400.

If the width 3 flag is not "1" at the step S399, the step goes to a step S401.

If the width 5 flag is "1" at the step S401, the document size is judged to be B5 longitudinal at a step S402. If the width 5 flag is not "1" at the step S401, the document size is judged to be A5 longitudinal at a step S403.

(Subroutine of the Size Detection Process 2)

Figure 52:
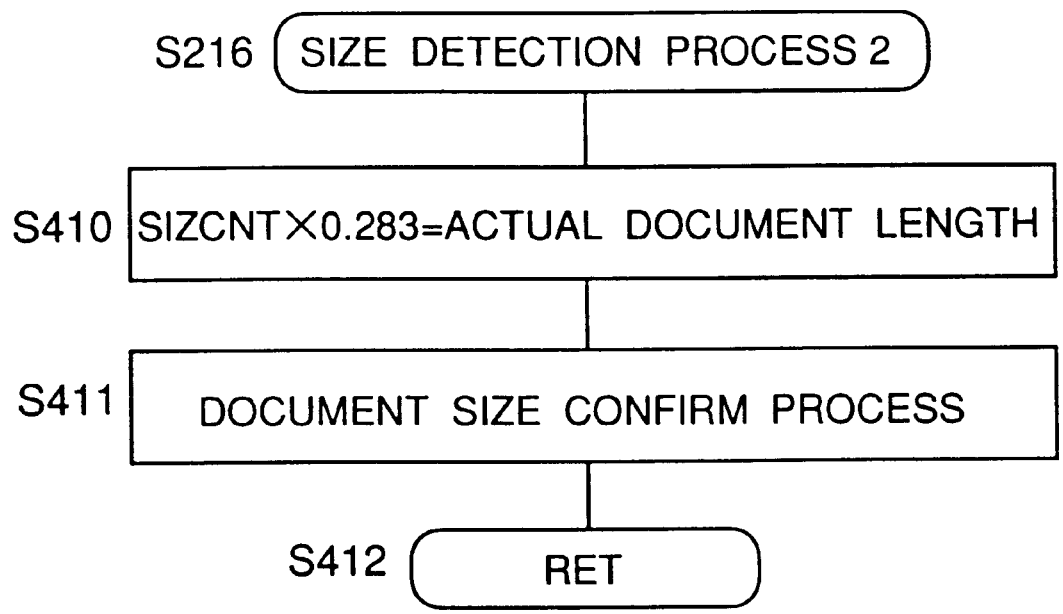
FIG. 52 is a flow chart showing a subroutine of a size detection process 2.

FIG. 52 is a subroutine of the size detection process 2 of the step S216.

At a step S410, the actual document length is calculated from the document carrying amount by the carrying motor M2. Namely, the actual document length is calculated by multiplying the value of the counter SIZCNT by 0.83 cm which is the document carrying amount per one pulse. At a step S411, document size confirm process is executed. In this document size confirm process, the document size is confirmed on the basis of the actual document length calculated at the step S268 and the document size detected in the size detection process 1 as shown in FIGS. 49 through 51. Thereafter, the step goes to the step S412.

In the document scan apparatus 120 of the third embodiment, in the single side mixed stack AMS mode and the both sides mixed stack AMS mode, the size detection process 2 is executed to detect the document size at the step S125, then the document is returned to the document scanning portion through the circulating reversion portion 2300 in order to be scanned as shown at the steps S184 through S200 in FIGS. 30 and 31. Hence, it does not need to provide a carrying path for only circulating the document to the document tray with the document scan apparatus 120 of the third embodiment, thereby making the apparatus smaller in size.

Further, in the document scan apparatus 120 of the third embodiment, capacity of the frame memory can be reduce, since the document size has been detected before the document scan starts.

Although the present invention is illustrated according to the preferred embodiment, various changes and modifications are clear for the skilled in the art. These changes and modifications are involved within the scope of the invention prescribed by the following claims.

For example, in the first embodiment, when the document is returned, only carrying roller can be rotated in the reverse direction. In the first embodiment, the document width detection sensor group and the document length detection sensor can be provided near the pick up roller. The function of the document length detection sensor can be combined in the width detection sensor group. Further, the document scan can be executed by the method where the document is fixed and the scanner moves.

What is claimed is:

1. A document scan apparatus comprising:
   a scanner which scans a document at a document scan portion;
   an automatic document feeder comprising a document stack portion in which documents to be scanned are stacked, a document discharge portion to which the documents are discharged after completion of scanning and a carrying path which extends from the document stack portion to the document discharge portion through the document scan portion, whereby the documents in the document stack portion are carried to the document scan portion and after completion of the scanning the documents are carried to be discharged to the document discharge portion;
   a detection unit which is arranged in the carrying path between the document stack portion and the document scan portion, and detects the size of the documents carried in the carrying path; and
   a control unit which controls the scanner, the automatic document feeder and the detection unit so that the automatic document feeder carries the document stacked in the document stack portion toward the document scan portion, the detection unit detects the size of the document carried toward the document scan portion, after completion of detecting the size of the document, the automatic document feeder carries the document to the document scan portion after carrying the document toward the document stack portion once, and then the scanner scans the document.

2. The document scan apparatus of claim 1, wherein the control unit controls the automatic document feeder so as to start to carry the document to the document scan portion at the time that the tip end of the document being carried toward the document stack portion reaches the document stack portion side of the document scan portion.

3. A document scan apparatus comprising:
   a scanner which scans a document at a document scan portion;
   an automatic document feeder comprising a document stack portion in which documents to be scanned are stacked, a document discharge portion to which the documents are discharged after completion of scanning, a primary carrying path which extends from the document stack portion to the document discharge portion through the document scan portion, and a secondary carrying path branching from the primary carrying path, whereby the documents in the document stack portion are carried to the document scan portion and after completion of the scanning the documents are carried to be discharged to the document discharge portion;
   a detection unit which is arranged in the primary carrying path between the document stack portion and the document scan portion, and detects the size of the documents carried in the primary carrying path; and
   a control unit which controls the scanner, the automatic document feeder and the detection unit so that the automatic document feeder carries the document stacked in the document stack portion toward the document scan portion, the detection unit detects the size of the document carried toward the document scan portion, after completion of detecting the size of the document, the automatic document feeder carries the document to the document scan portion after carrying the document to the secondary carrying path once, and then the scanner scans the document.

4. The document scan apparatus of claim 3, wherein the secondary carrying path reverses the document carried from the primary carrying path and then sends back the document to the primary carrying path.

5. The document scan apparatus of claim 3, wherein the scanner is fixed near the document scan portion, and wherein the document is scanned by the scanner by being moved over the document scan portion by the automatic document feeder.

6. An image forming apparatus comprising:
   a scanner which scans a document at a document scan portion;
   an automatic document feeder comprising a document stack portion in which documents to be scanned are stacked, a document discharge portion to which the documents are discharged after completion of scanning and a carrying path which extends from the document stack portion to the document discharge portion through the document scan portion, whereby the documents in the document stack portion are carried to the document scan portion and after completion of scanning the documents are carried to be discharged to the document discharge portion;
   a detection unit which is arranged in the carrying path between the document stack portion and the document scan portion, and detects the size of the documents carried in the carrying path;
   an image forming unit which forms an image according to the image of the documents scanned by the scanner; and
   a control unit which controls the scanner, the automatic document feeder and the detection unit so that the automatic document feeder carries the document stacked in the document stack portion toward the document scan portion, the detection unit detects the size of the document carried toward the document scan portion, after completion of detecting the size of the document, the automatic document feeder carries the document to the document scan portion after carrying the document toward the document stack portion once, and then the scanner scans the document.

7. The image forming apparatus of claim 6,
wherein the control unit controls the automatic document feeder so as to start to carry the document to the document scan portion at the time that the tip end of the document being carried toward the document stack portion reaches the document stack portion side of the document scan portion.

8. An image forming apparatus comprising:
a scanner which scans a document at a document scan portion;
an automatic document feeder comprising a document stack portion in which documents to be scanned are stacked, a document discharge portion to which the documents are discharged after completion of scanning, a primary carrying path which extends from the document stack portion to the document discharge portion through the document scan portion, and a secondary carrying path branching from the primary carrying path, whereby the documents in the document stack portion are carried to the document scan portion and after completion of scanning the documents are carried to be discharged to the document discharge portion:
a detection unit which is arranged in the carrying path between the document stack portion toward and the document scan portion, and detects the size of the documents carried in the carrying path;
an image forming unit which forms an image according to the image of the documents scanned by the scanner; and
a control unit which controls the scanner, the automatic document feeder and the detection unit so that the automatic document feeder carries the document stacked in the document stack portion toward the document scan portion, the detection unit detects the size of the document carried toward the document scan portion, after completion of detecting the size of the document, the automatic document feeder carries the document to the document scan portion after carrying the document to the secondary carrying path once, and then the scanner scans the document.

9. The image forming apparatus of claim 8, wherein the secondary carrying path reverses the document and then sends back the document to the primary carrying path.

10. The image forming apparatus of claim 8, wherein the scanner is fixed near the document scan portion, and wherein the document is scanned by the scanner by being moved over the document scan portion by the automatic document feeder.

11. The image forming apparatus of claim 8, wherein the control unit selects image forming magnification on the basis of the document size detected by the detection unit and a size of a sheet on which the image is to be formed.

12. A method for controlling a document scan apparatus includes:
a scanner which scans a document at a document scan portion;
an automatic document feeder comprising a document stack portion in which documents to be scanned are stacked, a document discharge portion to which the documents are discharged after completion of scanning and a carrying path which extends from the document stack portion to the document discharge portion through the document scan portion, whereby the documents in the document stack portion are carried to the document scan portion and after completion of scanning the documents are carried to be discharged to the document discharge portion; and
a detection unit which is arranged in the carrying path between the document stack portion and the document scan portion, and detects the size of the documents carried in the carrying path,
said method comprising the steps of:
1) carrying the document stacked in the document stack portion toward the document scan portion by the automatic document feeder;
2) detecting the size of the document carried toward the document scan portion by the detection unit;
3) after completion of detecting the size of the document, carrying the document to the document scan portion by the automatic document feeder after carrying the document toward the document stack portion once; and
4) scanning the document by the scanner.

13. The method of claim 12,
wherein at said step 3) at the time that the tip end of the document being carried toward the document stack portion reaches the document stack portion side of the document scan portion, the document is started to be carried toward the document scan portion by the automatic document feeder.

14. A method for controlling a document scan apparatus includes:
a scanner which scans a document at a document scan portion;
an automatic document feeder comprising a document stack portion in which documents to be scanned are stacked, a document discharge portion to which the documents are discharged after completion of scanning, a primary carrying path which extends from the document stack portion to the document discharge portion through the document scan portion, and a secondary carrying path branching from the primary carrying path, whereby the documents in the document stack portion are carried to the document scan portion and after completion of scanning the documents are carried to be discharged to the document discharge portion; and
a detection unit which is arranged in the primary carrying path between the document stack portion and the document scan portion, and detects the size of the documents carried in the primary carrying path,
said method comprising the steps of:
1) carrying the document stacked in the document stack portion toward the document scan portion by the automatic document feeder;
2) detecting the size of the document carried toward the document scan portion by the detection unit;
3) after completion of detecting the size of the document, carrying the document to the document scan portion by the automatic document feeder after carrying the document to the secondary carrying path once; and
4) scanning the document by the scanner.

* * * * *